(12) United States Patent
Hawkes et al.

(10) Patent No.: US 9,402,177 B2
(45) Date of Patent: Jul. 26, 2016

(54) AUTHENTICATION IN SECURE USER PLANE LOCATION (SUPL) SYSTEMS

(71) Applicant: QUALCOMM Incorporated, San Diego, CA (US)

(72) Inventors: Philip Michael Hawkes, Warrimoo (AU); Andreas Klaus Wachter, Menlo Park, CA (US); Adrian Edward Escott, Reading (GB); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/097,070

(22) Filed: Dec. 4, 2013

(65) Prior Publication Data

US 2014/0094147 A1  Apr. 3, 2014

Related U.S. Application Data

(62) Division of application No. 13/288,949, filed on Nov. 3, 2011, now Pat. No. 8,627,422.

(60) Provisional application No. 61/410,882, filed on Nov. 6, 2010, provisional application No. 61/437,184, filed on Jan. 28, 2011, provisional application No. 61/471,048, filed on Apr. 1, 2011, provisional application No. 61/527,341, filed on Aug. 25, 2011.

(51) Int. Cl.
*H04W 12/04* (2009.01)
*H04W 12/06* (2009.01)
(Continued)

(52) U.S. Cl.
CPC .......... *H04W 12/04* (2013.01); *H04L 63/0823* (2013.01); *H04L 63/166* (2013.01); *H04W 12/06* (2013.01); *H04L 63/205* (2013.01); *H04W 4/02* (2013.01); *H04W 12/08* (2013.01)

(58) Field of Classification Search
None
See application file for complete search history.

(56) References Cited

U.S. PATENT DOCUMENTS 6,789,078 B2   9/2004  Saitou et al.
7,120,675 B1  10/2006  Shupak et al.
(Continued)

FOREIGN PATENT DOCUMENTS

JP   2008536377 A   9/2008
JP   2009517916 A   4/2009
(Continued)

OTHER PUBLICATIONS

Dierks, T., et al., "The Transport Layer Security (TLS) Protocol", Version 1.1; RFC 4346, IETF, Apr. 2006, XP015054952, 87 pages.
(Continued)

*Primary Examiner* — Hadi Armouche
*Assistant Examiner* — Malcolm Cribbs
(74) *Attorney, Agent, or Firm* — Kilpatrick Townsend & Stockton LLP

(57) ABSTRACT

A particular method includes generating, at a secure user plane location (SUPL) server, a message to be sent to a mobile device, the message including: a server certificate including an identifier of the SUPL server and a public key of the SUPL server; and a request for a device certificate of the mobile device. The method also includes receiving a reply from the mobile device that includes a device certificate of the mobile device; and authenticating the mobile device as associated with a SUPL user based on the device certificate.

15 Claims, 11 Drawing Sheets

(51) Int. Cl.
  *H04L 29/06* (2006.01)
  *H04W 4/02* (2009.01)
  *H04W 12/08* (2009.01)

(56) References Cited

U.S. PATENT DOCUMENTS

| | | | |
|---|---|---|---|
| 7,729,706 | B2 | 6/2010 | Kim et al. |
| 7,900,039 | B2 | 3/2011 | Shim et al. |
| 7,929,965 | B2 | 4/2011 | Shim et al. |
| 8,068,056 | B2 | 11/2011 | Wachter et al. |
| 8,392,980 | B1 | 3/2013 | Ahrens et al. |
| 2003/0172278 | A1* | 9/2003 | Farnham et al. ............ 713/176 |
| 2004/0059941 | A1 | 3/2004 | Hardman et al. |
| 2005/0015595 | A1 | 1/2005 | Edwards et al. |
| 2005/0108520 | A1 | 5/2005 | Yamamoto et al. |
| 2005/0125493 | A1 | 6/2005 | Chaskar et al. |
| 2006/0058042 | A1 | 3/2006 | Shim |
| 2006/0143705 | A1 | 6/2006 | Sentoff |
| 2006/0242404 | A1 | 10/2006 | Su |
| 2006/0246919 | A1 | 11/2006 | Park et al. |
| 2007/0060097 | A1 | 3/2007 | Edge et al. |
| 2007/0135089 | A1 | 6/2007 | Edge et al. |
| 2007/0238458 | A1 | 10/2007 | Shim |
| 2007/0286212 | A1 | 12/2007 | Kim et al. |
| 2007/0287448 | A1 | 12/2007 | Kim et al. |
| 2008/0031194 | A1 | 2/2008 | Yaqub |
| 2008/0045237 | A1 | 2/2008 | Yan |
| 2008/0109650 | A1* | 5/2008 | Shim et al. ............... 713/151 |
| 2008/0133762 | A1 | 6/2008 | Edge et al. |
| 2008/0228654 | A1 | 9/2008 | Edge |
| 2008/0233931 | A1 | 9/2008 | Shim |
| 2008/0254809 | A1 | 10/2008 | Kraufvelin et al. |
| 2009/0104904 | A1 | 4/2009 | Shim |
| 2009/0181698 | A1 | 7/2009 | Farmer et al. |
| 2009/0209232 | A1 | 8/2009 | Cha et al. |
| 2009/0209269 | A1 | 8/2009 | Shim et al. |
| 2010/0257366 | A1* | 10/2010 | Leclercq et al. ............ 713/173 |
| 2010/0311439 | A1 | 12/2010 | Thomson et al. |
| 2010/0325702 | A1 | 12/2010 | Su |
| 2011/0035788 | A1 | 2/2011 | White et al. |
| 2011/0136472 | A1 | 6/2011 | Rector et al. |
| 2011/0264780 | A1 | 10/2011 | Reunamaeki et al. |
| 2012/0173613 | A1 | 7/2012 | Bryan |
| 2012/0202447 | A1 | 8/2012 | Edge et al. |
| 2012/0202517 | A1 | 8/2012 | Edge et al. |
| 2013/0067552 | A1 | 3/2013 | Hawkes et al. |
| 2013/0283352 | A1 | 10/2013 | Edge et al. |
| 2014/0093081 | A1 | 4/2014 | Hawkes et al. |
| 2014/0221019 | A1 | 8/2014 | Edge |

FOREIGN PATENT DOCUMENTS

| | | | |
|---|---|---|---|
| JP | 2010509889 | A | 3/2010 |
| JP | 2010169554 | A * | 8/2010 |
| TW | 201041359 | A | 11/2010 |
| WO | WO-2007016695 | | 2/2007 |
| WO | WO-2008112819 | A2 | 9/2008 |

OTHER PUBLICATIONS

International Search Report and Written Opinion—PCT/US2011/059455—ISA/EPO—Mar. 21, 2012.
Lee Hunter: "Emergency location for emergency call", Feb. 1, 2010, XP55026935, Retrieved from the Internet: URL:http://member.openmobilealliance.org/ftp/Publicdocuments/LOC/2010/OMA-LOC-2010-0032_INP_SUPL3_0_emergency_location_for_emergency_call.zip [retrieved on May 11, 2012], 10 pages.
Open Mobile Alliance: "Secure User Plane Location Architecture, Draft Version 3.0", Jan. 3, 2011, XP55026688, Retrieved from the Internet: URL:http://member.openmobilealliance.org/ftp/Public documentS/LOC/PermanentdocumentS/OMA-AD-SUPL-V3_0-20110103-D.zip [retrieved on May 9, 2012], 40 pages.
Open Mobile Alliance: "Enabler Release Definition for Secure User Plane Location (SUPL)", Candidate Version 3.0 OMA-ERELDSUPL-V3_0-20100921-D, Sep. 21, 2010, XP55019138, 17 pages.
Open Mobile Alliance: "User Plane Location Protocol", Candidate Version 2.0, OMA-TS-ULP-V2_0-20100816-C, Aug. 16, 2010, XP55019043, 410 pages.
TeleCommunication Systems, Inc.: "SLP Discovery Models and Mechanisms", Dec. 15, 2010, XP55026932, Retrieved from the Internet: URL:http://member.openmobilealliance.org/ftp/Public documents/LOC/2010/OMA-LOC-2010-0316-INP_SUPL_3_0_TCS_SLP_Models_and_Discovery_Mechanisms.zip [retrieved on May 11, 2012], 12 pages.
Open Mobile Alliance: "User Plane Location Protocol", Draft Version 3.0—Nov. 22, 2010, XP55026734, Retrieved from the Internet: URL:http://member.openmobilealliance.org/ftp/Publicdocuments/LOC/Permanent_documents/OMA-TS-ULP-V3_0-20101122-D.zip [retrieved on May 9, 2012], 184 pages.
Busin A., et al., "SUPL 3.0 AD A012 and A013 Discovery", OMA-LOC-2011-0023R02-CR_SUPL3_0_AD_A012_A0 13 Discovery, OMA-LOC-2011-0023R02-CR SUPL3_0_AD_A012_AO 13 Discovery, Open Mobile Alltance (OMA), 4330 La Jolla Village Dr., Suite 110 San Diego, CA 92122 ; USA, Jan. 31, 2011, pp. 1-4.
Goze, T. et al., "Secure User-Plane Location (SUPL) Architecture for Assisted GPS (A-GPS)", 4th Advanced Satellite Mobile Systems (ASMS), Aug. 26, 2008, pp. 229-234, IEEE, Piscataway, NJ, USA, XP031393759, ISBN: 978-1-4244-2160-2.
Ikegami, T., et al., "Undoable Management User Interface for System Reliability", Technical Report of the IEICE, Japan, The Institute of Electronics, Information and Communication Engineers (IEICE), Nov. 12, 2004, vol. 2004, No. 115, pp. 79-86.
Open Mobile Alliance, "UserPlane Location Protocol", Open Mobile Alliance, Jun. 27, 2008, Version 2.0, OMA-TS-ULP-V2_0-20080627-C, p. 24-26, 203-215, 223-249, 397-399, [retrieved on Mar. 23, 2015]. Retrieved from the Internet, URL, <http://www.natisbad.org/N900/ref/supl/OMA-TS-ULP-V2_0-20080627-C.pdf>.
Takahashi M., et al., "Technology Reports: Development of FOMA Location Information Functions Using SUPL International Roaming—Location Positioning Function-," NTT DoCoMo Technical Journal, Japan, the Telecommunications Association, Jul. 1, 2009, vol. 17, No. 2, pp. 6-10.

* cited by examiner

AUTHENTICATION IN SECURE USER PLANE LOCATION (SUPL) SYSTEMS

CROSS-REFERENCES TO RELATED APPLICATIONS

This application is a divisional application of U.S. patent application Ser. No. 13/288,949, filed Nov. 3, 2011, which claims the benefits of U.S. Provisional Patent Application No. 61/410,882 filed Nov. 6, 2010, U.S. Provisional Patent Application No. 61/437,184 filed Jan. 28, 2011, U.S. Provisional Patent Application No. 61/471,048 filed Apr. 1, 2011, and U.S. Provisional Patent Application No. 61/527,341 filed Aug. 25, 2011, each of which is incorporated by reference in its entirety and for all purposes.

BACKGROUND

1. Field of the Invention

The present disclosure is generally related to authentication in secure user plane location (SUPL) systems.

2. Description of the Related Art

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

A wireless telephone may also be equipped with location determination hardware/software to enable location-based services. For example, the wireless telephone may include a global positioning system (GPS) transceiver. The wireless telephone may also receive network-assisted positioning information (e.g., positioning information based triangulating the wireless telephone's location between multiple network towers).

Secure user plane location (SUPL) is a technology standard that may be used to enable location-based services in wireless communication systems. SUPL architecture may include two components: a SUPL enabled terminal (SET) and a SUPL location platform (SLP) that may be implemented as a network-accessible server. Prior to leveraging SUPL services, the SET and/or the SLP may be required to authenticate each other. However, security and authentication in SUPL may depend on what access network is used by the SET. For example, authentication on a $3^{rd}$ Generation Partnership Project (3GPP) or 3GPP2 network may utilize a different security scheme than authentication on a Worldwide Interoperability for Microwave Access (WiMAX) network. Further, the use of other available networks, such as Institute of Electrical and Electronics Engineers (IEEE) 802.11 (Wi-Fi) networks, may not be fully supported by security mechanisms available in SUPL 2.0, which may make SUPL-based functionality unavailable to wireless telephones that are indoors or experiencing poor cellular network conditions.

SUMMARY

Systems and methods of authentication in a SUPL system are disclosed. The disclosed systems and methods may support mutual authentication between a SET and a SLP for a variety of access networks, including 3GPP, 3GPP2, WiMAX, and Wi-Fi networks. The disclosed techniques may enable a SUPL server and a SET to negotiate which of a plurality of authentication methods is to be used. Authentication methods disclosed herein include, but are not limited to, certificate-based authentication independent of access network type. In particular implementations, certificate-based authentication may use transport layer security (TLS) to enable secure communications between a SET and a SLP during authentication. The disclosed techniques also apply security to SUPL session initiation and re-initiation. In additional embodiments, authentication may be performed via multiple identifier/password pairs instead of via certificate-based authentication.

In a particular embodiment, a method includes storing, at a mobile device, at least one security credential that is specific to the mobile device, where the security credential includes a device identifier of the mobile device. The method also includes transmitting the at least one security credential to a secure user plane location (SUPL) location platform (SLP) to authenticate the mobile device as associated with a SUPL user based on a comparison of the device identifier to a stored device identifier.

In another particular embodiment, a non-transitory processor-readable medium includes instructions that, when executed by a processor, cause the processor to generate, at a SUPL server, a message to be sent to a mobile device. The message includes a server certificate including an identifier of the SUPL server and a public key of the SUPL server, and a request for a device certificate of the mobile device. The instructions, when executed by the processor, also cause the processor to receive a reply from the mobile device that includes a device certificate of the mobile device. The instructions, when executed by the processor, further cause the processor to authenticate the mobile device as associated with a SUPL user based on the device certificate.

In another particular embodiment, an apparatus includes a processor and a memory coupled to the processor. The memory stores instructions executable by the processor to receive, at a SUPL server, an indication from a mobile device of one or more TLS cipher suites supported by the mobile device. The instructions are also executable by the processor to determine whether the one or more TLS cipher suites include a TLS pre-shared key (TLS-PSK) cipher suite that is supported by the SUPL server. The instructions are further executable by the processor to, in response to determining that the one or more TLS cipher suites include the TLS-PSK cipher suite that is supported by the SUPL server, perform a generic bootstrapping architecture (GBA)-based authentication process to authenticate the mobile device. The instructions are executable by the processor to, in response to determining that the one or more TLS cipher suites do not include a TLS-PSK cipher suite that is supported by the SUPL server, determine whether the SUPL server supports a certificate-based authentication method. The instructions are also executable by the processor to, in response to determining that the SUPL server supports the certificate-based authentication method, perform the certificate-based authentication process that includes sending a server certificate to the mobile device and receiving a device certificate from the mobile device. The instructions may further be executable by the processor to, in response to determining that the SUPL server does not support the certificate-based authentication method, perform an alternative client authentication (ACA)-based authentication method when the mobile device is connected to a 3GPP network or a 3GPP2 network.

In another particular embodiment, a method includes receiving, at a mobile device, a session initiation message (e.g., including a SUPL INIT message) from a SUPL server to initiate a SUPL session between the SUPL server and the mobile device. The method also includes, in response to the mobile device receiving a valid session initiation message key (e.g., including a SUPL_NIT_ROOT_KEY) from the SUPL server prior to the mobile device receiving the session initiation message, authenticating the session initiation message using the session initiation message key and initiating a SUPL session with the SUPL server in response to successful authentication of the session initiation message.

In another particular embodiment, an apparatus includes a processor and a memory coupled to the processor. The memory stores instructions executable by the processor to receive, at a mobile device, a session re-initiation message (e.g., including a SUPL REINIT message) from a SUPL server to continue a SUPL session (e.g., a generic SUPL session (GSS)) between the SUPL server and the mobile device. The instructions are also executable by the processor to, in response to the mobile device receiving a valid session initiation message key from the SUPL server prior to the mobile device receiving the session re-initiation message, authenticate the session re-initiation message using the session initiation message key and continue the SUPL session with the SUPL server in response to successful authentication of the session re-initiation message.

In another particular embodiment, a method includes transmitting a message from a mobile device to a SUPL server, where the message includes a SUPL INIT Root Key Status parameter (e.g., indicating a status of a SUPL_INIT_ROOT_KEY). For example, the SUPL INIT Root Key Status parameter may be included in a SET Capabilities parameter of the message. In yet another embodiment, a method includes transmitting a SUPL END message from a SUPL server to a mobile device, where the SUPL END message includes a SUPL INIT Key Response parameter (e.g., providing a new SUPL_INIT_ROOT_KEY). In another particular embodiment, a method includes transmitting a SUPL INIT message including a Protection Level parameter from a SUPL server to a mobile device. In yet another embodiment, a method includes transmitting a SUPL REINIT message including a Protection Level parameter from a SUPL server to a mobile device.

In another particular embodiment, a method includes receiving, at a web server, a message from a SUPL-enabled mobile device, where the message includes a security credential of the mobile device. The method also includes receiving, at the web server, user identification information from the mobile device and authenticating the user identification information as identifying an authorized user of a SUPL service. The method further includes sending the security credential of the mobile device to a SUPL server to enable the SUPL server to authenticate the mobile device as associated with the authorized user of the SUPL service.

In another particular embodiment, a method includes receiving, at a SUPL server, a first identifier and a first password from a mobile device. For example, the first identifier and the first password may be received during a user-mode TLS authentication procedure. The method also includes authenticating the first identifier and the first password as associated with an authorized user of a SUPL service. The method further includes sending a second identifier and a second password to the mobile device to replace the first identifier and the first password, where the SUPL server is configured to establish a SUPL session with the mobile device upon receiving the second identifier and the second password from the mobile device.

Particular advantages provided by at least one of the disclosed embodiments include an ability to perform mutual authentication in SUPL systems independent of access network. For example, one or more of the disclosed embodiments may support various access networks, including 3GPP, 3GPP2, WiMAX, and Wi-Fi networks. As another example, one or more of the disclosed embodiments may apply security to SUPL session initiation and re-initiation.

Other aspects, advantages, and features of the present disclosure will become apparent after review of the entire application, including the following sections: Brief Description of the Drawings, Detailed Description, and the Claims.

DETAILED DESCRIPTION

Figure 1:
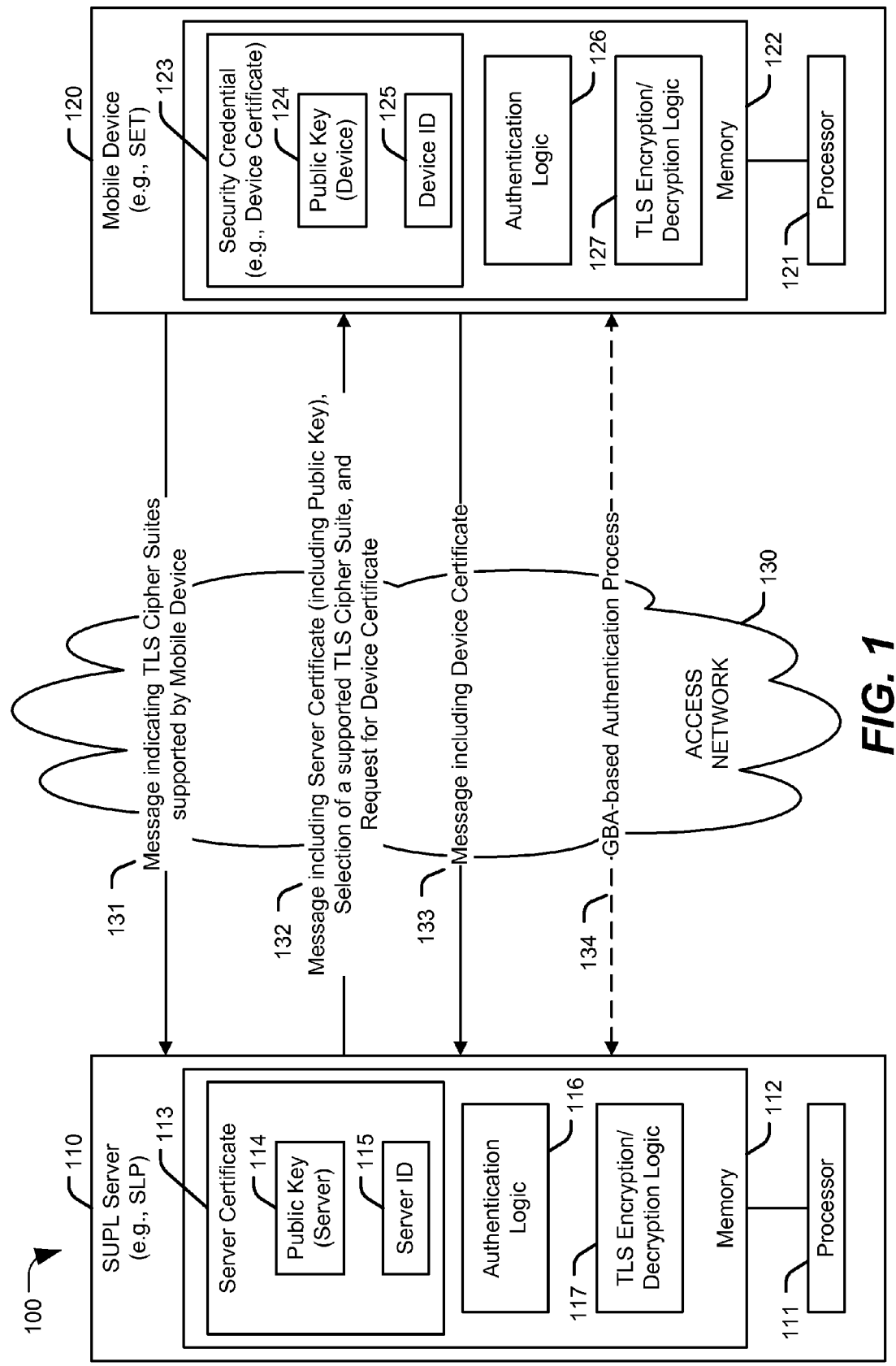
FIG. 1 is a diagram to illustrate a particular embodiment of a system that is operable to perform authentication in a SUPL environment.

Referring to FIG. 1, a particular embodiment of a system that is operable to perform authentication in a secure user plane location (SUPL) environment is shown and generally designated 100. The system 100 includes a SUPL server 110 communicably coupled to a mobile device 120 via one or more access networks (e.g., an illustrative access network 130). In a particular embodiment, the SUPL server 110 may be a SUPL location platform (SLP) and the mobile device 120 may be a SUPL-enabled terminal (SET). The access network 130 may be a 3GPP network, a 3GPP2 network, a WiMAX network, a Wi-Fi network (e.g., a network that operates in accordance with an IEEE 802.11 standard), or some other wireless access network. In a particular embodiment, the mobile device 120 may be a wireless telephone.

The SUPL server 110 may include a processor 111 and a memory 112 coupled to the processor 111. In a particular embodiment, the memory 122 may store instructions executable by the processor 111, where the instructions represent various logical modules, components, and applications. The memory 112 may also store one or more security credentials of the SUPL server 110. For example, the memory 112 may store a server certificate 113 for the SUPL server 110, where the server certificate 113 includes a public key 114 and a server identifier (ID) 115 (e.g., a globally unique identifier corresponding to the SUPL server 110). The SUPL server 110 may also have a private key corresponding to the public key 114. The memory 112 may also store executable instructions corresponding to authentication logic 116 and transport layer security (TLS) encryption/decryption logic 117. The authentication logic 116 may be executable to authenticate the mobile device 120. The TLS encryption/decryption logic 117 may be executable to encrypt messages transmitted from the SUPL server 110 to the mobile device 120 and to decrypt messages transmitted from the mobile device 120 to the SUPL server 110. For example, outgoing messages from the mobile device 120 may be encrypted using the server public key 114 and incoming messages from the mobile device 120 may be decrypted using a private key corresponding to the server public key 114.

The mobile device 120 may include a processor 121 and a memory 122 coupled to the processor 121. In a particular embodiment, the memory 122 stores instructions executable by the processor 121, where the instructions may represent various logical modules, components, and applications. The memory 122 may also store one or more security credentials of the mobile device 120. For example, the memory 122 may store a device certificate 123 for the mobile device 120, where the device certificate 123 includes a public key 124 and a device identifier (ID) 125. The mobile device 120 may also have a private key that corresponds to the public key 124. The device ID 125 may be an international mobile equipment identity (IMEI), a mobile station identification (MSID), a serial number, or other identifier that may be globally unique. In a particular embodiment, the device certificate 123 may be stored at a universal integrated circuit card (UICC) of the mobile device 120 instead of, or in addition to, in the memory 122. The memory 122 may store executable instructions corresponding to authentication logic 126 and transport layer security (TLS) encryption/decryption logic 127. The authentication logic 126 may be executable to authenticate the SUPL server 110 at the mobile device 120. The TLS encryption/decryption logic 127 may be executable to encrypt messages transmitted to the SUPL server 110 from the mobile device 120 and to decrypt messages transmitted to the mobile device 120 from the SUPL server 110. For example, outgoing messages from the mobile device 120 may be encrypted using the device public key 124 and incoming messages to the mobile device 120 may be decrypted using a private key corresponding to the device public key 124.

In a particular embodiment, the SUPL server 110 and the mobile device 120 may engage in a mutual authentication procedure. For example, during operation, the authentication logic 126 at the mobile device 120 may determine whether the mobile device 120 supports generic bootstrapping architecture (GBA)-based authentication. If the mobile device 120 supports GBA-based authentication, the mobile device 120 and the SUPL server 110 may perform a GBA-based authentication process 134. GBA-based authentication may be selected when the access network 130 is a 3GPP or 3GPP2 network. The mobile device 120 may initiate a TLS handshake procedure by transmitting a message 131 to the SUPL server 110. The message 131 may indicate one or more TLS cipher suites that are supported by the TLS encryption/decryption logic 127 at the mobile device 120. For example, the message 131 may be a ClientHello message and the supported TLS cipher suites may be indicated by a ClientHello.cipher_suites field.

The SUPL server 110 may process the message 131 and determine whether any of the indicated TLS cipher suites are also supported by the SUPL server 110 (i.e., whether there are any commonly supported TLS cipher suites). If the mobile device 120 and the SUPL server 110 both support a TLS pre-shared key (TLS-PSK) cipher suite, GBA may be supported, and the SUPL server 110 may perform the GBA-based authentication process 134. Otherwise, the SUPL server 110 may initiate certificate-based authentication via a message 132 or may initiate alternative client authentication (ACA). ACA may provide mutual authentication and may be dependent on the type of access network used. (e.g., GSM/UMTS and CDMA) During ACA authentication, the SUPL server 110 may verify the internet protocol (IP) address binding of the mobile device 120 by comparing an IP address provided by the mobile device 120 to an IP address corresponding to the mobile device 120 that is provided by the access network 130. Certificate-based authentication may be independent of the type of the access network 130 and may be used when the access network 130 is a Wi-Fi network. The message 132 may include an indication of a non-PSK TLS cipher suite supported by the SUPL server 110 and the mobile device 120, the server certificate 113 (which includes the server public key 114), and a request for a device certificate. To illustrate, the message 132 may include a ServerHello message including a ServerHello.cipher_suite field indicating the commonly supported TLS cipher suite.

In response to the message 132, the mobile device 120 may transmit a message 133 including the device certificate 123. The SUPL server 110 may attempt to identify a SUPL user associated with the mobile device 120 by comparing the device ID 125 in the device certificate 123 to a stored device ID (e.g., a stored device ID that was previously securely verified by the SUPL server 110 as associated with a SUPL user, as further described with reference to FIGS. 8-9). If no SUPL user is identified, the communication session between the SUPL server 110 and the mobile device 120 may be terminated. If a SUPL user is identified, the TLS handshake may complete and the SUPL server 110 may grant the mobile device 120 access to SUPL-based services (e.g., location-based services) that are provisioned for the SUPL user.

In particular embodiments, different authentication methods may also be available. For example, when the mobile device 120 is a WiMAX-compatible device and/or the access network 130 is a WiMAX network, if the mobile device 120 and the SUPL server 110 both support a SUPL encryption key (SEK)-based authentication method, then the SEK-based authentication method may be preferred for mutual authentication of the SUPL server 110 and the mobile device 120. As another example, if the SUPL server 110 does not support certificate-based authentication, the SUPL server 110 may transmit the message 132 without the request for the device certificate to initiate a different authentication method, such as ACA (which may provide access network-dependent mutual authentication when the mobile device 120 is on a 3GPP or 3GPP2 access network) or SLP-only authentication (which may provide non-mutual authentication and may generally be used only during emergency scenarios).

The system 100 of FIG. 1 may thus enable mutual authentication between a mobile device and a SUPL server independent of access network. For example, the access network 130 may be a 3GPP network, a 3GPP2 network, a WiMAX network, a Wi-Fi network, or some other network. The system 100 of FIG. 1 may also provide support for multiple mutual authentication methods, including GBA-based authentication, SEK-based authentication, certificate-based authentication, ACA-based authentication, and SLP-only authentication.

Figure 2:
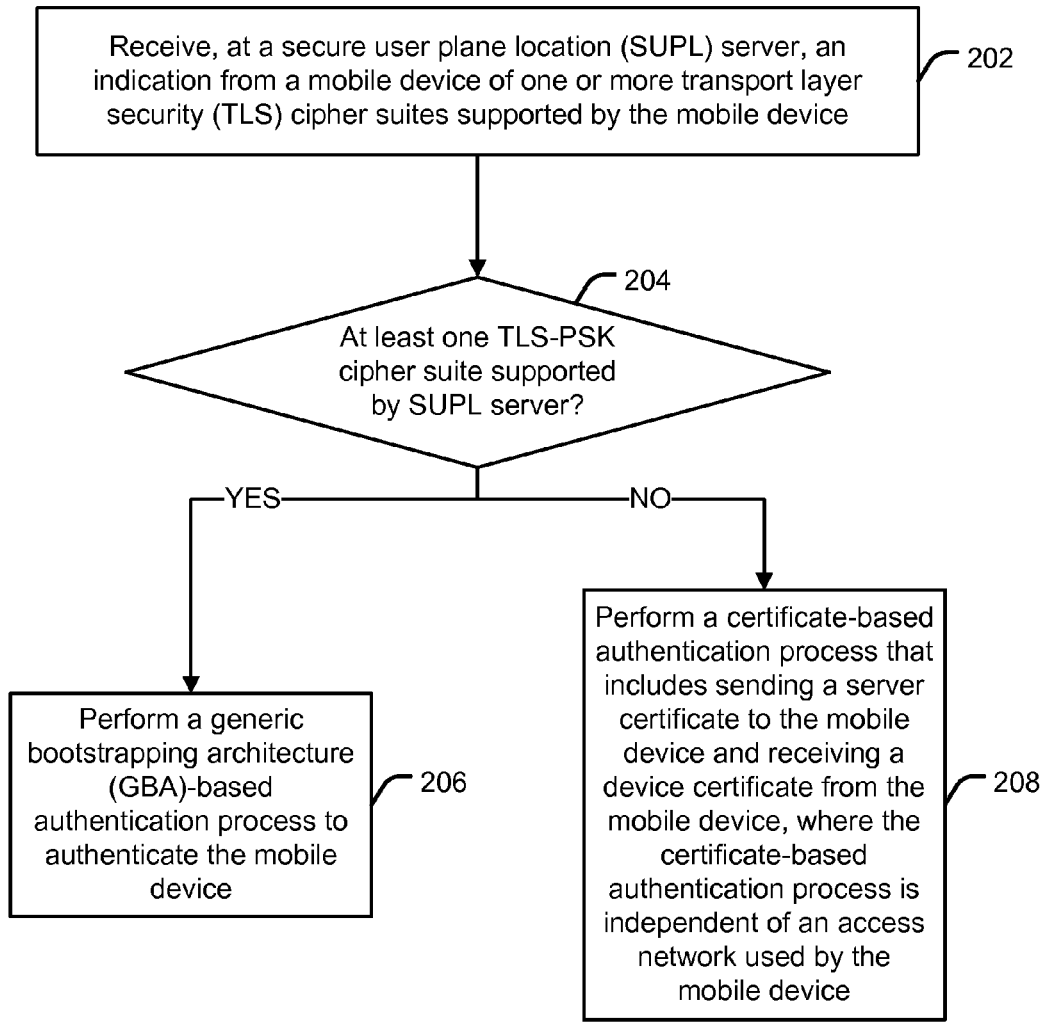
FIG. 2 is a flowchart to illustrate a particular embodiment of a method of negotiating authentication methods in a SUPL environment.

Referring to FIG. 2, a particular embodiment of a method of negotiating authentication methods in a SUPL environment is shown and generally designated 200. In an illustrative embodiment, the method 200 may be performed by the SUPL server 110 of FIG. 1.

The method 200 may include receiving, at a SUPL server, an indication from a mobile device of one or more TLS cipher suites supported by the mobile device, at 202. For example, in FIG. 1, the SUPL server 110 may receive the message 131 from the mobile device 120, where the message 131 indicates one or more TLS cipher suites supported by the mobile device 120.

The method 200 may also include determining whether at least one TLS-PSK cipher suite indicated by the mobile device is also supported by the SUPL server, at 204. For example, in FIG. 1, the SUPL server 110 may determine whether any TLS-PSK cipher suite supported by the mobile device 120 is also supported by the SUPL server 110.

In response to determining that a TLS-PSK cipher suite is commonly supported by the SUPL server and the mobile device, at 204, a GBA-based authentication process may be performed to authenticate the mobile device, at 206. For example, in FIG. 1, the SUPL server 110 may perform the GBA-based authentication procedure 134. In response to determining that a TLS-PSK cipher suite is not commonly supported by the SUPL server and the mobile device, at 204, a certificate-based authentication process may be performed, at 208. The certificate-based process may include sending a server certificate to the mobile device and receiving a device certificate from the mobile device and may be independent of an access network used by the mobile device. For example, in FIG. 1, the SUPL server 110 may perform a certificate-based authentication procedure including transmitting the server certificate 113 to the mobile device 120 via the message 132 and receiving the device certificate 123 from the mobile device 120 via the message 133.

In particular embodiments, the method 200 of FIG. 2 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 200 of FIG. 2 can be performed by a processor that executes instructions.

Figure 3:
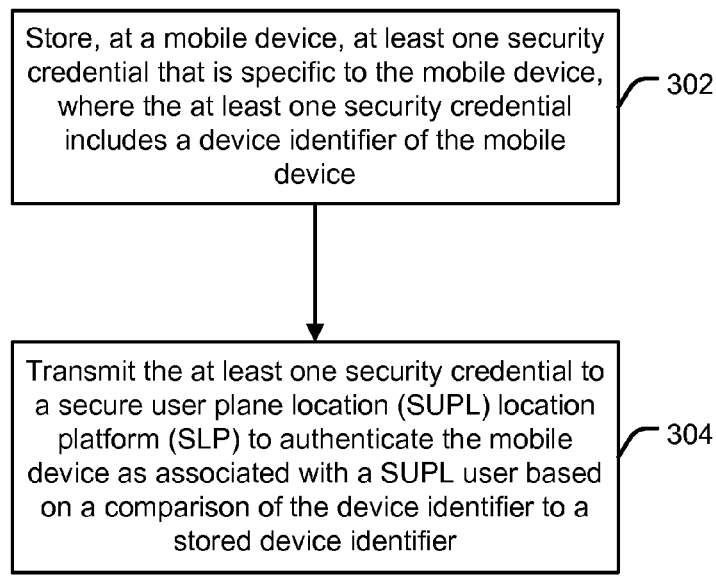
FIG. 3 is a flowchart to illustrate a particular embodiment of a method of performing authentication in a SUPL environment using certificates.

Referring to FIG. 3, a particular embodiment of a method of performing authentication in a SUPL environment using certificates is shown and generally designated 300. In an illustrative embodiment, the method 300 may be performed by the mobile device 120 of FIG. 1.

The method 300 may include storing, at a mobile device, at least one security credential that is specific to the mobile device, at 302. The at least one security credential may include a device identifier of the mobile device. For example, in FIG. 1, the mobile device 120 may store the device certificate 123 including the device ID 125 (e.g., an IMEI, a MSID, a serial number, or another globally unique identifier).

The method 300 may also include transmitting the at least one security credential to a SUPL location platform (SLP) to authenticate the mobile device as associated with a SUPL user based on a comparison of the device identifier to a stored device identifier, at 304. For example, in FIG. 1, the mobile device 120 may transmit the device certificate 123 to the SUPL server 110 (e.g., an SLP) via the message 133 so that the SUPL server 110 can authenticate the mobile device 120 as associated with a SUPL user based on a comparison of the device ID 125 to a stored device ID that was previously provided by another entity.

In particular embodiments, the method 300 of FIG. 3 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 300 of FIG. 3 can be performed by a processor that executes instructions.

Figure 4:
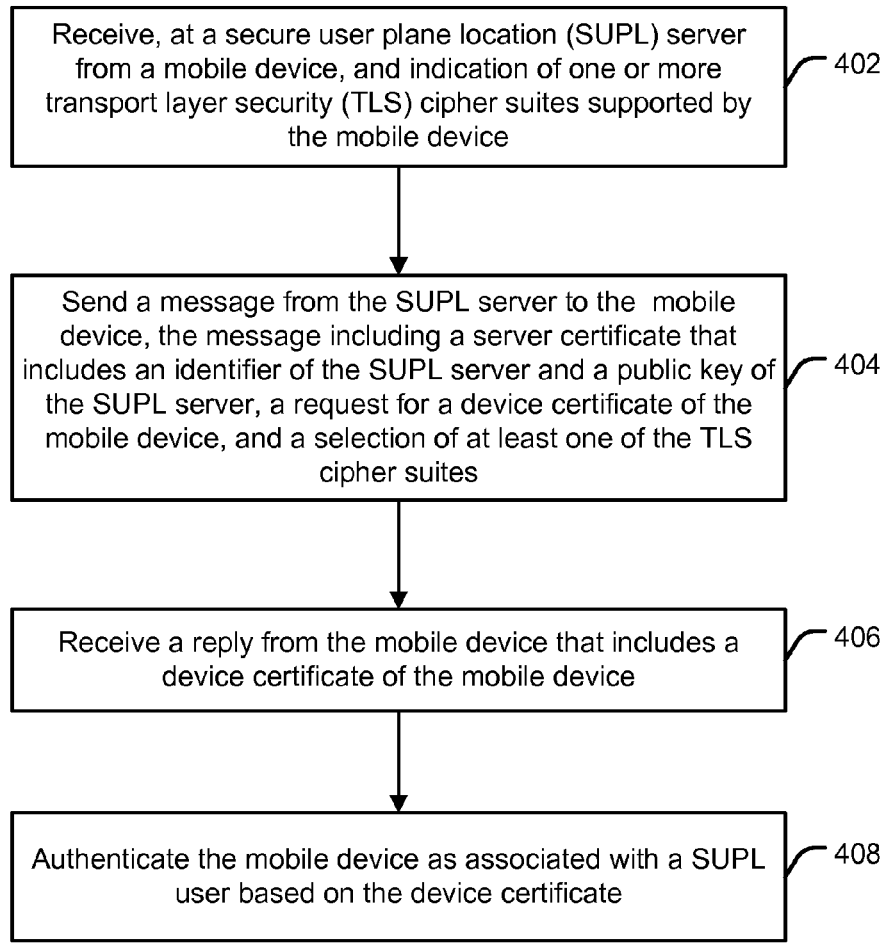
FIG. 4 is a flowchart to illustrate another particular embodiment of a method of performing authentication in a SUPL environment using certificates.

Referring to FIG. 4, another particular embodiment of a method of performing authentication in a SUPL environment using certificates is shown and generally designated 400. In an illustrative embodiment, the method 400 may be performed by the SUPL server 110 of FIG. 1.

The method 400 may include receiving, at a SUPL server from a mobile device, an indication of one or more TLS cipher suites supported by the mobile device, at 402. For example, in FIG. 1, the SUPL server 110 may receive the message 131 from the mobile device 120, where the message 131 indicates one or more TLS cipher suites supported by the mobile device 120.

The method 400 may also include sending a message from the SUPL server to the mobile device, at 404. The message may include a server certificate that includes an identifier of the SUPL server and a public key of the SUPL server, a request for a device certificate of the mobile device, and a selection of at least one of the TLS cipher suites. For example, in FIG. 1, the SUPL server 110 may send the message 132 to the mobile device 120, where the message 132 includes the server ID 115, the server public key 114, a request for the device certificate 123 of the mobile device 120, and a selection of a commonly supported TLS cipher suite.

The method 400 may further include receiving a reply from the mobile device that includes a device certificate of the mobile device, at 406. For example, in FIG. 1, the SUPL server 110 may receive the message 133 that includes the device certificate 123.

The method 400 may include authenticating the mobile device as associated with a SUPL user based on the device certificate, at 408. For example, in FIG. 1, the authentication logic 116 at the SUPL server 110 may authenticate the mobile device 120 as associated with a SUPL user based on the device certificate 123.

In particular embodiments, the method 400 of FIG. 4 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 400 of FIG. 4 can be performed by a processor that executes instructions.

Figure 5:
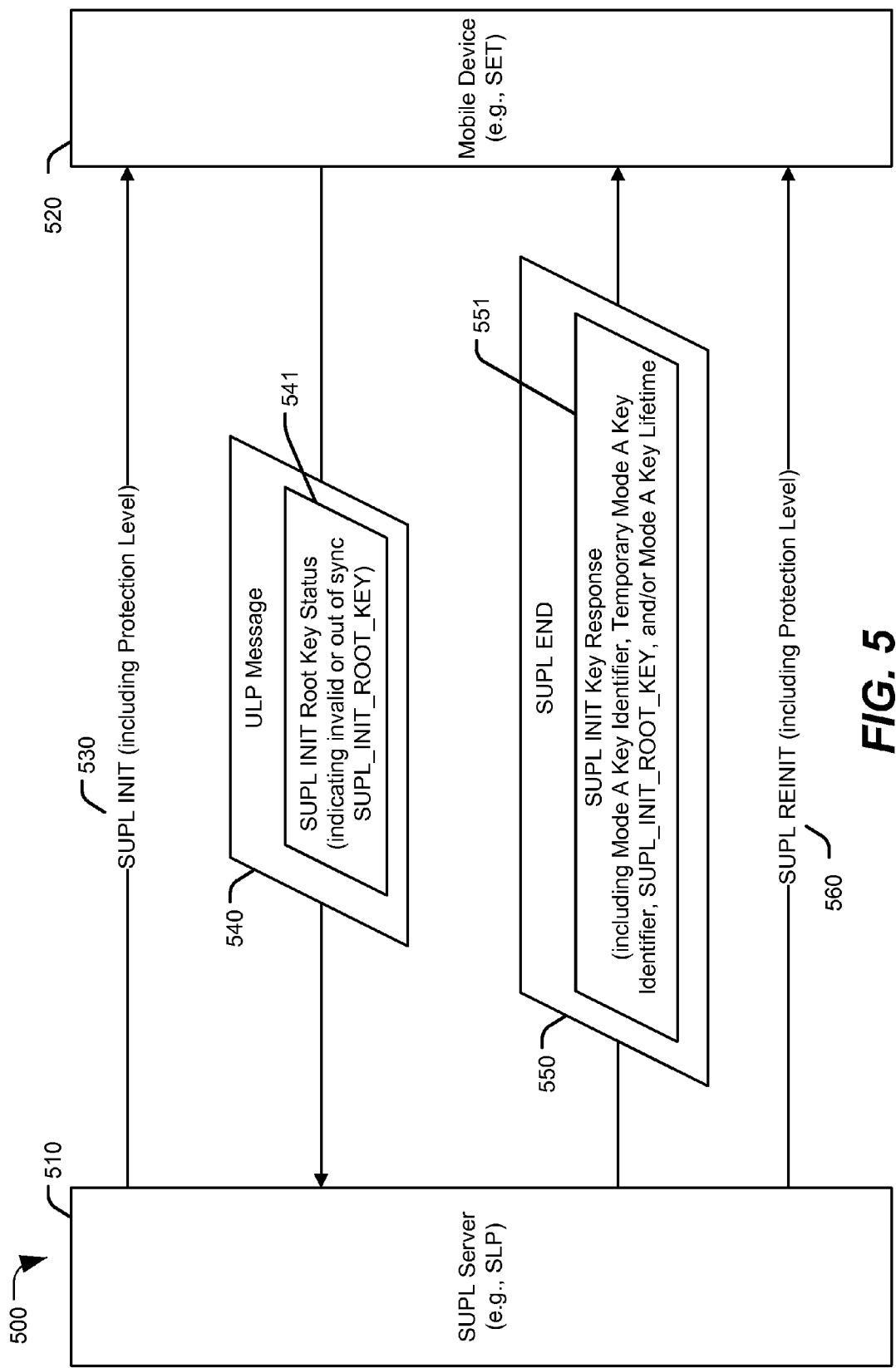
FIG. 5 is a diagram to illustrate particular embodiments of messaging between a SUPL server and a mobile device.

Regardless of which authentication method described with reference to FIGS. 1-4 is used, once authentication is complete, a SUPL server (e.g., SLP) and a mobile device (e.g., SET) may communicate regarding SUPL-based services during a SUPL session. Referring to FIG. 5, a particular embodiment of messages that may be exchanged between a SUPL server 510 and a mobile device 520 is shown and generally designated 500.

In a particular embodiment, the SUPL server 510 and the mobile device 520 may communicate via user location protocol (ULP) messages in the context of a SUPL session. For example, the SUPL server 510 may be configured to transmit a SUPL INIT message 530 to the mobile device 520. The SUPL INIT message 530 may represent a session initiation message that is transmitted by the SUPL server 110 to initiate a SUPL session. To protect against masquerading and re-play attacks, protection may be applied to the SUPL INIT message 530. In a particular embodiment, the SUPL INIT message 530 may include a Protection Level parameter. The Protection Level parameter may include at least one of a Level parameter (indicating whether Null, Mode A, or Mode B SUPL INIT protection is implemented) and a Protection parameter (e.g., including at least one of a Key Identifier Type and a Key Identifier). In a particular embodiment, Null SUPL INIT protection may not provide end-to-end integrity or replay protection, Mode A SUPL INIT protection may provide end-to-end integrity and replay protection by use of a shared key transmitted to the mobile device 520 by the SUPL server 510 during a secured ULP session, and Mode B SUPL INIT protection may provide end-to-end integrity and replay protection using a shared key derived from PSK-based methods (e.g., GBA or SEK methods).

In a particular embodiment, SUPL INIT protection may be implemented based on a session initiation key (e.g., a SUPL_INIT_ROOT_KEY). Upon receiving the SUPL INIT message 530, the mobile device 520 may determine whether the mobile device 520 has previously received a valid SUPL_INIT_ROOT_KEY from the SUPL server 510, and if so, whether the previously received SUPL_NIT_ROOT_KEY is still valid. If the mobile device 520 has a valid SUPL_INIT_ROOT_KEY, the mobile device 520 may authenticate the SUPL INIT message 530 using the SUPL_INIT_ROOT_KEY and may initiate a SUPL session with the SUPL server 510 in response to successful authentication of the SUPL INIT message 530.

In a particular embodiment, if the mobile device 520 does not have a valid SUPL_INIT_ROOT_KEY, the mobile device 520 may transmit a message to the SUPL server 510 and may receive a valid SUPL_INIT_ROOT_KEY in response to the message. For example, the mobile device 520 may transmit a message including a SUPL_INIT_KeyRequest parameter that represents a request for a valid SUPL_INIT_ROOT_KEY. Alternately, the mobile device 520 may indicate the presence of an invalid or out-of-sync SUPL INIT_ROOT_KEY instead of requesting a new SUPL_INIT_ROOT_KEY. For example, the mobile device 520 may transmit a ULP message 540 including a SUPL INIT Root Key Status parameter 541 that indicates whether a "current" SUPL_INIT_ROOT_KEY possessed by the mobile device 520 is invalid or out-of-sync. In a particular embodiment, the SUPL INIT Root Key Status parameter 541 may be included within a SET Capabilities parameter of the ULP message 540. It will be appreciated that including the SUPL INIT Root Key Status parameter 541 in the SET Capabilities parameter may enable transmission of SUPL_INIT_ROOT_KEY status information in messages defined in SUPL 2.0 that optionally or mandatorily include a SET Capabilities parameter without having to introduce a dedicated message for the purpose of transmitting SUPL_INIT_ROOT_KEY status information. In a particular embodiment, the SUPL INIT Root Key Status parameter 541 may be included within the SET Capabilities parameter for Mode A SUPL INIT protection, but not for NULL protection or Mode B SUPL INIT Protection.

It should be noted that the mobile device 520 may not indicate an invalid SUPL_INIT_ROOT_KEY for every network-initiated SUPL session. The mobile device 520 may have been provided the SUPL_INIT_ROOT_KEY once, and the provided key may then be valid for multiple network-initiated SUPL sessions before the key expires.

The SUPL server 510 may transmit a ULP message including a SUPL INIT Key Response parameter. For example, the SUPL Server 510 may transmit a SUPL END message 550 including a SUPL INIT Key Response parameter 551. It should be noted that the SUPL INIT Key Response may not be sent in direct response to the SUPL INIT Root Key Status indication; the SUPL INIT Key Response may be in a "regular" SUPL END message that may not be in the same SUPL session (e.g., if the SUPL session is not ended by a SUPL END message from the SLP to the SET). The SUPL INIT Key Response parameter 551 may include at least one of a Mode A Key Identifier, a Temporary Mode A Key Identifier, a SUPL_NIT_ROOT_KEY (e.g., a "new" SUPL_INIT_ROOT_KEY), and a Mode A Key Lifetime.

While a generic SUPL session (GSS) is active, the SLP (i.e., the SUPL server 510) may initiate communication with the SET (i.e., the mobile device 520). The SUPL server 510 may transmit a session re-initiation message (e.g., a SUPL REINIT message 560). SUPL REINIT protection may be implemented as described herein with reference to SUPL INIT protection. For example, if the mobile device 520 does not possess a valid SUPL_INIT_ROOT_KEY (the SUPL_INIT_ROOT_KEY may serve as both a session initiation key as well as a session re-initiation key), the mobile device 520 may indicate a lack of valid SUPL_INIT_ROOT_KEY via the SUPL INIT Root Key Status parameter 541 and may receive the SUPL END message 550 (including the SUPL INIT Key Response parameter 551) in response. When the mobile device 520 has a valid SUPL_INIT_ROOT_KEY, the mobile device 520 may authenticate the SUPL REINIT message 560 and may re-initiate the SUPL session with the SUPL server 510 in response to successful authentication of the SUPL REINIT message 560. In a particular embodiment, the SUPL REINIT message 560 may also include a Protection Level parameter, such as described herein with reference to the SUPL INIT message 530.

In a particular embodiment, the mobile device 520 may apply Null SUPL INIT protection and Null SUPL REINIT protection when the mobile device 520 does not have a valid SUPL_INIT_ROOT_KEY (e.g., at power up or when a lifetime of the possessed SUPL_INIT_ROOT_KEY has elapsed). When Null protection is in place, the mobile device 520 may handle all SUPL INIT and SUPL REINIT messages. If the mobile device 520 has a valid SUPL_INIT_ROOT_KEY, Mode A or Mode B protection may be applied.

Thus, as illustrated in FIG. 5, various messages and message parameters may be used to implement security in a SUPL system. For example, a Protection Level parameter may be used to indicate a level of SUPL INIT and SUPL REINIT protection. As another example, a SUPL INIT Root Key Status parameter may be used to indicate whether a current SUPL_INIT_ROOT_KEY is invalid or out-of-sync. As yet another example, a SUPL INIT Key Response parameter may be used to provide a "new" SUPL_INIT_ROOT_KEY.

Figure 6:
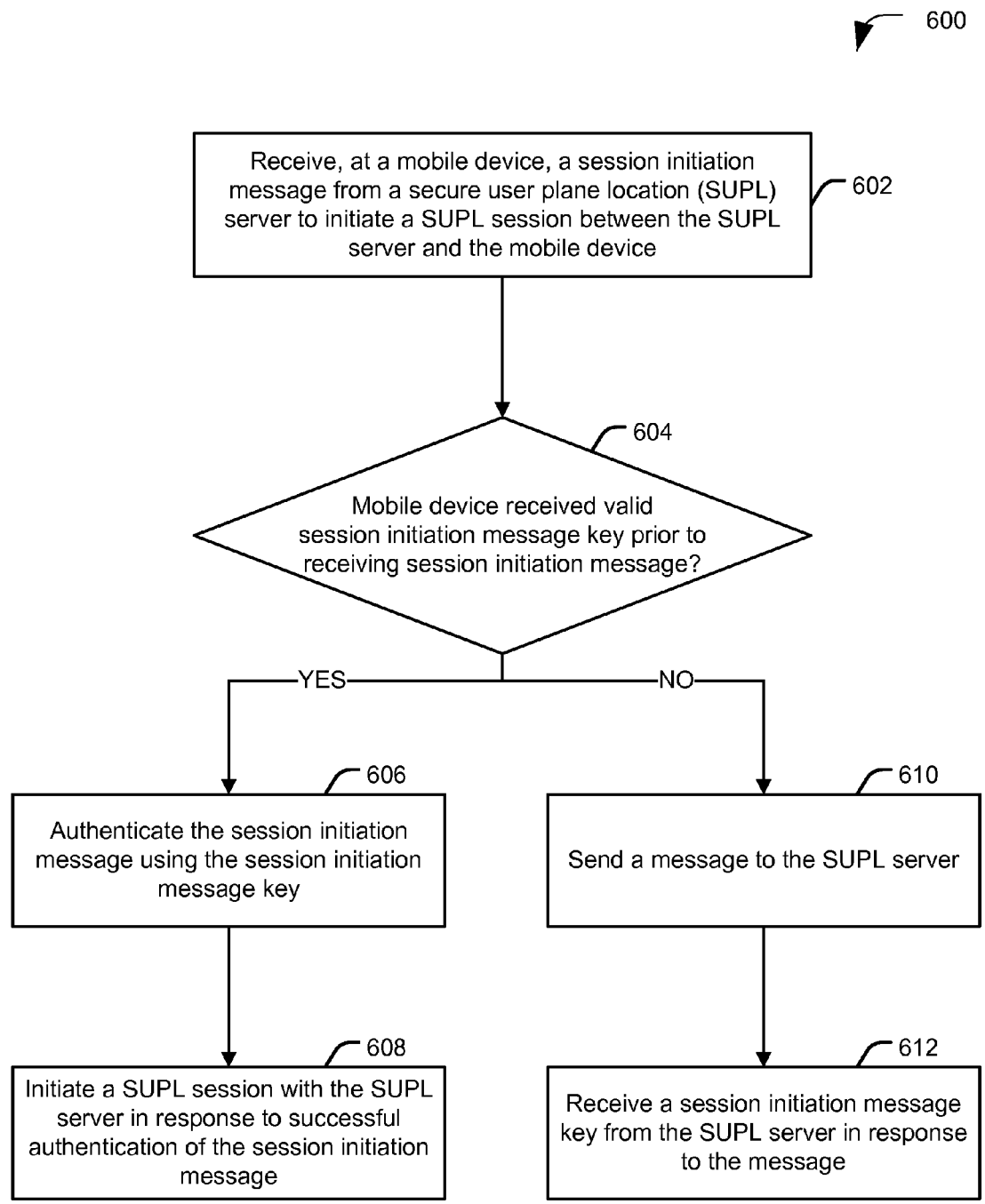
FIG. 6 is a flowchart to illustrate a particular embodiment of a method of authentication during session initiation in a SUPL environment.

Referring to FIG. 6, a particular embodiment of a method of authentication during session initiation in a SUPL environment is shown and generally designated 600. In an illustrative embodiment, the method 600 may be performed by the mobile device 520 of FIG. 5.

The method 600 may include receiving, at a mobile device, a session initiation message from a secure user plane location (SUPL) server to initiate a SUPL session between the SUPL server and the mobile device, at 602. For example, in FIG. 5, the mobile device 520 may receive the SUPL INIT message 530 from the SUPL server 510.

The method 600 may also include determining whether the mobile device received a valid session initiation message key prior to receiving the session initiation message, at 604. For example, in FIG. 5, the mobile device 520 may determine whether it possesses a valid SUPL INIT_ROOT_KEY.

When the mobile device has a valid session initiation message key, the method 600 may further include authenticating the session initiation message using the session initiation message key (e.g., SUPL_INIT_ROOT_KEY), at 606, and initiating a SUPL session with the SUPL server in response to successful authentication of the session initiation message, at 608. For example, in FIG. 5, the mobile device 520 may authenticate the SUPL INIT message 530 using the valid SUPL_INIT_ROOT_KEY and may initiate a SUPL session with the SUPL server 510.

When the mobile device does not have a valid session initiation message key, the method 600 may include sending a message to the SUPL server, at 610, and receiving a session initiation message key from the SUPL server in response to the message, at 612. To illustrate, the SLP and the SET may conduct a session with NULL SUPL INIT protection, and the SET may transmit an indication during the session that its SUPL_INIT_ROOT_KEY is invalid. For example, in FIG. 5, the mobile device 520 may transmit a message including the SUPL INIT Root Key Status parameter 541 to the SUPL server 510 and may receive a message in response that includes the SUPL INIT Key Response parameter 551.

In particular embodiments, the method 600 of FIG. 6 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 of FIG. 6 can be performed by a processor that executes instructions.

Figure 7:
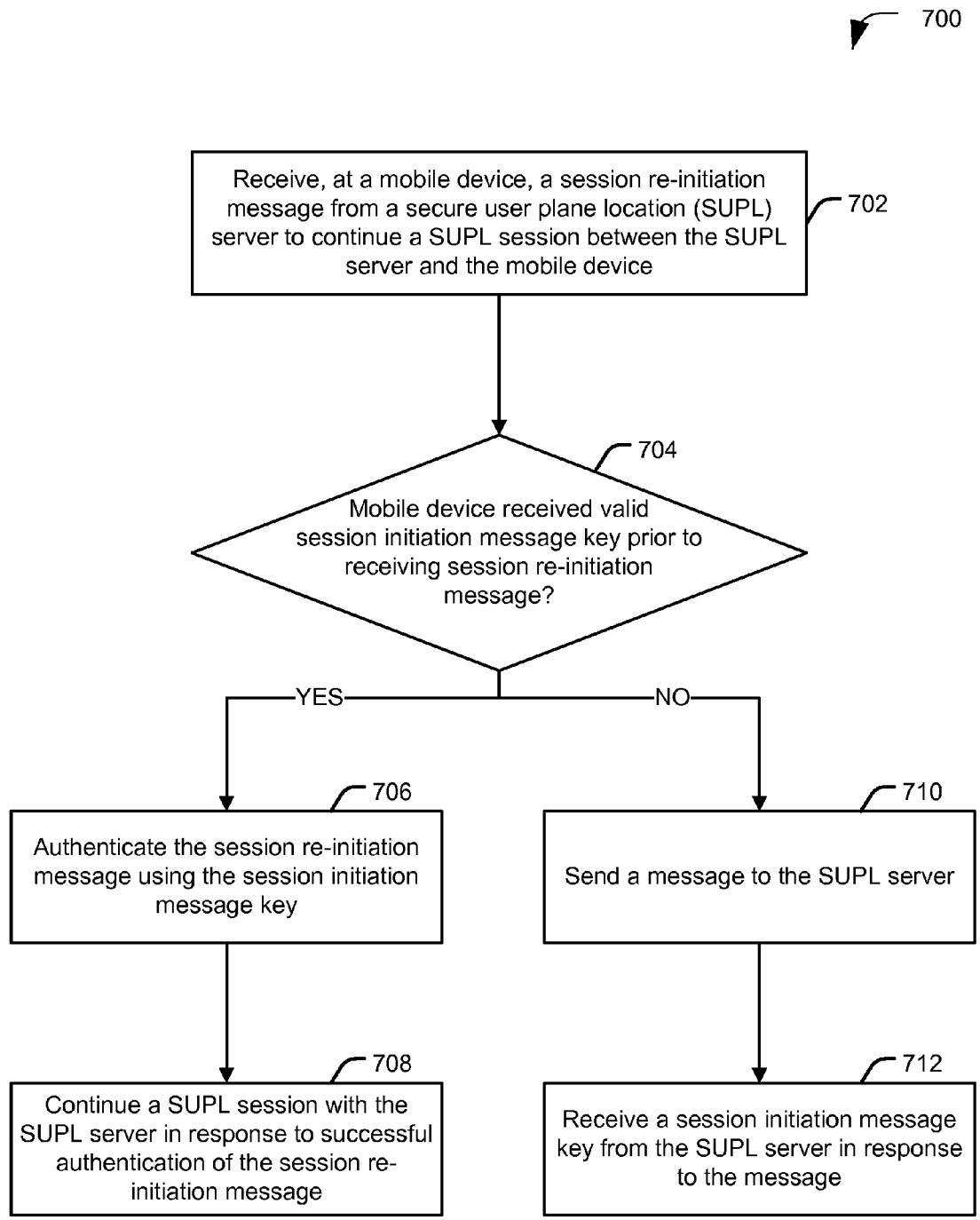
FIG. 7 is a flowchart to illustrate a particular embodiment of a method of authentication during session re-initiation in a SUPL environment.

Referring to FIG. 7, a particular embodiment of a method of authentication during session re-initiation in a SUPL environment is shown and generally designated 700. In an illustrative embodiment, the method 700 may be performed by the mobile device 520 of FIG. 5.

The method 700 may include receiving, at a mobile device, a session re-initiation message from a secure user plane location (SUPL) server to continue a SUPL session between the SUPL server and the mobile device, at 702. For example, in FIG. 5, the mobile device 520 may receive the SUPL REINIT message 560 from the SUPL server 510. The SUPL REINIT message 560 may represent a network initiated attempt to continue an existing generic SUPL session (GSS) between the SUPL server 510 and the mobile device 520.

The method 700 may also include determining whether the mobile device received a valid session initiation message key prior to receiving the session re-initiation message, at 704. For example, in FIG. 5, the mobile device 520 may determine whether it possesses a valid SUPL INIT_ROOT_KEY.

When the mobile device has a valid session initiation message key, the method 700 may further include authenticating the session re-initiation message using the session initiation message key, at 706, and continuing the SUPL session with the SUPL server in response to successful authentication of the session re-initiation message, at 708. For example, in FIG. 5, the mobile device 520 may authenticate the SUPL REINIT message 560 using the valid SUPL_NIT_ROOT_KEY and may re-initiate a SUPL session with the SUPL server 510.

When the mobile device does not have a valid session initiation message key, the method 700 may include sending a message to the SUPL server, at 710, and receiving a session initiation message key from the SUPL server in response to the message, at 712. To illustrate, the SLP and the SET may conduct a session with NULL SUPL INIT protection, and the SET may transmit an indication during the session that its SUPL_INIT_ROOT_KEY is invalid. For example, in FIG. 5, the mobile device 520 may transmit a message including the SUPL INIT Root Key Status parameter 541 to the SUPL server 510 and may receive a message in response that includes the SUPL INIT Key Response parameter 551.

In particular embodiments, the method 700 of FIG. 7 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 700 of FIG. 7 can be performed by a processor that executes instructions.

Figure 8:
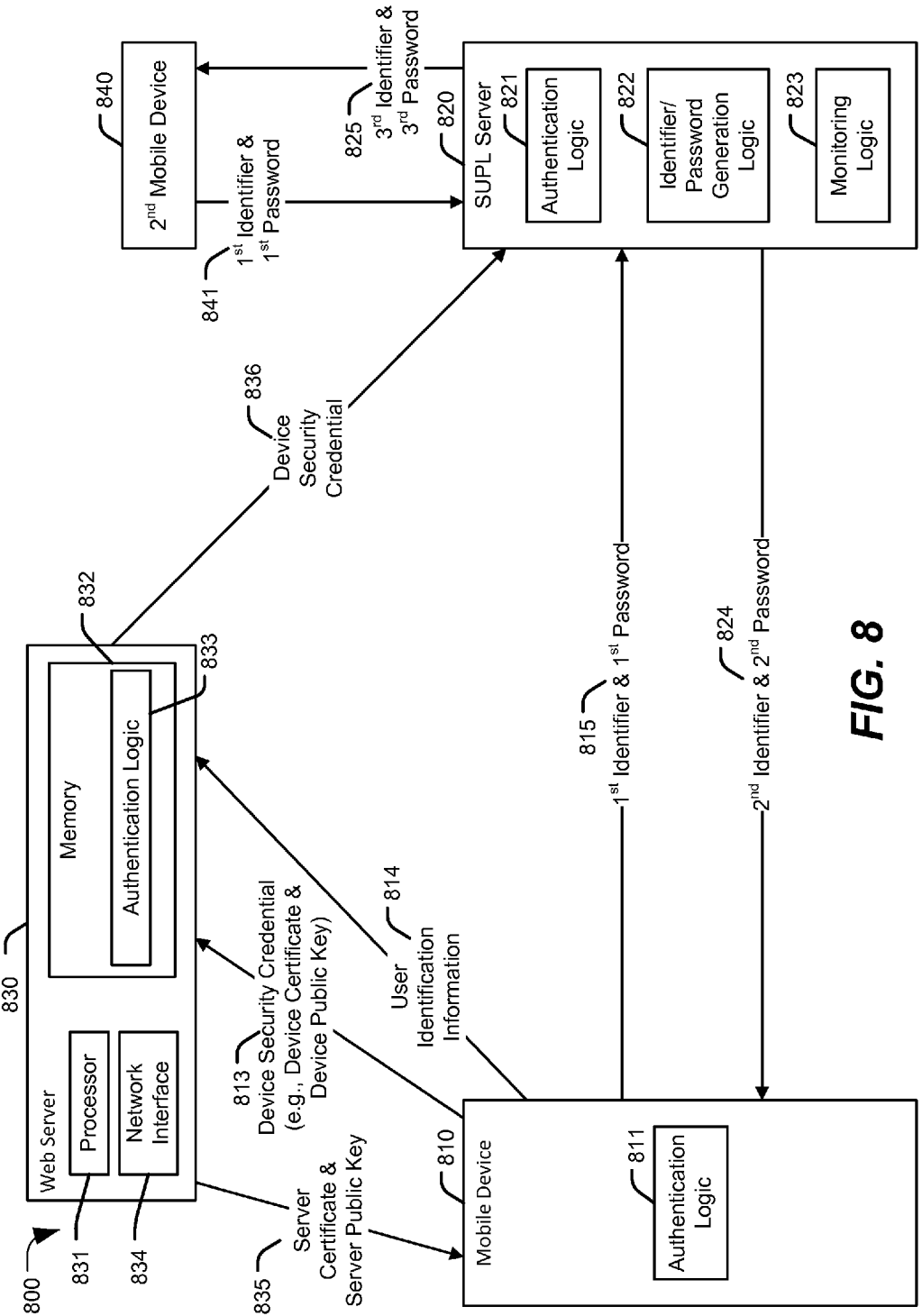
FIG. 8 is a diagram to illustrate a particular embodiment of authentication in a SUPL environment using a web server and multiple identifiers/passwords.

In a particular embodiment, mutual authentication between a mobile device and a SUPL server may be performed via methods other than certificate-based, GBA-based, SEK-based, ACA-based, and SLP-only methods. For example, FIG. 8 illustrates a particular embodiment of a system 800 operable to perform authentication in a SUPL environment using multiple identifiers/passwords. The system 800 includes a mobile device 810 (e.g., a SET) that is capable of communicating with a SUPL Server (e.g., a SLP) 820.

In addition to authentication based on multiple identifiers/passwords, the system 800 of FIG. 8 also illustrates a particular example of binding a device certificate to a SUPL user. For example, the system 800 may include a web server 830 to provide a mechanism to create a binding between a device certificate and a SUPL user. It should be noted that the web server 830 may not provide authentication for SUPL sessions, but rather provide binding information that may subsequently be used by an SLP during SUPL authentication. This binding may typically be performed only once, and may be performed before a SET can engage in SUPL sessions. Once binding is performed, a combination of device certificate and user information may be sent to an SLP, and the SLP may store this information and use it for client authentication. Thus, after binding is performed, an SLP may "know" that a certain mobile device belongs to a particular SUPL user. The web server 830 may include a processor 831 and a memory 832 storing instructions executable by the processor 831. For example, the instructions may represent authentication logic 833. The web server 830 may also include a network interface 834 operable to communicate with the mobile device 810 and with the SUPL server 820. It should be noted that the web server 830 is only one example of how to provide binding of a device certificate to a user. In other embodiments, other binding mechanisms may be used. Alternatively, the web server 830 may store the combination of device certificate and user information, and the SLP (upon performing mutual authentication of the device using the device certificate) may ask the web server 830 to provide the user information associated with that device certificate.

The mobile device 810 may include authentication logic 811 (e.g., instructions stored in a memory of the mobile device 810 and executable by a processor of the mobile device 810). The authentication logic 811 may be configured to communicate with corresponding authentication logic 833 at the web server 830 to associate (e.g., "bind" or "register") the mobile device 810 to a particular SUPL user. For example, the binding process may begin with the mobile device 810 receiving a message 835 from the web server 830, where the message 835 includes a server certificate of the web server 830 and a public key of the web server 830. The mobile device 810 may respond by transmitting a message 813 to the web server 830, where the message 813 includes a security credential of the mobile device 810. For example, the security credential of the mobile device 810 may include a device certificate including a public key, an international mobile equipment identity (IMEI), a mobile station identification (MSID), and/or a serial number of the mobile device 810. The mobile device 810 may also transmit a message 814 including user identification information (e.g., a user identifier and a password associated with a SUPL user) to the web server 830. One or both of the messages 813, 814 may be encrypted using the public key of the web server 830, and the web server 830 may decrypt the encrypted message(s) using a private key of the web server 830.

The web server 830 may authenticate the user identification information provided by the mobile device 810 to determine whether or not the user identification information is associated with an authorized user of a SUPL service. For example, the web server 830 may compare the provided user identification information with a SUPL user database that is located at or accessible to the web server 830. Upon verifying the user identification information, the web server 830 may complete the binding process by sending a message 836 to the SUPL server 820 to authenticate the mobile device 810 as associated with an authorized user of a SUPL service. The message 836 may include the security credential (e.g., a device certificate including device public key and IMEI, MSID, and/or serial number) of the mobile device 810.

The authentication logic 811 of the mobile device 810 may also be configured to communicate with corresponding authentication logic 821 at the SUPL server 820 to perform user-mode TLS-based mutual authentication prior to the start or re-start of a SUPL session. For example, the mobile device 810 may transmit a message 815 to the SUPL server 820, where the message 815 includes a first identifier and a first password. In a particular embodiment, the first password may be user-selected and may have relatively low cryptographic strength. In an illustrative embodiment, the first identifier and first password may correspond to the identifier and password transmitted by the mobile device 810 to the web server 830 via the message 814.

Upon receiving the first identifier and first password, the authentication logic 821 may authenticate the first identifier and first password as associated with an authorized user of a SUPL server. For example, the authentication logic 821 may verify that the first identifier and first password correspond to the authorized user that was previously bound to the mobile device 810. When authentication is successful, identifier/password generation logic 822 at the SUPL server 820 may generate a second identifier and a second password to replace the first identifier and the first password. In a particular embodiment, the second password may have greater cryptographic strength than the first password. The SUPL server 820 may transmit the second identifier and the second password to the mobile device 810 via a message 824. Upon subsequent receipt of the second identifier and the second password from the mobile device 810, the SUPL server 820 may establish a SUPL session with the mobile device 810. In a particular embodiment, the second identifier and second password may be kept hidden from a user of the mobile device 810 for security purposes.

Although the foregoing descriptions relate to a SUPL user being associated with a single mobile device (e.g., SET), a SUPL user may be associated with multiple devices. For example, the SUPL user associated with the mobile device 810 may also have access to a second mobile device 840. To authorize the second mobile device 840, the SUPL user may bind the second mobile device 840 to his or her account (e.g., SUPL account) in a manner similar to binding the first mobile device 810. To perform mutual authentication after the second mobile device 840 is bound to the account of the SUPL user, the second mobile device 840 may transmit a message 841 including the first identifier and the first password to the SUPL server 820. Upon authenticating the first identifier and the first password as associated with the authorized SUPL user, the SUPL server 820 may determine whether or not the second mobile device 840 should also be granted access to the SUPL service. For example, the SUPL server 820 may implement a devices-per-user limit and may determine whether allowing the second mobile device 840 to access the SUPL service would exceed a threshold number of mobile devices associated with the authorized user that are permitted to access the SUPL service. If allowing the second mobile device 840 to access the SUPL service would not exceed the threshold, the SUPL server 820 may send a message 825 including a third identifier and a cryptographically strong third password to the second mobile device 840. The third identifier and third password may replace the first identifier and the first password, and may subsequently be used by the second mobile device 840 to start a SUPL session.

In a particular embodiment, the third identifier and third password may be distinct from the second identifier and second password sent to the first mobile device 810. By providing distinct identifier/password combinations to each mobile device of a SUPL user, the SUPL server 820 may implement monitoring on a per device basis. For example, monitoring logic 823 at the SUPL server 820 may be configured to monitor usage of the SUPL service by the first mobile device 810 using the second identifier and to monitor usage of the SUPL service by the second mobile device 840 using the third identifier.

The system 800 of FIG. 8 may thus provide a binding process by which one or more mobile devices may be bound, registered, and/or associated with a particular SUPL user. It will be appreciated that the described binding process may selectively supplement authentication processes described with reference to FIGS. 1-4. For example, as described with reference to FIG. 1, the SUPL server 110 may attempt to identify a SUPL user as associated with the mobile device 120 by comparing the device ID 125 of the mobile device to a stored device ID that was previously securely verified by the SUPL user. In an illustrative embodiment, the SUPL server 110 of FIG. 1 may be the SUPL server 820, the mobile device 120 of FIG. 1 may be the mobile device 810, and the stored device ID may be included in the device security credential provided to the SUPL server 820 via the message 836 during the binding process.

In addition, the system 800 of FIG. 8 may provide an authentication process that may selectively replace authentication processes described with reference to FIGS. 1-4. For example, particular embodiments may involve using the multiple identifiers/passwords authentication process of FIG. 8 in lieu of GBA-based mutual authentication, SEK-based mutual authentication, and/or certificate-based mutual authentication.

Figure 9:
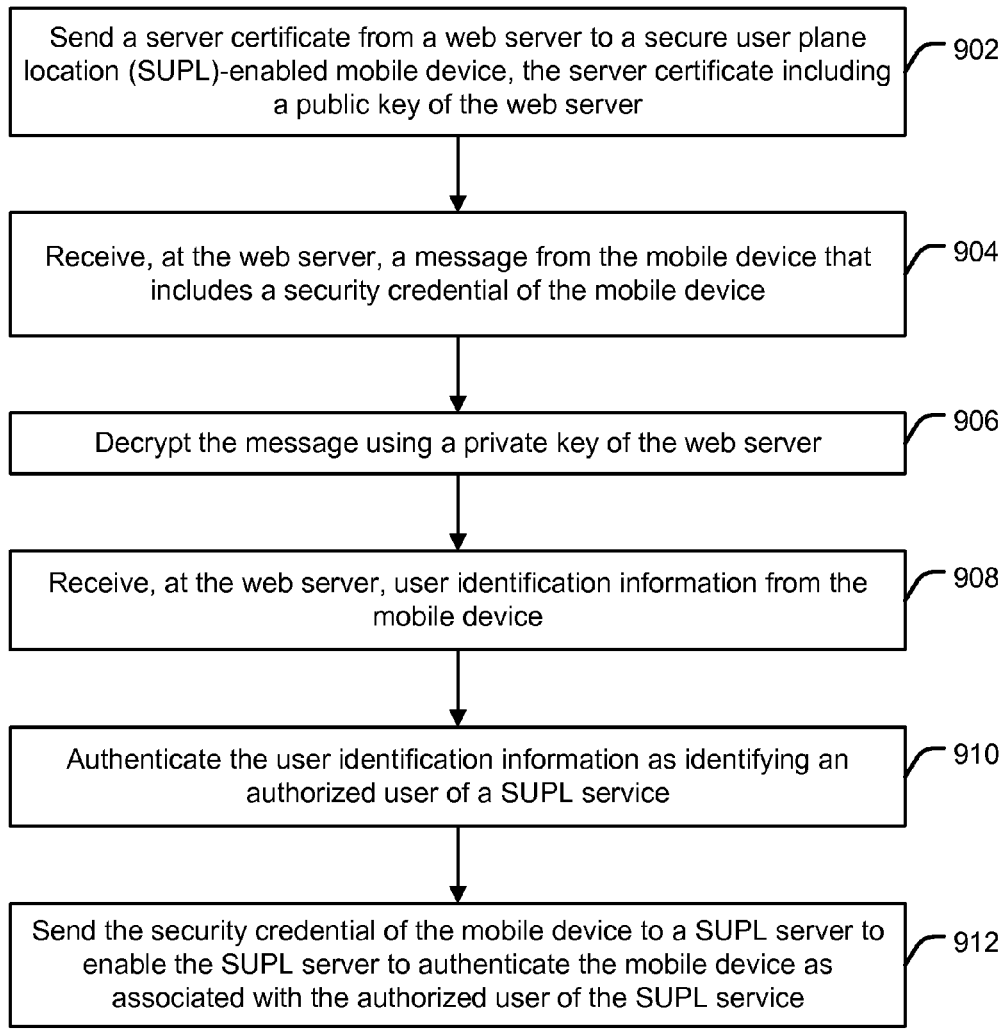
FIG. 9 is a flowchart to illustrate a particular embodiment of a method of authentication in a SUPL environment using a web server.

Referring to FIG. 9, a particular embodiment of a method of authentication in a SUPL environment using a web server is shown and generally designated 900. In an illustrative embodiment, the method 900 may be performed by the web server 830 of FIG. 8.

The method 900 may include sending a server certificate from a web server to a SUPL-enabled mobile device, at 902. The server certificate may include a public key of the web server. For example, in FIG. 8, the web server 830 may send the message 835 to the mobile device 810, where the message 835 includes the certificate and the public key of the web server 830.

The method 900 may also include receiving, at the web server, a message from the mobile device that includes a security credential of the mobile device, at 904. For example, in FIG. 8, the web server 830 may receive the message 813 from the mobile device 810, where the message 813 includes the security credential (e.g., device certificate and device public key) of the mobile device 810.

The method 900 may further include decrypting the message using a private key of the web server, at 906, and receiving user identification information from the mobile device, at 908. For example, in FIG. 8, the web server 830 may decrypt the message 813 using a private key and may receive user identification information (e.g., an identifier and password) form the mobile device 810 via the message 814. Alternately, or in addition, the user identification information may also be decrypted using the private key of the web server.

The method 900 may include authenticating the user identification information as identifying an authorized user of a SUPL service, at 910, and sending the security credential of the mobile device to a SUPL server to enable the SUPL server to authenticate the mobile device as associated with the authorized user of the SUPL service, at 912. For example, in FIG. 8, the web server 830 may authenticate the user identification information as identifying an authorized SUPL user and may transmit the device security credential to the SUPL server 820 via the message 836.

In particular embodiments, the method 900 of FIG. 9 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 900 of FIG. 9 can be performed by a processor that executes instructions.

Figure 10:
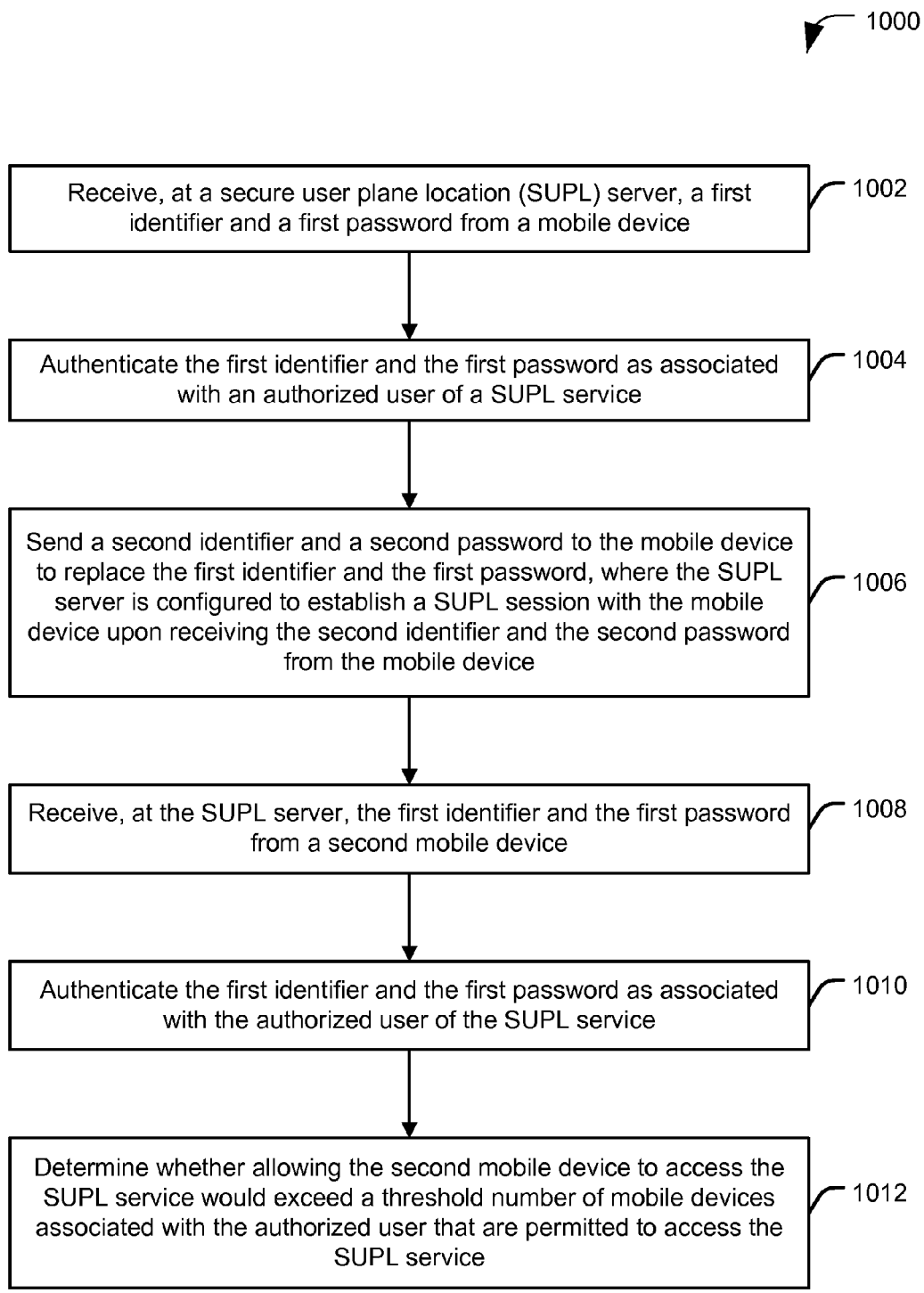
FIG. 10 is a flowchart to illustrate a particular embodiment of a method of authentication in a SUPL environment using multiple identifiers/passwords.

Referring to FIG. 10, a particular embodiment of a method of authentication in a SUPL environment using multiple identifiers/passwords is shown and generally designated 1000. In an illustrative embodiment, the method 1000 may be performed by the SUPL server 820 of FIG. 8.

The method 1000 may include receiving, at a SUPL server, a first identifier and a first password from a mobile device, at 1002, and authenticating the first identifier and the first password as associated with an authorized user of a SUPL service, at 1004. For example, in FIG. 8, the SUPL server 820 may receive the first identifier and the first password from the mobile device 810 via the message 815, and may authenticate the first identifier and the first password as associated with an authorized user (e.g., an authorized user previously bound to the mobile device 810).

The method 1000 may also include sending a second identifier and a second password to the mobile device to replace the first identifier and the first password, at 1006. The SUPL server may be configured to establish a SUPL session with the mobile device upon receiving the second identifier and the second password from the mobile device. For example, in FIG. 8, the SUPL server 820 may generate and send the second identifier and second password to the mobile device 810 via the message 824, and may establish a SUPL session with the mobile device 810 upon subsequent receipt of the second identifier and the second password.

The method 1000 may further include receiving, at the SUPL server, the first identifier and the first password from a second mobile device, at 1008, and authenticating the first identifier and the first password as associated with the authorized user of the SUPL service, at 1010. For example, in FIG. 8, the SUPL server 820 may receive the first identifier and the first password from the second mobile device 840 via the message 841 and may authenticate the first identifier and first password as associated with the authorized user. To illustrate, the second mobile device 840 may also have previously been bound to the authorized user via the method 900 of FIG. 9.

The method 1000 may include determining whether allowing the second mobile device to access the SUPL service would exceed a threshold number of mobile devices associated with the authorized user that are permitted to access the SUPL service, at 1012. For example, in FIG. 8, the web server 820 may determine whether allowing the second mobile device 840 to access the SUPL service would exceed the threshold. In a particular embodiment, when allowing the second mobile device 840 to access the SUPL service would not exceed the threshold, the web server 820 may transmit the third identifier and third password to the second mobile device via the message 825. The web server 820 may also monitor usage of the SUPL service by the first mobile device 810 and the second mobile device 840.

In particular embodiments, the method 1000 of FIG. 10 may be implemented via a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1000 of FIG. 10 can be performed by a processor that executes instructions.

Figure 11:
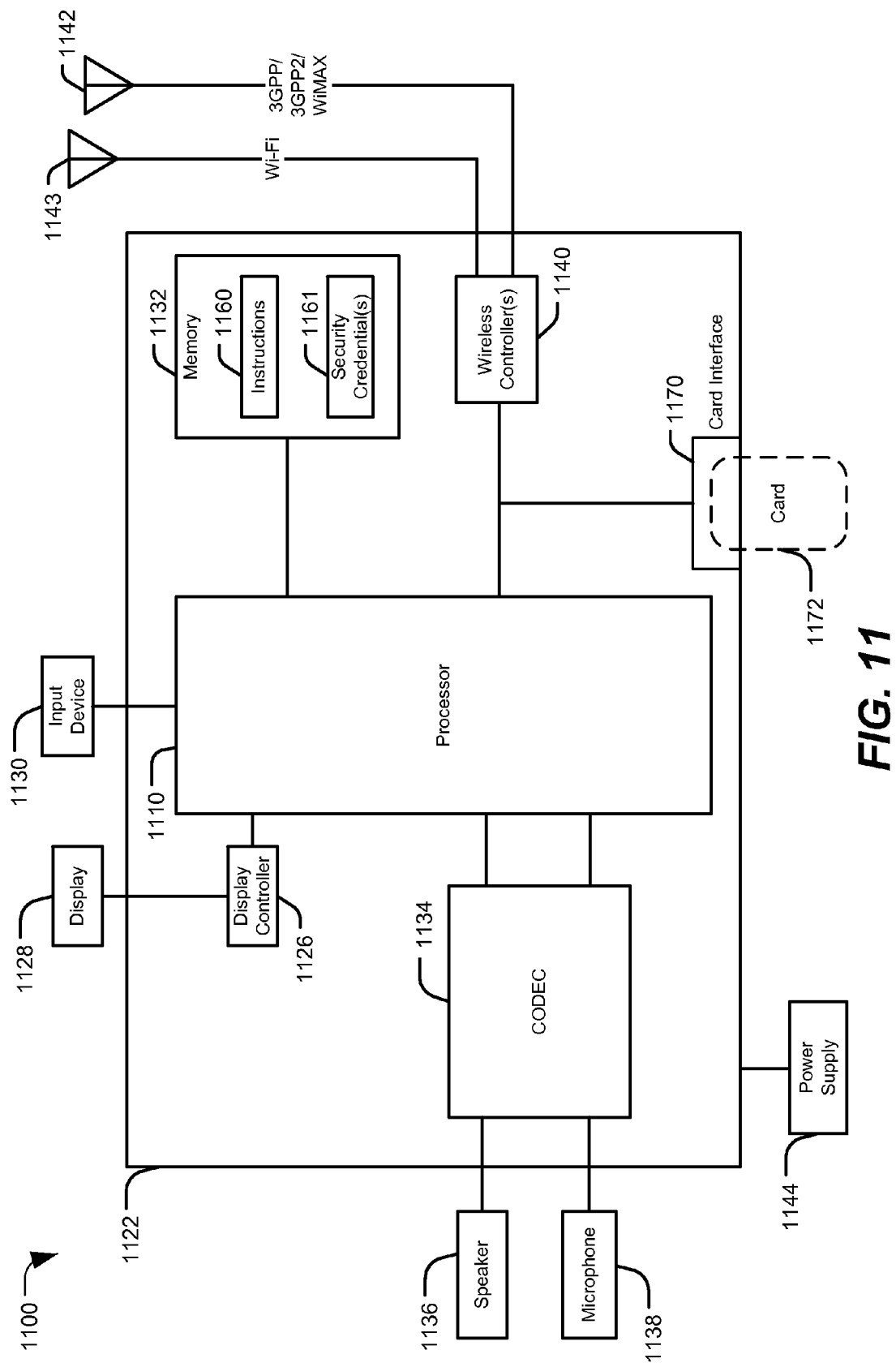
FIG. 11 is a block diagram of a particular embodiment of a wireless device that implements a SET.

Referring to FIG. 11, a block diagram of a particular illustrative embodiment of a wireless communication device is depicted and generally designated 1100. For example, the device 1100 may be a SUPL-enabled terminal (SET), such as the mobile device 120 of FIG. 1, the mobile device 520 of FIG. 5, the first mobile device 810 of FIG. 8, or the second mobile device 840 of FIG. 8.

The device 1100 includes a processor 1110 coupled to a memory 1132. The memory 1132 may include instructions 1160 executable by the processor 1110 to perform methods and processes disclosed herein, such as the method 300 of FIG. 3, the method 600 of FIG. 6, the method 700 of FIG. 7, or any combination thereof.

FIG. 11 also shows a display controller 1126 that is coupled to the processor 1110 and to a display 1128. A CODEC 1134 may be coupled to the processor 1110 and to a speaker 1136 and a microphone 1138. FIG. 11 also indicates that one or more wireless controllers 1140 can be coupled to the processor 1110 and to wireless antennas 1142, 1143. In a particular embodiment, the antenna 1142 may be a 3GPP, 3GPP2, and/or WiMAX antenna and the antenna 1143 may be a Wi-Fi antenna. A card interface 1170 may also be coupled to the processor 1110 and to the wireless controller(s) 1140. The card interface 1170 may be configured to accommodate a card 1172 (e.g., a subscriber identity module (SIM) card, a universal integrated circuit card (UICC), or other card) storing security credential(s) of the device 1100. For example, the security credential may include a device certificate, a public/private key pair, an IMEI, a MSID, a serial number, a globally unique identifier, or any combination thereof. Alternately, or in addition, the security credential(s) of the device 1100 may be stored in a "secure" (e.g., not modifiable and/or not accessible by a user) location of the memory 1132, such as security credential(s) 1161.

In a particular embodiment, the processor 1110, the display controller 1126, the memory 1132, the CODEC 1134, the wireless controller(s) 1140, and the card interface 1170 are included in a system-in-package or system-on-chip device (e.g., a mobile station modem (MSM)) 1122. In a particular embodiment, an input device 1130, such as a touchscreen and/or keypad, and a power supply 1144 are coupled to the system-on-chip device 1122. Moreover, in a particular embodiment, as illustrated in FIG. 11, the display 1128, the input device 1130, the speaker 1136, the microphone 1138, the wireless antennas 1142 and 1143, and the power supply 1144 are external to the system-on-chip device 1122. However, each of the display 1128, the input device 1130, the speaker 1136, the microphone 1138, the wireless antennas 1142 and 1143, and the power supply 1144 can be coupled to a component of the system-on-chip device 1122, such as an interface or a controller.

In conjunction with the described embodiments, an apparatus is disclosed that includes means for storing at least one security credential that is specific to a mobile device. For example, the means for storing may be the memory 122 of FIG. 2, the memory 1132 of FIG. 11, the card 1172 of FIG. 11, one or more devices configured to store data, or any combination thereof. The apparatus may also include means for causing the mobile device to transmit the at least one security credential to a SLP to authenticate the mobile device as associated with a SUPL user. For example, the means for causing may be the processor 121 of FIG. 1, the processor 1110 of FIG. 11, the wireless controller(s) 1140 of FIG. 1, one or more devices configured to cause transmission of data, or any combination thereof.

In addition, an apparatus is disclosed that includes means for receiving, at a web server, a message from a SUPL-enabled mobile device, where the message includes a security credential of the mobile device. For example, the means for receiving the message may be the network interface 834 of FIG. 8, one or more devices configured to receive data, or any combination thereof. The apparatus also includes means for receiving, at the web server, user identification information from the mobile device. For example, the means for receiving the user identification information may be the network interface 834 of FIG. 8, one or more devices configured to receive data, or any combination thereof. The apparatus also includes means for authenticating the user identification information as identifying an authorized user of a SUPL service. For example, the means for authenticating may be the processor 831 of FIG. 8, one or more devices configured to authenticate user identification information, or any combination thereof. The apparatus includes means for sending the security credential of the mobile device to a SUPL server to enable the SUPL server to authenticate the mobile device as associated with the authorized user of the SUPL service. For example, the means for sending may be the network interface 834 of FIG. 8, one or more devices configured to receive data, or any combination thereof.

Further, an apparatus is disclosed that includes means for receiving, at a SUPL server, a first identifier and a first password from a mobile device. For example, the means for receiving may be a network interface of the SUPL server 820 of FIG. 8, one or more devices configured to receive data, or any combination thereof. The apparatus also includes means for authenticating the first identifier and the first password as associated with an authorized user of a SUPL service. For example, the means for authenticating may include a processor, such as the processor 111 of FIG. 1, programmed to execute the authentication logic 821 of FIG. 8, one or more devices configured to authenticate an identifier and a password, or any combination thereof. The apparatus further includes means for sending a second identifier and a second password to the mobile device to replace the first identifier and the first password, where the SUPL server is configured to establish a SUPL session with the mobile device upon receiving the second identifier and the second password from the mobile device. For example, the means for sending may be a network interface of the SUPL server 820, one or more devices configured to send data, or any combination thereof. The apparatus may include means for generating the second identifier and the second password. For example, the means for generating may include a processor, such as the processor 111 of FIG. 1, programmed to execute the identifier/password generation logic 822 of FIG. 8, one or more devices configured to generate an identifier and a password, or any combination thereof.

In particular embodiments, all or a portion of aforementioned systems and methods may be further described with reference to, and/or may be selectively replaced, individually or in combination, by systems and methods described with reference to the Additional Embodiments below:

Additional Embodiment 1

Introduction
 Security in SUPL 2.0 is access network specific:
  Alternative client authentication (ACA) requires access to core network to identify SET based on Source IP Address
  GBA only applicable to 3GPP/3GPP2 networks
  SEK only applicable to WiMAX networks
 A new requirement in SUPL 3.0 calls for an authentication mechanism applicable to all access networks. This embodiment describes a new security mechanism applicable to all access networks:
 Simple framework supporting both GBA and "username/password" authentication
 A single TLS variant may be used
 Minimal changes to specification and implementation
Concept Overview
 ULP Security
  TLS with Server certificates
  Two Client Authentication modes
   (User mode): (User_ID, User_secret)=(Username, Password)
   (GBA Mode): (User_ID, User_secret)=(B-TID, Ks_NAF)
  (User_ID, Counter, Digest) added to all messages, with Digest computed as
   A1=SLP_Domain||ULP_Message,
   Digest=HMAC(User_secret, A1)
  Sender adds (User_ID, Counter, Digest) to all messages, Receiver verifies
  ULP used to update SUPL INIT credentials
 SUPL INIT Protection [e.g., non-emergency only]
  Mimics ULP v2.0 Basic SUPL INIT Protection
  Uses SUPL INIT credentials provided by SLP via ULP
Setup Details
 Offline
 (User Mode) User and SLP agree on (Username, Password)
  SLP may provide (Username, Password) to User
  User may provide (Username, Password) to SLP
  This is available to both H-SLP or A-SLP.
 At SET start up
  (User Mode)
  User enters (Username, Password) to SUPL Client
  (GBA Mode)
  SET bootstraps with BSF to obtain (B-TID, Ks)
  Note, SET can refresh (B-TID, Ks) as often as required
  SUPL Client performs a ULP session with SLP to obtain fresh SUPL INIT credentials ULP Session Security Proposal
  May use TLS with Server certificates
  Takes care of Server Authentication
  Add new parameters to ULP messages
    (User_ID, Req_Count, Req_Digest) to messages from SET,
    (User_ID, Resp_Count, Resp_Digest) to messages from SLP
  SET originated messages
    SET adds (User_ID, Req_Count, Req_Digest)
    SLP verifies Req_Count and Req_Digest before processing message contents
  SLP originated messages
    SLP adds (User_ID, RespCounter, Resp_Digest)
    SET verifies Resp_Count and Resp_Digest before processing message contents
  Req_Count/Resp_Count
    Req_Count/Resp_Count have similar behavior
    Purpose of the counters are to enable replay detection
    Req_Count/Resp_Count is reset in receiver and sender every ULP Session
    That is, the counter is reset when Session Identifier is changed.
    At Sender
      Req_Count/Resp_Count is incremented every message and added to ULP message
    At Receiver:
      Receiver compares Req_Count/Resp_Count against the value they expected. If they detect replay, then they exit with an error. Otherwise, message passes replay protection
  Req_Digest/Resp_Digest Generation
    Req_Digest/Resp_Digest generation may be identical
      Insert all known values into ULP_Message fields.
      Form ULP_Message_Z as ULP_Message with Req_Digest/Resp_Digest field set to all zeroes
      Form DigestPayload=SLP_Domain ":" ULP_Message_Z
      Compute Req_Digest/Resp_Digest=HMAC-SHA256-32(User_secret, DigestPayload)
      Add Req_Digest/Resp_Digest to appropriate field in ULP_Message
    (User mode)
      Use (User_ID, User_secret):=(Username, Password)
    (GBA Mode)
      Use (User_ID, User_secret):=(B-TID, Ks_NAF), where
      [SET] Generate Ks_NAF from Ks and SLP URL
      [SLP] Once it extracts User_ID field, SLP provides B-TID to BSF and BSF returns with Ks_NAF. Ks_NAF will not change unless B-TID changes.
SUPL_INIT Security Proposal
  Mimics Basic SUPL INIT Protection already defined in ULP TS V2.0 Section 6.1.6.6:
  Adapted description from GBA-provisioned keys to SLP-Provisioned keys
  SLP updates (Key Identifier, SUPL_INIT_ROOT_KEY) during a ULP Session at initiative of Client or SLP
  BasicReplayCounter is reset when Key Identifier is reset
  Minimal standardization effort required.
SUPL_INIT Credential Management
  Occurs in first ULP exchange of any connection session.
  SET-Originated Messages
    First message of session should include either
    "SUPL_INIT_Credential_Req" indicator if no credentials available, or
    Current_Key_Identifier to allow SLP to detect if SET and SLP are out of sync.
  SLP-originated messages
    If Current_Key_Identifier is correct, then add a "SUPL_INIT_Credential_OK" indicator to confirm.
    If Current_Key_Identifier is incorrect, or SET sent "SUPL_INIT_Credential_Req" indicator or Server wishes to update SUPL_INIT Credentials, then the SLP adds a field to ULP message for provisioning SUPL_INIT credentials
    Contains (Key Identifier, SUPL_INIT_ROOT_KEY)
Example Call Flows—SI Immediate Fix
  Step A: The Target SET sets the req_count to 1234 (or any other running number as determined by the SET) and calculates the message digest (req_digest). The Target SET sends a SUPL START(user-id, req_count=1234, req_digest, . . . ) message to the H-SLP.
  Step B: The H-SLP checks the authenticity of SUPL START using the received message digest (req_digest) and also checks the replay counter (req_count). The H-SLP sets the res_count to 4321 (or any other running number as determined by the SET) and calculates the message digest (res_digest). The H-SLP sends a SUPL RESPONSE (user-id, res_count=4321, res_digest, . . . ) message to the Target SET. The period between SUPL START and SUPL RESPONSE at the Target SET=UT1.
  Step C: The Target SET checks the authenticity of SUPL RESPONSE using the received message digest (res_digest) and also checks the replay counter (res_count). The Target SET increments the req_count by one (1234+1) and calculates the message digest (req_digest). The Target SET sends a SUPL POS INIT (user-id, req_count=1234+1, req_digest . . . ) message to the H-SLP. The period between SUPL RESPONSE and SUPL POS INIT at the H-SLP=ST1.
  Step D: The Target SET and the H-SLP engage in a SUPL POS exchange. The period between SUPL POS INIT and SUPL POS at the Target SET=UT2. Each side checks the message authenticity based on the received message digest and replay integrity based on the message counter (req_count/res_count).
  Step E: The H-SLP checks the authenticity of the last SUPL POS message received using the received message digest (req_digest) and also checks the replay counter (req_count). The H-SLP increments req_count (4321+1) and calculates the message digest (res_digest). The H-SLP sends a SUPL END (user-id, res_count=4321+1, res_digest, . . . ) message to the Target SET. The Target SET checks the authenticity of SUPL END using the received message digest (res_digest) and also checks the replay counter (res_count). The period between SUPL POS and SUPL END at the Target SET=UT3.
Example Call Flows—NI Immediate Fix
  Step A: The H-SLP sets the res_count to 1234 (or any other running number as determined by the H-SLP) and calculates the message digest (BasicMAC). The H-SLP sends a SUPL_INIT (user-id, res_count=4321, BasicMAC, . . . ) message to the Target SET.
  Step B: The Target SET checks the authenticity of SUPL_INIT using the received message digest (BasicMAC) and also checks the replay counter (res_count). The Target SET sets the req_count to 1234 (or any other running number as determined by the SET) and calculates the message digest (req_digest). The Target SET sends a SUPL POS INIT (user-id, req_count=1234, req_ digest, . . . ) message to the H-SLP. The period between SUPL_INIT and SUPL POS INIT at the H-SLP=ST1.

Step C: The Target SET and the H-SLP engage in a SUPL POS exchange. The period between SUPL POS INIT and SUPL POS at the Target SET=UT2. Each side checks the message authenticity based on the received message digest and replay integrity based on the message counter (req_count/res_count).

Step D: The H-SLP checks the authenticity of the last SUPL POS message received using the received message digest (req_digest) and also checks the replay counter (req_count). The H-SLP increments req_count (4321+1) and calculates the message digest (res_digest). The H-SLP sends a SUPL END (user-id, res_count=4321+1, res_digest, . . . ) message to the Target SET. The Target SET checks the authenticity of SUPL END using the received message digest (res_digest) and also checks the replay counter (res_count). The period between SUPL POS and SUPL END at the Target SET=UT3.

Additional Embodiment 2

Introduction
  Security in SUPL 2.0 is access network specific:
    ACA requires access to the core network to identify SET based on Source IP Address
    GBA only applicable to 3GPP/3GPP2 networks
    SEK only applicable to WiMAX networks
  A new requirement in SUPL 3.0 calls for an authentication mechanism applicable to all access networks. This embodiment describes a new security mechanism applicable to all access networks:
  Simple framework supporting both GBA and "username/password" authentication
  A single TLS variant may be used
  Minimal changes to specification and implementation
Concept Overview
  ULP Security
    TLS with Server certificates
    Two Client Authentication modes
      (User Mode): (User_ID, User_secret)=(Username, Password)
      (GBA Mode): (User_ID, User_secret)=(B-TID, Ks_NAF)
    (User_ID, Counter, Digest) added to all messages, with Digest computed as
      A1=SLP_Domain∥ULP_Message,
      Digest=HMAC(User_secret, A1)
    Sender adds (User_ID, Counter, Digest) to all messages, Receiver verifies
    ULP used to update SUPL_INIT credentials (Key Identity, SUPL_INIT_ROOT_KEY)
  SUPL_INIT Protection [e.g., non-emergency only]
    Uses ULP v2.0 Basic SUPL_INIT Protection with SUPL_INIT credentials generated by SLP (User Mode) or GBA (GBA Mode)
    Uses SUPL_INIT credentials provided by SLP via ULP in User Mode
Setup Details
  Offline
    (User Mode) User and SLP agree on (Username, Password)
      SLP may provide (Username, Password) to User
      User may provide (Username, Password) to SLP
      This is available to both H-SLP or A-SLP.
  At SET start up
    (User Mode)
      User enters (Username, Password) to SUPL Client
    (GBA Mode)
      SET bootstraps with BSF to obtain (B-TID, Ks)
      Note, SET can refresh (B-TID, Ks) as often as required
      SUPL Client performs a ULP session with SLP to obtain fresh SUPL INIT credentials
ULP Session Security Proposal
  May use TLS with Server certificates
  Takes care of Server Authentication
  Add new parameters to ULP messages
    (User_ID, Req_Count, Req_Digest) to messages from SET,
    (User_ID, Resp_Count, Resp_Digest) to messages from SLP
  SET originated messages
    SET adds (User_ID, Req_Count, Req_Digest)
    SLP verifies Req_Count and Req_Digest before processing message contents
  SLP originated messages
    SLP adds (User_ID, RespCounter, Resp_Digest)
    SET verifies Resp_Count and Resp_Digest before processing message contents
Req_Count/Resp_Count
  Req_Count/Resp_Count have similar behavior
  Purpose of the counters are to enable replay detection
  Req_Count/Resp_Count is reset in receiver and sender every ULP Session
  That is, the counter is reset when Session Identifier is changed.
  At Sender
    Req_Count/Resp_Count is incremented every message and added to ULP message
  At Receiver:
    Receiver compares Req_Count/Resp_Count against the value they expected. If they detect replay, then they exit with an error. Otherwise, message passes replay protection
Req_Digest/Resp_Digest Generation
  Req_Digest/Resp_Digest generation may be identical
    Insert all known values into ULP_Message fields.
    Form ULP_Message_Z as ULP_Message with Req_Digest/Resp_Digest field set to all zeroes
    Form DigestPayload=SLP_Domain ":" ULP_Message_Z
    Compute
      Req_Digest/Resp_Digest=HMAC-SHA256-32(User_secret, DigestPayload)
    Add Req_Digest/Resp_Digest to appropriate field in ULP_Message
  (User Mode)
    Use (User_ID, User_secret):=(Username, Password)
  (GBA Mode)
    Use (User_ID, User_secret):=(B-TID, Ks_NAF), where
    [SET] Generate Ks_NAF from Ks and SLP URL
    [SLP] Once it extracts User_ID field, SLP provides B-TID to BSF and BSF returns with Ks_NAF. Ks_NAF will not change unless B-TID changes.
SUPL_INIT Security Proposal
  Uses Basic SUPL_NIT Protection already defined in ULP TS V2.0 Section 6.1.6.6:
  Adapted description from GBA-provisioned keys to SLP-Provisioned keys in User Mode
SLP updates (Key Identifier, SUPL_NIT_ROOT_KEY) during an ULP Session at initiative of Client or SLP in User Mode
BasicReplayCounter is reset when Key Identifier is reset
Minimal standardization effort required.
SUPL_INIT Protection Parameter
A SUPL_INIT Protector for Basic SUPL_INIT Protection consists of:
Key Identifier
BasicReplayCounter (length=2 octets)
BasicMAC (length=4 octets)
The BasicMAC parameter is generated as follows:
BasicMAC=HMAC-SHA256-32(SUPL_INIT_Basic_IK, 'SUPL_INIT')
SUPL_INIT_Basic_IK=HMAC-SHA256-128(SUPL_NIT_ROOT_KEY, "Basic IK")
BasicReplayCounter is reset when Key Identifier is reset
Key Identifier and SUPL_INIT_ROOT_KEY are NOT the same as User_ID and User_secret i.e., SUPL INIT protection works independently from ULP message authentication.
SUPL_INIT Credential Management
Occurs in first ULP exchange of any connection session.
SET-Originated Messages
First message of session should include either
"SUPL_INIT_Credential_Req" indicator if no credentials available, or
Current_Key_Identifier to allow SLP to detect if SET and SLP are out of sync.
SLP-originated messages
If Current_Key_Identifier is correct, then add a "SUPL_INIT_Credential_OK" indicator to confirm.
If Current_Key_Identifier is incorrect, or SET sent "SUPL_INIT_Credential_Req" indicator or Server wishes to update SUPL_INIT Credentials, then the SLP adds a field to ULP message for provisioning SUPL_INIT credentials
Contains (Key Identifier, SUPL_INIT_ROOT_KEY)

Example Call Flows—SI Immediate Fix

Step A: The Target SET sets the req_count to 1234 (or any other running number as determined by the SET) and calculates the message digest (req_digest). The Target SET sends a SUPL START(user-id, req_count=1234, req_digest, . . . ) message to the H-SLP.

Step B: The H-SLP checks the authenticity of SUPL START using the received message digest (req_digest) and also checks the replay counter (req_count). The H-SLP sets the res_count to 4321 (or any other running number as determined by the SET) and calculates the message digest (res_digest). The H-SLP sends a SUPL RESPONSE (user-id, res_count=4321, res_digest, . . . ) message to the Target SET. The period between SUPL START and SUPL RESPONSE at the Target SET=UT1.

Step C: The Target SET checks the authenticity of SUPL RESPONSE using the received message digest (res_digest) and also checks the replay counter (res_count). The Target SET increments the req_count by one (1234+1) and calculates the message digest (req_digest). The Target SET sends a SUPL POS INIT (user-id, req_count=1234+1, req_digest . . . ) message to the H-SLP. The period between SUPL RESPONSE and SUPL POS INIT at the H-SLP=ST1.

Step D: The Target SET and the H-SLP engage in a SUPL POS exchange. The period between SUPL POS INIT and SUPL POS at the Target SET=UT2. Each side checks the message authenticity based on the received message digest and replay integrity based on the message counter (req_count/res_count).

Step E: The H-SLP checks the authenticity of the last SUPL POS message received using the received message digest (req_digest) and also checks the replay counter (req_count). The H-SLP increments req_count (4321+1) and calculates the message digest (res_digest). The H-SLP sends a SUPL END (user-id, res_count=4321+1, res_digest, . . . ) message to the Target SET. The Target SET checks the authenticity of SUPL END using the received message digest (res_digest) and also checks the replay counter (res_count). The period between SUPL POS and SUPL END at the Target SET=UT3.

Example Call Flows—NI Immediate Fix

Step A: The H-SLP sets the res_count to 1234 (or any other running number as determined by the H-SLP) and calculates the message digest (BasicMAC). The H-SLP sends a SUPL INIT (user-id, res_count=4321, BasicMAC, . . . ) message to the Target SET.

Step B: The Target SET checks the authenticity of SUPL INIT using the received message digest (BasicMAC) and also checks the replay counter (res_count). The Target SET sets the req_count to 1234 (or any other running number as determined by the SET) and calculates the message digest (req_digest). The Target SET sends a SUPL POS INIT (user-id, req_count=1234, req_digest, . . . ) message to the H-SLP. The period between SUPL INIT and SUPL POS INIT at the H-SLP=ST1.

Step C: The Target SET and the H-SLP engage in a SUPL POS exchange. The period between SUPL POS INIT and SUPL POS at the Target SET=UT2. Each side checks the message authenticity based on the received message digest and replay integrity based on the message counter (req_count/res_count).

Step D: The H-SLP checks the authenticity of the last SUPL POS message received using the received message digest (req_digest) and also checks the replay counter (req_count). The H-SLP increments req_count (4321+1) and calculates the message digest (res_digest). The H-SLP sends a SUPL END (user-id, res_count=4321+1, res_digest, . . . ) message to the Target SET. The Target SET checks the authenticity of SUPL END using the received message digest (res_digest) and also checks the replay counter (res_count). The period between SUPL POS and SUPL END at the Target SET=UT3.

Additional Embodiment 3

Introduction
Security in SUPL 2.0 is access network specific:
ACA requires access to the core network to identify SET based on Source IP Address
GBA only applicable to 3GPP/3GPP2 networks
SEK only applicable to WiMAX networks
A new requirement in SUPL 3.0 calls for an authentication mechanism applicable to all access networks. This embodiment describes a new security mechanism applicable to all access networks:
Simple framework supporting both GBA and "username/password" authentication SUPL 3.0 Security Concept Overview I

| Security Method | Description | Comments |
|---|---|---|
| A: ACA | Alternative Client Authentication as supported in SUPL 1.0 and 2.0. Server authentication and encryption using server authenticated TLS. Client authentication using IP Address/MSISDN consistency checking involving core network. | For SUPL deployments with medium security requirements and with access to IP Address client verification. This is a legacy security method. |
| B: GBA | GBA based security as supported in SUPL 2.0. Only applicable to 3GPP/3GPP2 networks. Server and client authentication and encryption using PSK-TLS. | For SUPL deployments with high security requirements and with access to GBA infrastructure. This is a legacy security method. |
| C: User Mode ULP | Server authentication and encryption using server authenticated TLS. Client authentication using (Username, Password) and MAC attached to each ULP message from client to server. | For SUPL deployments with high security requirements and no access to GBA infrastructure. This is a new security method. |
| D: User Mode TLS | Server authentication and encryption using server authenticated TLS. Client authentication using (Username, Password) SRP TLS. | For SUPL deployments with high security requirements and no access to GBA infrastructure. This is a new security method. |

SUPL 3.0 Security Concept Overview II

The following two options are considered for SUPL 3.0 security:

| Option I | Option II |
|---|---|
| ACA (A) | ACA (A) |
| GBA (B) | GBA (B) |
| User Mode ULP (C) | User Mode TLS (D) |

Option I: Concept Overview
  ULP Security
  GBA Mode: Use TLS-PSK as before
  User Mode ULP: Based on (Username, Password)
    First perform TLS handshake with server certificates to establish a secure connection
    (Username, Counter, Digest) added to all ULP messages sent by the SET, with Digest computed as
    A1=SLP_Domain∥ULP_Message,
    Digest=HMAC(Password, A1)
    SET adds (Username, Counter, Digest) to all messages, SLP verifies
    ULP used to update SUPL INIT credentials (Key Identity, SUPL_INIT_ROOT_KEY) required for SUPL INIT protection
Option I: Offline Procedures
  User Mode ULP (Offline)
  User and SLP operator agree on (Username, Password)
  Other assumptions
  SET has URL of SLP
  SET has appropriate root certificates for authenticating SLP
Option I: Online Procedures
  TLS with server certificates used for server authentication and encryption
  New parameters are added to ULP messages from the SET: (Username, Counter, Digest)
  SLP verifies Counter and Digest before processing ULP message content
  Purpose of the Counter is to enable replay detection
  Counter is reset in receiver and sender for every ULP Session
  At sender, the Counter is incremented every message and added to the ULP message
  At receiver, Counter is compared against the value expected. If replay detected, exit with error. Otherwise, message passes replay protection.
Option II: Concept Overview
  ULP Security
  GBA Mode: Use TLS-PSK as before
  User Mode TLS: Based on (Username, Password)
    First perform TLS handshake with server certificates to establish a secure connection
    SLP sends "Hello Request" to initiate TLS renegotiation. Then SET & SLP perform TLS-SRP handshake (SRP=Secure Remote Password) to authenticate user using (Username, Password).
    The first secure connection is required to hide the username in TLS-SRP handshake.
    ULP used to update Basic Protection SUPL INIT credentials (Key Identity, SUPL_INIT_ROOT_KEY) required for SUPL INIT protection
Option II: Offline Procedures
  User Mode TLS (Offline)
  User and SLP operator agree on (Username, Password)
  Other assumptions
  SET has URL of SLP
  SET has appropriate root certificates for authenticating SLP
Option II: Online Procedures
  SET initiates TLS Handshake, indicating in the TLS support for GBA and/or User Mode by selecting the appropriate cipher suites.
  SLP decides whether to proceed with GBA mode or User Mode
  If GBA mode, then
  Continue TLS handshake as for TLS-PSK using GBA to establish secure tunnel
    Mutual authentication Exchange data in secure channel
If User mode, then
  First continue TLS handshake with server certificates to establish secure channel
    SET Authenticates the SLP
  Performs TLS-SRP handshake (messages exchanged inside the secure channel)
    SLP Authenticates the user
    Results in new session keys
  Exchange data in secure tunnel protected by new session keys Option II: Online Procedure—First TLS Handshake
  SET→SLP: Client Hello:
    Indicates all supported cipher suites
      If SET supports GBA, then indicate support for TLS-PSK cipher suite(s)
      If SET supports User Mode, then indicate support for TLS with server certificates and TLS SRP
    SET does not provide username at this time, if required will be provided in the next TLS handshake
  SLP→SET: Server Hello:
    Indicates chosen cipher suite
      If SLP selects GBA mode, then SLP indicates a TLS-PSK cipher suite
      If SLP selects User Mode, the SLP indicates cipher suite for TLS with server certificates
    Call flow proceeds as for selected cipher suite Option II: Online Procedure—After First TLS Handshake
  GBA Mode
    SET and SLP start communicating over secured channel
  User Mode
    SLP→SET: Hello Request
      Initiates renegotiation
    SET→SLP: Client Hello
      Indicates support for TLS-SRP
      Includes Username as per TLS-SRP specifications
    SET→SLP: ServerHello
      Indicates selection of TLS-SRP
    Exchange continues as per TLS-SRP
    Following successful handshake, SET & SLP begin exchanging data over secured channel.

SUPL INIT Protection
  SUPL INIT protection in SUPL 3.0 is based on SUPL INIT protection mechanism in SUPL 2.0 and uses a Message Authentication Code (MAC) attached to SUPL INIT
  MAC is calculated using (Key Identity, SUPL_INIT_ROOT_KEY) provisioned over ULP in User Mode (GBA mode does not require provisioning)
  Two methods for calculating (Key Identity, SUPL_INIT_ROOT_KEY):
    GBA mode: (Key Identity, SUPL_INIT_ROOT_KEY)=(B-TID, Ks)
      (B-TID, Ks) are bootstrapped off of BSF
    User Mode: (Key Identity, SUPL_NIT_ROOT_KEY) is generated from (Username, Password)
  SUPL INIT Protection is the same for Option I and Option II SUPL INIT Protection Mechanism
  Two Levels of Protection in SUPL v3.0:
    NULL
      No security
    Basic Protection
      Based on shared Key Identity, SUPL_INIT_ROOT_KEY provisioned over ULP
      Mimics Basic Protection from SUPL v2.0
      Key Identifier and SUPL_INIT_ROOT_KEY are NOT the same as Username, Password
    Re-sync Protection Mechanism:
      Based on digital signature that SET can verify from the SLP's certificate in SET
      May be only used when SLP is convinced that the Key Identity, SUPL_INIT_ROOT_KEY in the SLP and SET have become out of sync.
      May be expensive to compute: may be used sparingly.
  Basic SUPL INIT Protection Parameter
    A SUPL INIT Protector for Basic SUPL INIT Protection consists of:
    Key Identifier
    BasicReplayCounter (length=2 octets)
    BasicMAC (length=4 octets)
    The BasicMAC parameter is generated as follows:
    BasicMAC=HMAC-SHA256-32(SUPL_INIT_Basic_IK, 'SUPL_INIT')
    SUPL_INIT_Basic_IK=HMAC-SHA256-128(SUPL_INIT_ROOT_KEY, "Basic IK")
    BasicReplayCounter is reset when Key Identifier is reset SUPL_INIT_ROOT_KEY Management
  Occurs in first ULP exchange of any SUPL session
    First SET originated message
    First message of session should include either
      "SUPL_INIT_Credential_Req" indicator if no credentials available, or
      Current_Key_Identifier to allow SLP to detect if SET and SLP are out of sync.
  SLP response
    If Current_Key_Identifier is correct, then add a "SUPL_INIT_Credential_OK" indicator to confirm.
    If Current_Key_Identifier is incorrect, or SET sent "SUPL_INIT_Credential_Req" indicator or SLP wishes to update SUPL_INIT Credentials, then the SLP adds a field to ULP message for provisioning SUPL_INIT credentials
      Contains (Key Identifier, SUPL_INIT_ROOT_KEY)

Comparison of User Modes

|  | Plus | Delta |
| --- | --- | --- |
| Option I: User Mode ULP | Requires no change to existing TLS implementation | Security distributed over two layers: TLS and ULP<br>Security not transparent to ULP layer<br>Higher implementation risk since ULP implementation is performed by non security experts. |
| Option II: User Mode TLS | Security provided by transport layer (single layer security) and thus transparent to ULP layer | More complex TLS implementation |

Summary
  Two new security models are considered in SUPL 3.0
    Option I: User Mode ULP
    Option II: User Mode TLS
  The two new security models use (Username, Password) client authentication while server authentication and encryption are based on legacy server authenticated TLS.
  Both options are bearer agnostic security models and are thus suitable for SUPL 3.0.
  Legacy security models (ACA and GBA) may still be used where applicable and desirable.
SRP Basics
  TLS-SRP [IETF RFC 5054] uses Secure Remote Password (SRP [RFC2945]) as the basis of authentication and key exchange Main steps
  The server doing the authentication does not need the password, instead it stores a triplet containing {Username, PasswordVerifier, Salt}
  Typically the user's client generates triplet when registering offline with Server
    Salt may be randomly chosen by user
    PasswordVerifier is computed from Username, Salt and the user's Password using tricky mathematics similar to Diffie-Hellman key exchange.
  The server uses the triplet in an interaction with the user to
  Verify that the user knows the password and
  Establish a shared secret known only by the user and the server. This shared secret can then be used for generating keys for encryption and integrity protection (which is how it is used in TLS-SRP)
Some Properties of SRP
  The triplet cannot be used to impersonate the user
  Server does not need to keep triplet confidential
  A server can provide the triplet to a third party to allow that party to verify the user, without the server being concerned that the third party will then try to impersonate the user
  For example, a H-SLP can provide the triplet to an A-SLP to allow the A-SLP to authenticate the user.

Additional Embodiment 4

Introduction
  Security in SUPL 2.0 is access network specific:
    ACA requires access to the core network to identify SET based on Source IP Address
    GBA only applicable to 3GPP/3GPP2 networks
    SEK only applicable to WiMAX networks
  A new requirement in SUPL 3.0 calls for an authentication mechanism applicable to all access networks. This embodiment describes a new security mechanism applicable to all access networks:
    Simple framework supporting both GBA and "username/password" authentication
SUPL 3.0 Security Concept Overview I SUPL 3.0 Security Concept Overview II
  The following two options are considered for SUPL 3.0 security

| Option I | Option II |
| --- | --- |
| ACA (A) | ACA (A) |
| GBA (B) | GBA (B) |
| User Mode ULP (C) | User Mode TLS (D) |

The following discussion presents both options and discuss advantages and potential disadvantages of each approach
User Mode Offline Procedures
  User Mode (Offline)
  User and SLP operator agree on (Username, Password)
  Other assumptions
  SET has URL of SLP
  SET has appropriate root certificates for authenticating SLP
User Mode ULP: Concept Overview I
  User Mode ULP: Based on (Username, Password)
  First perform TLS handshake with server certificates to establish a secure connection
  (Username, Counter, Digest) added to all ULP messages sent by the SET, with Digest computed as
    ULP_Message_Z is the ULP_Message with Digest field set to zeroes
    User_ULP_IK=SHA-256(Username||":"_Password||":"||SLP_Domain||":SUPL30ULP")
    Digest=HMAC-SHA-256-32(User_ULP_IK, ULP_Message_Z)
  SET adds (Username, Counter, Digest) to all messages, SLP verifies
User Mode ULP: Concept Overview II
  TLS with server certificates used for server authentication and encryption
  New parameters are added to ULP messages from the SET: (Username, Counter, Digest)
  SLP verifies Counter and Digest before processing ULP message content
  Purpose of the Counter is to enable replay detection
  Counter is reset in receiver and sender for every ULP Session

| Security Method | Description | Comments |
| --- | --- | --- |
| A: ACA | Alternative Client Authentication as supported in SUPL 1.0 and 2.0. Server authentication and encryption using server authenticated TLS. Client authentication using IP Address/MSISDN consistency checking involving core network. | For SUPL deployments with medium security requirements and with access to IP Address client verification. This is a legacy security method. |
| B: GBA | GBA based security as supported in SUPL 2.0. Only applicable to 3GPP/3GPP2 networks. Server and client authentication and encryption using PSK-TLS. | For SUPL deployments with high security requirements and with access to GBA infrastructure. This is a legacy security method. |
| C: User Mode ULP | Server authentication and encryption using server authenticated TLS. Client authentication using (Username, Password) and MAC attached to each ULP message from client to server. | For SUPL deployments with high security requirements and no access to GBA infrastructure. This is a new security method. |
| D: User Mode TLS | Server authentication and encryption using server authenticated TLS. Client authentication using (Username, Password) SRP TLS. | For SUPL deployments with high security requirements and no access to GBA infrastructure. This is a new security method. |

At sender, the Counter is incremented every message and added to the ULP message At receiver, Counter is compared against the value expected. If replay detected, exit with error. Otherwise, message passes replay protection.

User Mode TLS: Concept Overview

User Mode TLS: Based on (Username, Password)

First perform TLS handshake with server certificates to establish a secure connection SLP sends "Hello Request" to initiate TLS renegotiation. Then SET & SLP perform TLS-SRP handshake (SRP=Secure Remote Password) to authenticate user using (Username, Password).

The first secure connection is required to hide the username in TLS-SRP handshake.

Option I: Online Procedures Overview

SET initiates TLS Handshake, indicating in the TLS support for GBA and/or User Mode by selecting the appropriate cipher suites.

SLP decides whether to proceed with GBA mode or User Mode

If GBA mode, then

Continue TLS handshake as for TLS-PSK using GBA to establish secure tunnel

Provides mutual authentication

Exchange data in secure channel

If User mode, then

Continue TLS handshake with server certificates to establish secure channel

SET Authenticates the SLP

Exchange data in secure channel

New parameters are added to ULP messages from the SET (Username, Counter, Digest) which allow the SLP to authenticate the User Option I: Online Procedure Details—TLS Handshake SET→SLP: Client Hello:

Indicates all supported cipher suites

If SET supports GBA, then indicate support for TLS-PSK cipher suite(s)

If SET supports User Mode, then indicate support for TLS with server certificates SLP→SET: Server Hello:

Indicates chosen cipher suite

If SLP selects GBA mode, then SLP indicates a TLS-PSK cipher suite

If SLP selects User Mode, the SLP indicates cipher suite for TLS with server certificates Call flow proceeds as for selected cipher suite Option I: Online Procedure Details—after TLS Handshake GBA Mode SET and SLP start communicating over secure channel User Mode SET and SLP start communicating over secure channel New parameters are added to ULP messages from the SET: (Username, Counter, Digest)

SLP verifies Counter and Digest before processing ULP message content

Purpose of the Counter is to enable replay detection

Counter is reset in receiver and sender for every ULP Session

At sender, the Counter is incremented every message and added to the ULP message At receiver, Counter is compared against the value expected. If replay detected, exit with error. Otherwise, message passes replay protection.

Option II: Online Procedures Overview

SET initiates TLS Handshake, indicating in the TLS support for GBA and/or User Mode by selecting the appropriate cipher suites.

SLP decides whether to proceed with GBA mode or User Mode

If GBA mode, then
1. Continue TLS handshake as for TLS-PSK using GBA to establish secure tunnel
   Mutual authentication
2. Exchange data in secure channel If User mode, then
1. First continue TLS handshake with server certificates to establish secure channel
   SET Authenticates the SLP
2. Performs TLS-SRP handshake (messages exchanged inside the secure channel)
   SLP Authenticates the user
   Results in new session keys
3. Exchange data in secure tunnel protected by new session keys Option II: Online Procedure Details—First TLS Handshake SET→SLP: Client Hello:

Indicates all supported cipher suites

If SET supports GBA, then indicate support for TLS-PSK cipher suite(s)

If SET supports User Mode, then indicate support for TLS with server certificates and TLS SRP SET does not provide username at this time, if required will be provided in the next TLS handshake SLP→SET: Server Hello:

Indicates chosen cipher suite

If SLP selects GBA mode, then SLP indicates a TLS-PSK cipher suite

If SLP selects User Mode, the SLP indicates cipher suite for TLS with server certificates Call flow proceeds as for selected cipher suite Option II: Online Procedure Details—after First TLS Handshake GBA Mode SET and SLP start communicating over secured channel User Mode SLP→SET: Hello Request Initiates renegotiation SET→SLP: Client Hello Indicates support for TLS-SRP Includes Username as per TLS-SRP specifications SET→SLP: ServerHello Indicates selection of TLS-SRP Exchange continues as per TLS-SRP Following successful handshake, SET & SLP begin exchanging data over secured channel.

SUPL INIT Protection

SUPL INIT protection in SUPL 3.0 is based on SUPL INIT protection mechanism in SUPL 2.0 and uses a Message Authentication Code (MAC) attached to SUPL INIT Two methods for authentication GBA mode: (Key Identity, SUPL_NIT_ROOT_KEY)=(B-TID, Ks)

(B-TID, Ks) are bootstrapped off of BSF

User Mode: authentication uses (Username, Password)

SUPL INIT Protection is the same for Option I and Option II

SUPL INIT Protection Mechanism
   Three types of Protection offered in SUPL v3.0:
   NULL
      No security
   GBA Mode Protection
      Identical to SUPL v2.0 Basic Protection
   User Mode Protection
      Authentication based on (Username,Password)
      Adds random value to prevent dictionary attacks
      Adds time to prevent replay
SUPL INIT GBA Mode Protection
   If using GBA authentication, then the SUPL INIT Protector parameter consists of:
   Key Identifier=GBA B-TID (length=variable).
   GBA_ReplayCounter (length=2 octets). Prevents replay
   SUPL_INIT_GBA_MAC (length=4 octets). Authenticates the message.
   The SUPL_INIT_GBA_MAC parameter is generated as follows:
   SUPL_INIT_GBA_MAC=HMAC-SHA256-32(SUPL_INIT_GBA_IK, SUPL_INIT_Z)
   SUPL_INIT_GBA_IK=HMAC-SHA256-128(SUPL_INIT_ROOT_KEY, "GBA IK")
   SUPL_INIT_ROOT_KEY is the GBA key Ks_(int/ext_) NAF corresponding to B-TID
   SUPL_INIT_Z is the SUPL INIT message with the SUPL_INIT_GBA_MAC field set to all zeroes.
   GBA_ReplayCounter is reset when Key Identifier is reset
SUPL INIT User Mode Protection
   If using User Mode security, then the SUPL_INIT Protector parameter consists of:
   SUPL_INIT_RAND (length=8 octets) This may be a random value unique for this message to prevent dictionary attacks on the password.
   SUPL_INIT_TIME (length=4 octets). Time of sending message. Stops replay.
   SUPL_INIT_USER_MAC (length=4 octets). Authenticates the message.
   The SUPL_INIT_USER_MAC parameter is generated as follows:
   SUPL_INIT_USER_MAC=HMAC-SHA256-32(SUPL_INIT_USER_IK, SUPL_INIT_Z)
   SUPL_INIT_USER_IK=SHA-256 (Username||":"||Password ":"||SLP_Domain||":SUPL30INIT")
   SUPL_INIT_Z is the SUPL_INIT message with the SUPL_INIT_USER_MAC field set to all zeroes.

Comparison of User Modes

|  | Plus | Delta |
| --- | --- | --- |
| Option I: User Mode ULP | Requires no change to existing TLS implementation | Security distributed over two layers: TLS and ULP Security not transparent to ULP layer Potentially higher implementation risk since ULP implementation may be performed by non security experts. |
| Option II: User Mode TLS | Security provided by transport layer (single layer security) and thus transparent to ULP layer | More complex TLS implementation |

Summary
   Two new security models are considered in SUPL 3.0
   Option I: User Mode ULP
   Option II: User Mode TLS
   The two new security models use (Username, Password) client authentication while server authentication and encryption are based on legacy server authenticated TLS.
   Both options are bearer agnostic security models and are thus suitable for SUPL 3.0.
   Legacy security models (ACA and GBA) may still be used where applicable and desirable.

Additional Embodiment 5

Introduction
   Security in OMA SUPL 2.0 is access network specific:
      ACA (Alternative Client Authentication) requires access to the core network to identify SET based on Source IP Address
      GBA (Generic Bootstrapping Architecture) only applicable to 3GPP/3GPP2 networks
      SEK (SUPL Encryption Key) only applicable to WiMAX networks
   A new requirement in OMA SUPL 3.0 calls for an authentication mechanism applicable to all access networks. This embodiment describes a new security mechanism applicable to all access networks:
      Simple framework based on "username/password" authentication
   Legacy ACA and GBA based security are also supported
SUPL 3.0 Security Concept Overview I
   Security for SUPL 3.0 is based on three security methods:

| Security Method | Description | Comments |
| --- | --- | --- |
| ACA | Alternative Client Authentication as supported in SUPL 1.0 and 2.0. Server authentication and encryption using server authenticated TLS. Client authentication using IP address/MSISDN consistency checking involving core network. | For SUPL deployments with medium security requirements and with access to IP address client verification. This is a legacy security method. |
| GBA | GBA based security as supported in SUPL 2.0. Only applicable to 3GPP/3GPP2 networks. Server and client authentication and encryption using PSK-TLS. | For SUPL deployments with high security requirements and with access to GBA infrastructure. This is a legacy security method. |

| Security Method | Description | Comments |
|---|---|---|
| User Mode TLS | Server authentication and encryption using server authenticated TLS. Client authentication using (Username, Password) SRP TLS. | For SUPL deployments with high security requirements and no access to GBA infrastructure. This is a new security method. |

SUPL 3.0 Security Concept Overview II
  ACA and GBA are access network specific but may be used where applicable and depending on the SUPL operator's choice.
  User Mode TLS is access network independent and can be viewed as an enhancement of ACA.
User Mode TLS—Overview I
  Public Key TLS Server Authentication—H-SLP and SLP are connected secure; H-SLP is authenticated but SET is not.
  Username/Password TLS-SRP Client Authentication—H-SLP and SLP are connected secure; both H-SLP and SET are authenticated.
User Mode TLS
  Server is first authenticated using public key TLS as in ACA producing a secure encrypted IP connection
  Client is next authenticated based on TLS-SRP (Secure Remote Password) using pre-provisioned Username/Password in both the SET and SLP
User Mode TLS Overview II
  Simple Username/Password mechanism may pose problems and/or threats:
    Username/Password may be stolen and used on different devices
    Username/Password may be voluntarily given away and used simultaneously on different devices
  This can be solved by:
    Use of Username/Password only for the first SUPL session immediately after SUPL service activation.
    During the first SUPL session, SLP creates new Username/Password and sends to the SET (using the secure IP connection created by the initial Username/Password).
    SET then replaces initial Username/Password with new Username/Password and deletes old Username/Password.
  Device is then bound to SUPL subscription by user-invisible Username/Password created by the SLP.
  All future TLS sessions then use the new Username/Password created by the SLP.
  Other devices can then not use the Username/Password
User Mode TLS in 4 Steps
  Step 1: User and SLP operator agree on temporary username & password: (Username_temp, Password_temp).
  Step 2: The first SUPL session is established. Server authentication and ciphering are performed based on server authenticated TLS. Client authentication is performed based on TLS-SRP (SRP=Secure Remote Password) using the agreed (Username_temp, Password_temp).
  Step 3: Within the first SUPL session, the SLP generates new and cryptographically strong (Username, Password) which it sends to the SET. SET replaces (Username_temp, Password_temp) with (Username, Password). SET stores (Username, Password) in secure location.
  Step 4: all subsequent TLS sessions use server authentication and ciphering based on server authenticated TLS. Client authentication is performed based on TLS-SRP using (Username, Password).
User Mode TLS Step 1—Details
  User and SLP operator agree on temporary username and password: (Username_temp, Password_temp)
  (Username_temp, Password_temp) may be provisioned in the SET in various ways:
  Over The Air provisioning by the operator
  Provisioning at an operator's store (flashing of the SET)
  Username and password sent by mail or obtained online and entered by SET user
  other
  SET has been provisioned with the URL of the SLP
  SET has been provisioned with the appropriate root certificates required for authenticating the SLP
User Mode TLS Step 2—Details
  First TLS handshake of the first SUPL session to initiate server authentication and encryption:
  SET→SLP: Client Hello indicating support for TLS with server certificates and TLS-SRP
  SLP→SET: Server Hello indicating cipher suite for TLS with server certificates
  Second TLS handshake to initiate client authentication
  SLP→SET: Hello Request to initiate renegotiation
  SET→SLP: Client Hello indicating support for TLS-SRP and including Username_temp as per TLS-SRP specifications
  SLP→SET: Server Hello indicating selection of TLS-SRP
  Client authentication is performed based on (Username_temp, Password_temp)
  New session keys are produced (for this session only)
  SET and SLP can now conduct SUPL session over secured channel
User Mode TLS Step 3—Details
  SLP creates cryptographically strong (Username, Password) based on temporary username and password (Username_temp, Password_temp).
  First SUPL message from SLP to SET carries cryptographically strong (Username, Password).
  SET replaces temporary (Username_temp, Password_temp) with (Username, Password).
  SET discards temporary (Username_temp, Password_temp).
  SET stores (Username, Password) in secure location.
  NOTE 1: this step may not be performed if the SLP operator was able to provision the Username/Password securely in the SET without involving the user
  NOTE 2: for 3GPP/3GPP2 initial access, the SLP can verify in the core network that the SET IP address is associated with the SET MSISDN or IMSI to further verify the SET belongs to the user User Mode TLS Step 4—Details
  For subsequent TLS session establishment:
    TLS handshake to initiate server authentication and encryption:
      SET→SLP: Client Hello indicating support for TLS with server certificates and TLS-SRP
      SLP→SET: Server Hello indicating cipher suite for TLS with server certificates
    Second TLS handshake to initiate client authentication:
      SLP→SET: Hello Request to initiate renegotiation
      SET→SLP: Client Hello indicating support for TLS-SRP and including Username as per TLS-SRP specifications
      SLP→SET: Server Hello indicating selection of TLS-SRP
      Client authentication is performed based on (Username, Password)
      New session keys are produced
    SET and SLP can now conduct SUPL session over secured channel
      NOTE: although PSK-TLS could be used for subsequent access once a cryptographically secure Username/Password is provided, reuse of TLS-SRP may be implemented with reduced complexity
SUPL INIT Protection Overview
  SUPL INIT protection in SUPL 3.0 is based on SUPL protection mechanism in SUPL 2.0 and uses a Message Authentication Code (MAC) attached to SUPL INIT
  Two types of Protection offered in SUPL v3.0:
  GBA Mode Protection
    Identical to SUPL v2.0 Basic Protection
  User Mode Protection
    Authentication based on (Username, Password) created by the SLP (i.e., not using initial Username/Password (Username_temp, Password_temp) used for service activation).
    NULL Protection is also supported and may be used based on operator's choice.
SUPL INIT User Mode Protection I
  If using User Mode TLS security, then the SUPL INIT Protector parameter consists of:
  SUPL_INIT_TIME (length=4 octets). Time of sending message. Stops replay.
  SUPL_INIT_USER_MAC (length=4 octets). Authenticates the message.
  The SUPL INIT Protector is added to each SUPL INIT message and allows the SET to check the authenticity of the received SUPL INIT message.
  For exception cases (e.g. SET and SLP out of synch) where an operator uses SUPL INIT protection, null SUPL INIT protection may be used temporarily to reprovision the SET as long as this is explicitly indicated to the SET (e.g. via a reset command) so that a Denial of Service attack cannot take advantage of this by sending unprotected SUPL INITs to a large number of SETs
SUPL INIT User Mode Protection II
  The SUPL_INIT_USER_MAC parameter is generated as follows:
  SUPL_INIT_USER_MAC=HMAC-SHA256-32(SUPL_INIT_USER_IK, SUPL_INIT_Z)
  SUPL_INIT_USER_IK=SHA-256 (Username||":"||Password||":"||SLP_Domain||":SUPL30INIT")
  SUPL_INIT_Z is the SUPL INIT message with the SUPL_INIT_USER_MAC field set to all zeroes.

Summary
  A new security model is described for SUPL 3.0: User Mode TLS.
  User Mode TLS uses (Username, Password) client authentication while server authentication and encryption are based on legacy server authenticated TLS.
  SUPL INIT protection supported also in User Mode TLS.
  User Mode TLS is a bearer agnostic security model and is thus suitable for SUPL 3.0.
  Legacy security models (ACA and GBA) may still be used depending on SUPL operator's choice.
Recommendation
  User Mode TLS may be adopted as security model for SUPL 3.0.
  Support may be maintained for legacy ACA and GBA security models.

SUPL 3.0 Access SLP (A-SLP)

For a roaming subscriber, support of precise positioning can be difficult for an H-SLP provider but much easier for a location provider in the local roaming area
Operators may in some cases have business relationships with other operators and providers that could make temporary use of an H-SLP belonging to operator A beneficial to a subscriber of operator B
SUPL 3.0 RD includes requirements oriented to more widespread availability of and easier access to SLPs:
  SUPL-EMER-03: SUPL SHALL support SET Initiated and Network Initiated positioning for emergency location requests
  SUPL-HLF-18: SUPL SHALL support SLP service discovery
Some subscribers may not have an H-SLP—e.g. home operator does not support SUPL—or may have opted out of H-SLP SUPL support
Some operators may wish to extend SUPL support to roaming subscribers—e.g. those without an H-SLP or whose H-SLP cannot adequately support location in a particular roaming area
Access SLP (A-SLP)
  An A-SLP can belong to an access network provider, be associated with an access network or support the geographic area of an access network
  An A-SLP can support SUPL 3.0 in a manner almost identical to an H-SLP—e.g. including all network and SET initiated services
  A SET will need to discover or be provided with information about an A-SLP (e.g. A-SLP address and security parameters)
  Possible information sources are the access network, H-SLP as well as independent (non-standardized) discovery
  A-SLP security should reuse methods defined for an H-SLP—e.g. avoid a different authentication method
  A SET and A-SLP can interact for a limited pre-agreed time period to support SUPL 3.0 services for both external SUPL Agents and the SET
Possible A-SLP Usage
  SET communicates with SLP using ULP 3.0 messages via Access Network and communicates with H-SLP using ULP 3.0 messages via Home Network (optionally used to discover and verify A-SLP).
  A-SLP communicates with a SUPL Agent via MLP.

Example User Cases

Example 1

User Visiting a New City, Town, Tourist Site Etc

H-SLP may only be able to support absolute location and not always accurately (e.g. if inside a building) and may not be able to provide ancillary information such as points of interest, maps, weather/traffic information etc.
An A-SLP could provide more continuous precise location support together with application level services (not part of SUPL) such as direction finding, points of interest, maps, weather/traffic etc.

Example 2

Emergency Call Support

If an A-SLP also supports E-SLP capability, the discovery of an A-SLP by a SET may assist a later IP based emergency call
The SET then has the option of obtaining its approximate location from the A-SLP and including it in the emergency SIP INVITE thereby assisting call routing
The prior association between the SET and the A-SLP/E-SLP may also assist with later more accurate location for PSAP dispatch A-SLP Security-1
  Allow same security procedures as for an H-SLP
  A suitable security method is User Mode TLS as described in OMA-LOC-2010-0xyz-INP_SUPL_3.0_Security—e.g. this does not require support of GBA, 3GPP/3GPP2 only access, ability to directly configure the SET
  The A-SLP operator or H-SLP operator (where there is a business relationship between both operators) can assign the initial Username/Password
  The A-SLP can then replace the initial Username/Password with new values on the first SUPL session to avoid use of the Username/Password by other devices
  Although the A-SLP operator may not always be able to verify that the SET provisioned with the Username/Password belongs to the intended user, this may not matter for A-SLP services primarily focused on SET initiated service and charged at the same rate for all roaming users
    NOTE: in most cases, the user may report loss of access to the A-SLP to the A-SLP provider (e.g. if the initial Username/Password is obtained and used by another user), allowing the current Username/Password to be deactivated and replaced by a new Username/Password A-SLP Security-2
  As an option, the H-SLP may be used to discover, verify and help support security for an A-SLP
  A SET could send a ULP request to the H-SLP with one of these parameters
    (A) Current SET location or serving access network identity
    (B) An already discovered A-SLP address (e.g. found online or provided by the access network)
  For (A), the H-SLP can return the address of a trusted A-SLP serving the local area
  For (B), the H-SLP can indicate if the A-SLP is trusted, not trusted or is unknown to the H-SLP
    For (A) and for (B) in the trusted case, the H-SLP can optionally provide an initial Username/Password to the SET assigned either by the A-SLP or H-SLP (for which some additional interaction between either the A-SLP and H-SLP or the associated providers will then be required to transfer the Username/Password and user identification)

SUPL 3.0 AD and TS Impacts
  Define an A-SLP (along with the existing H-SLP, V-SLP, E-SLP)
  Define or reference suitable discovery mechanisms
  Indicate use of User mode TLS security
  Add any suitable H-SLP support for A-SLP discovery, verification and security
  Allow a SET and A-SLP to restrict supported services to a subset of those used for H-SLP interaction (as already supported in existing SUPL 3.0 message flows where each end informs the other of the services it will support for a new session)
  Identify and support any new privacy requirements (if any)

Relationship to H-SLP Services
  An H-SLP provider may choose to support certain A-SLP providers with whom there is some business relationship
  An H-SLP provider may also offer support as an A-SLP provider to roaming subscribers from other operators
  SETs could be configured to control A-SLP access as follows:
    a) Always use H-SLP and prohibit A-SLP use
    b) Prefer H-SLP but allow A-SLP use subject to H-SLP approval (e.g. allow A-SLP access only when there is a roaming agreement with the H-SLP provider)
    c) Allow the SET to freely decide H-SLP vs A-SLP use based on its own criteria, or
    d) Always use A-SLP (e.g. applicable when there is no H-SLP)
  The net result may be to increase SUPL 3.0 usage and associated deployment which would benefit providers and users
  A-SLP support may be included as part of SUPL 3.0
  Reuse H-SLP security support and allow H-SLP to assist or control A-SLP access
  Allow for some level of non-SUPL support (e.g. regarding A-SLP discovery and interaction between A-SLP and H-SLP providers)

Additional Embodiment 6

Introduction
  This embodiment uses device certificates for client authentication.

SUPL 3.0 Security Concept Overview I

| | | |
|---|---|---|
| ACA | Alternative Client Authentication as supported in SUPL 1.0 and 2.0. Data secured using TLS with Server authentication based on server certificates. Client authentication using IP Address/MSISDN consistency checking involving core network. | For SUPL deployments with medium security requirements and with access to IP Address client verification. This is a legacy security method. |
| GBA | GBA based security as supported in SUPL 2.0. Only applicable to 3GPP/3GPP2 networks. Data secured using TLS-PSK with mutual authentication based on a shared key established using GBA. | For SUPL deployments with high security requirements and with access to GBA infrastructure. This is a legacy security method. |

-continued

| Device Certificates | Data secured using TLS with mutual authentication using server certificates for server authentication and manufacturer-provisioned device certificates for client authentication. | For SUPL deployments with high security requirements and no access to GBA infrastructure. This is a new security method for SUPL v3.0. |
|---|---|---|

SUPL 3.0 Security Concept Overview II
  ACA and GBA are access network specific but may be used where applicable and depending on the SUPL operator's choice.
  The new security model of this embodiment is client authentication using device certificates. Device certificate based client authentication is access network independent and can thus be used for all types of access networks and devices (i.e. non 3GPP/3GPP2 access networks and devices are supported).
Device Pre-Provisioning
  During manufacture, the Manufacturer provisions into the SET
    A private key which is unique to that SET device
    A certificate that binds the corresponding public key to one or more globally-unique SET device identities (e.g. serial number, IMEI or MSID).
  One or more chain of certificates back to well-known Certificate Authorities that would be trusted by the potential SLPs
  Note: If there is no chain back to a CA trusted by the SLP, then the SLP will not trust the SET authentication
  The SLP is responsible for ensuring that the SET is provisioned with one or more root certificates that can be used to verify the SLP's certificate
    These root certificate(s) may be provisioned during manufacture or distribution of SET,
    These root certificate(s) may be bundled with the SUPL client software.
    Note: If there is no chain of certificates from the SLP certificate back to one of these root certificates, then the SET will be unable to authenticate the SLP
  OMA-LOC may specify a common template or profile for certificates to simplify and unify implementation and testing
Device Certificate Summary
  Step1: Subscriber Authorization (out of scope)
    The subscriber securely verifies to the SLP that this device should be associated with their subscription
  Step 2: Runtime TLS Handshakes
    First: perform server authenticated TLS handshake using server certificate
    Next: inside encrypted TLS tunnel, perform mutually-authenticated TLS handshake using server certificate and client certificate.
    Now data can be exchanged securely
(Out of Scope) Subscriber Authorization I
  The SLP knows which subscriber should be associated with an (authenticated) SET, since only the SET identity is authenticated, not the subscriber identity.
  This happens as often as the subscriber switches between SETs
  It may not be sufficient for the user to provide the SET identity to the SLP
    Reason: User 1 can provide SET ID of User 2 to the SLP and say "this is my SET". Then the SLP may provide details of User 2 location to User 1 without User 2 being aware what is happening.
  A secure method is used to securely associate the subscriber with the SET ID
    Method is left out-of-scope.
    Some systems already have mechanisms to securely associate device identity with subscriber (e.g. Apple, Blackberry)
    Example method provided below.
(Out of Scope) Subscriber Authorization II
  An example method for securely associating a subscriber with device identity
    SLP Operator prompts the subscriber to connect to an SLP-owned website while using the SET.
    Subscriber connects to website (possibly WAP) while using the SET.
    Web server requests TLS handshake with device certificate and web-server certificate
      This certificate may be distinct from the SLP servicer
    The subscriber performs some (out of scope) authentication with the website. For example, the website could request an SLP-specific username/password, or federated username/password or other subscriber details such as address, date of birth, etc.
    The SLP operator has now securely associated the subscriber with the device identity and should store this association in the SLP.
Runtime TLS Handshakes Overview
  Device Certificate based client authentication
    Server is first authenticated using public key TLS as in ACA producing a secure encrypted IP connection
    This preserves anonymity by hiding device identity in device certificate
    Next, the Client and Server perform mutually-authenticated TLS based on server certificates and device certificates
Run-Time TLS Handshakes Details
  First TLS handshake of the first SUPL session to initiate server authenticated secured tunnel:
    SET→SLP: Client Hello indicating support for TLS with server certificates and device certificates
    SLP→SET: Server Hello indicating cipher suite for TLS with server certificates
    SLP←→SET: complete TLS handshake to establish secured tunnel
  Second TLS handshake to perform mutual authentication
    SLP→SET: Hello Request to initiate renegotiation
    SET→SLP: Client Hello indicating support for TLS with server certificates and device certificates
    SLP→SET: Server Hello indicating selection of TLS with server certificates and device certificates
    SLP←ΘSET: complete TLS handshake to establish secured tunnel
  SET and SLP can now conduct SUPL session over secured channel
Certificate Revocation
  Both device and server certificates can be revoked
  Both device and server can use methods such as a Certificate Revocation List (e.g. [RFC3280]) or Online Certificate Status Protocol (OCSP) [RFC2560] to check if the device certificate has been revoked
  The specific method is a stage 3 consideration.
SUPL INIT Protection Overview
  SUPL INIT protection in SUPL 3.0 is based on SUPL INIT protection mechanism in SUPL 2.0 and uses a Message Authentication Code (MAC) attached to SUPL INIT This security is to prevent denial of service attacks on the SLP.

SUPL v3.0 offers the same protection as SUPL v2.0:
  Mode A Protection
    Applies if using GBA-based client authentication
    Identical to Basic Protection from SUPL v2.0
    Uses GBA-based SUPL_INIT_ROOT_KEY
  Mode B Protection
    SUPL v3.0 adds support using SLP-provisioned SUPL_INIT_ROOT_KEY
    Supports ACA and Device-Certificate client authentication
    NULL Protection is also supported and may be used based on operator's choice.
SUPL v3.0 adds mechanism for SLP to provision SUPL_INIT_ROOT_KEY
Mode B Protection SUPL_INIT_ROOT_KEY
  Mode B SUPL_INIT protection requires the SLP to provision a SUPL_INIT_ROOT_KEY to the device
  The SUPL_INIT_ROOT_KEY is unique to this combination of device and subscriber
    Note that the SUPL_INIT_ROOT_KEY can be used only for providing protection to the SLP against denial-of-service attack
  Disclosing the key will not reveal any user data
  Disclosing the key will only add one extra device that could be involved in a Denial of Service Attack
    Since each SUPL_INIT_ROOT_KEY has little value, the key can be effectively "permanent" and stored with other details associated with the subscription.
  That is, a special server is not necessary to secure these keys.
    Note: the SET deletes SUPL_INIT_ROOT_KEY if the UICC is removed, since this indicates a change of ownership.
Mode B Procedures
  Mode B Initiating Provisioning
  Procedures for initiating Mode B Provisioning
  Mode B Provisioning
  SLP provisions SUPL_NIT_ROOT_KEY to the SET
  Mode B Usage without a SUPL_INIT_ROOT_KEY
  If no SUPL_INIT_ROOT_KEY has been provisioned, then the SET accepts the first SUPL_INIT message it receives from the SLP without verifying the MAC.
  Mode B Usage with a SUPL_INIT_ROOT_KEY
  Once SUPL_INIT_ROOT_KEY has been provisioned, then the SET accepts SUPL_INIT message it receives from the SLP if the MAC and the time are verified correctly and does not accept SUPL_INIT message otherwise
  Mode B Exception—Hard Reset
Mode B Initiating Provisioning
  Initiating SUPL_INIT_ROOT_KEY provisioning, and SUPL_INIT_ROOT_KEY provision occur during a (secured) ULP session between the SET and SLP
  Initiating SUPL_INIT_ROOT_KEY Provisioning
    If, at the beginning of a secured ULP session, the SET notices that it does not have a SUPL_INIT_ROOT_KEY, then the SET initiates SUPL_INIT_ROOT_KEY provisioning by including a SUPL_INIT_ROOT_KEY_Request indicator in the first ULP message.
    Note that the SET may be configured to originate a SUPL session (to request a SUPL_INIT_ROOT_KEY) after some number of SUPL INIT failures over a period of time if a session does not otherwise occur.
    If the SLP suspects that the SUPL_INIT_ROOT_KEY in the SET has been corrupted (e.g., if the SET has not been responding to SUPL_INIT messages for some time), then the SLP may initiate SUPL_INIT_ROOT_KEY Provisioning following receipt of the first ULP message from the SET
  Mode B Provisioning
    Note: This procedure follows "Mode B Initiating Provisioning"
    If the SLP has chosen not to support Mode B Protection, then the SLP sends an appropriate indication to the SET
    Otherwise
      The SLP obtains SUPL_INIT_ROOT_KEY
      If the SLP has an existing SUPL_INIT_ROOT_KEY associated with this combination of SET and subscriber, then the SLP retrieves this value from its records
      If the SLP does not have an existing SUPL_INIT_ROOT_KEY associated with this combination of SET and subscriber, then the SLP generates a fresh SUPL_INIT_ROOT_KEY
      The SLP sends the SUPL_INIT_ROOT_KEY to the SET as a parameter in a secured ULP message
      The SET stores the value of SUPL_INIT_ROOT_KEY.
      The SET may apply some protection to the stored value that would allow the SET to later detect if the stored value of SUPL_INIT_ROOT_KEY had been corrupted. Examples of such protection include error correction and/or an integrity check.
  Mode B Usage without a SUPL_INIT_ROOT_KEY
    The SET may be in a state where Mode B protection may be applied, but it has no SUPL_INIT_ROOT_KEY. Examples include:
      At power-up, before a SUPL_NIT_ROOT_KEY has been provisioned.
      The SUPL_INIT_ROOT_KEY has been corrupted or deleted.
    If the SET is in such a state, then the SET accepts the first SUPL_INIT message it receives from the SLP, without verifying the MAC
      The SET establishes a TLS session with the SLP
      The SET performs Mode B Initiating Provisioning procedures above to request a SUPL_INIT_ROOT_KEY
    If the SLP knows that the SET is in such a state, then the SLP sends SUPL_INIT messages using NULL Protection, with the knowledge that the SET will accept such messages anyway.
      In the subsequent ULP session, the SET or SLP can use Mode B Initiating Provisioning procedures above to initiate provisioning of a SUPL_INIT_ROOT_KEY
  Mode B Usage with a SUPL_INIT_ROOT_KEY
    If the SLP believes that the SET has a SUPL_INIT_ROOT_KEY, then the SLP adds a SUPL_INIT Protector to each SUPL_INIT message—this allows the SET to check the authenticity of the received SUPL_INIT message.
    If using Mode B Protection, then the SUPL_INIT Protector parameter consists of
    SUPL_INIT_TIME (length=4 octets). Time of sending message. Stops replay.
    SUPL_INIT_MODE_B_MAC (length=4 octets). Authenticates the message.
    If the SET has a SUPL_INIT_ROOT_KEY, then the SET accepts the message only if the SUPL_INIT_TIME is valid and the SUPL_INIT_MODE_B_MAC provided in the SUPL_INIT agrees with the value computed by the SET SUPL_INIT_MODE_B_MAC_Computation The SUPL_INIT_MODE_B_MAC parameter is generated as follows:

SUPL_INIT_MODE_B_MAC=HMAC-SHA256-32(SUPL_INIT_ROOT_KEY, SUPL_INIT_Z)

SUPL_INIT_Z is the SUPL INIT message with the SUPL_INIT_MODE_B_MAC field set to all zeroes.

Mode B Exception—Hard Reset

For exception cases (e.g. SET and SLP out of synch) where an operator uses SUPL INIT protection, null SUPL INIT protection may be used temporarily to reprovision the SET as long as this is explicitly indicated to the SET (e.g. via a reset command) so that a Denial of Service attack cannot take advantage of this by sending unprotected SUPL INITs to a large number of SETs This reset command is input directly to the SET to prevent introducing new threats.

Summary

A new security model for SUPL 3.0: Client Authentication using device certificates.

Device certificates are provisioned at manufacture

SUPL INIT protection supported also in client authentication using device certificates.

Device certificate based client authentication is a bearer agnostic security model and is thus suitable for SUPL 3.0.

Legacy security models (ACA and GBA) may still be used depending on SUPL operator's choice.

Recommendation

Client Authentication using device certificates as security model for SUPL 3.0.

Maintain support for legacy ACA and GBA security models.

Additional Embodiment 7

Security solutions for SUPL 2.0 may not be available other than over 3GPP, 3GPP2 and WIMax access networks (e.g. may not support WiFi access) and include implementation of GBA in order to support strong security. In addition, the security solutions may not allow Access related SLPs (A-SLPs) to be supported instead of or in addition to home operator SLPs (H-SLPs).

This embodiment makes use of a Username and Password assigned to a user or a user's SUPL Enabled Terminal (SET) by an SLP provider to support client (SET) authentication using TLS-SRP. A SUPL SET and SLP may use public key TLS to allow the SET to authenticate the SLP. This may produce a secure TLS/IP connection over which a second authentication occurs of the SET by the SLP using TLS-SRP (and the pre-agreed Username and Password). This may modify the initial secure IP/TLS connection which is then used to support a secure SUPL session. The SLP may then use this SUPL session to provide a new Username and password to the SET to replace the initially assigned Username and password. The new Username and Password may not be visible to the user; this may prevent a user from using the Username and Password in more than one device and may protect the user from accidental transfer of the initial Username password to other users. The solution may be used for both an H-SLP and an A-SLP and does not necessarily require use of 3GPP, 3GPP2 or WiMax access networks only.

Thus, the described embodiments may extend SUPL security support to all IP access networks, provide stronger security than currently deployed solutions without having to support GBA, and may support an H-SLP and A-SLP (section numbers may refer to SUPL 3.0 section numbers).

6. Security Considerations

This section describes a SUPL Security function that enables the SUPL network to authenticate and authorize the SET and enables the SET to authenticate and authorize the SUPL network.

NOTE: Unless otherwise specified, the use of the acronym TLS refers to any session that can be negotiated using a TLS handshake: this includes both TLS 1.1 ciphersuites and TLS-PSK ciphersuites.

NOTE: In this section, the following definitions apply. A 3GPP bearer network is one for which the standards are maintained by 3GPP; these include GSM, GPRS, EDGE, WCDMA/TD-SCDMA, LTE and LTE-A bearer networks. A 3GPP2 bearer network is one for which the standards are maintained by 3GPP2; these include cdmaOne, cdma2000 1× and cdma200 EV-DO bearer networks. A 3GPP SET (3GPP2 SET respectively) is a SET whose home network operator principally supports data access via a 3GPP bearer network (3GPP2 bearer network respectively). A WiMAX SET is a SET whose home network operator principally supports data access via a WiMAX bearer network. In cases of ambiguity (e.g. an operator who supports multiple access types), the operator may decide the type of SET.

NOTE: H-SLP operators should note that the authentication methods described herein remain valid for SET handover between access networks belonging to the same operator or where the SET IP address is not changed. The procedures do not take into account scenarios where the SET moves from one access network to another belonging to different operators or where the IP address changes. It is assumed in these scenarios, that after the hand over to another access system, the security context may not be available in the terminal and the network and the level of trust between the network and terminal may change.

On powering up and shutting down, detection of a new UICC or removal of a UICC, the SET handset MUST delete any keys (aside form long-term keys) on the SET handset associated with SUPL 3.0, including GBA Keys: such as Ks, Ks_NAF, Ks_ext_NAF WIMAX Keys: such as SEK TLS Keys: such as pre_master_secret, master_secret, and PSK values (aside from long-term keys).

SUPL Specific Keys: such as keys associated with protection of SUPL INIT messages.

6.1 SUPL Authentication Methods

Authentication support requirements for SUPL 3.0 are as follows:

Mutual authentication MAY be supported between a SET and an H-SLP.

Mutual authentication MAY be supported between a SET and a D-SLP.

Server authentication MAY be supported between a SET and an E-SLP, and mutual authentication MAY be supported between a SET and E-SLP.

SUPL 3.0 supports two classes of SET authentication methods

AN-Dependent method, where the credentials are bound to the Access Network subscription of the SET User.

AN-Independent methods, where the credentials are bound to the SET, but not directly bound to the Access Network subscription of the SET User. Binding such credentials to the Access Network subscription of the SET User may be achieved using out-of-scope procedures. See Section 6.6 for more discussion of out-of-scope procedures.

When mutual authentication is performed, the SET MAY act on behalf of the SET User via a SUPL Agent contained in the SET.

For AN-Dependent methods, the SET uses the security credentials associated with the SET User.

For AN-Independent methods, the SET uses the security credentials associated with the SET.

Note that a successful authentication of the SET User MUST result in a successful identification of the SET User's ID (e.g., MSISDN, WIMAX user ID or AN-independent user identity).

Note that when MSISDN is used for identification, the SLP MUST perform an IMSI to MSISDN binding before the MSISDN of the authenticated SET User is securely identified.

The details of Key Management can be found in section 6.1.2.

6.1.1 Authentication Methods

Section 6.1.1.1 lists the authentication methods supported in this specification. An informative overview of these methods is provided in section 6.1.1.2. Section 6.1.1.3 describes which methods are mandatory or optional in the various SUPL 3.0 entities, and lists the protocols required in each entity if it is to support a given mutual-authentication method.

6.1.1.1 List of Supported Mutual-Authentication Methods

The SUPL Authentication model requires establishing shared secret keys between the SLP and the SET, bound to either a removable token such as a R-UIM/UICC/SIM/USIM or the SET handset.

There are two classes of authentication methods specified in this document:

PSK-based methods, consisting of the following methods:
  AN-dependent Generic Bootstrapping Architecture (GBA)-based method, providing mutual authentication;
  AN-dependent SEK based method (only applicable to a WIMAX SLP), providing mutual authentication;

Certificate based methods, consisting of the following methods:
  AN-Independent Device-Certificate based (DCert) Method, providing mutual authentication;
  AN-dependent Alternative Client authentication (ACA)-based method, providing mutual authentication;
  AN-Independent SLP-only method (only applicable in emergency cases), providing SLP authentication only.

6.1.1.2 Overview of Supported Authentication Methods (Informative)

1. Generic Bootstrapping Architecture (GBA)-Based.
   TLS-PSK with Generic Bootstrapping Architecture (GBA) GBA provides mutual authentication capability based on shared secret that is derived using existing 3GPP/3GPP2 authentication mechanisms.

SET and SLP are mutually authenticated using TLS-PSK with Generic Bootstrapping Architecture (GBA).

2. SEK Based (Only Applicable to WIMAX SLP).
   SET and SLP are mutually authenticated using TLS-PSK with SEK. The details of SEK method can be found in section 6.1.2.1.2.

3. Device Certificate (DCert)-Based.
   This AN-Independent method uses TLS with
   RSA server certificate to authenticate the SLP to the SET,
   RSA client certificate to authenticate the SET to the SLP.

4. Alternative Client Authentication (ACA)-Based.
   This uses TLS with
   RSA certificate to authenticate the SLP to the SET,
   Alternative Client authentication of the SET to the SLP (see section 6.1.4). In this case, the SLP authenticates the SET by getting the bearer network to confirm the IP address associated with the SET Identifier (MSISDN etc.).

5. SLP-Only.
   This is used in scenarios where it is not possible for the SLP to authenticate the SET. This method MAY NOT be used for non-emergency cases. The SET cannot distinguish between this method and ACA-based. This uses TLS with
   An RSA certificate to authenticate the SLP to the SET,
   The SET is not authenticated.

6.1.1.3 Support for Mutual-Authentication Methods and Protocols by Entity

The four tables below describe what is optional and mandatory to support for SUPL 3.0 in various classes of SETs and SLP's supporting those SETs:

The first table indicates those methods that are mandatory and those methods that are optional to implement for SUPL 3.0 in
  3GPP/3GPP2 SETs,
  SET (R-)UIM/SIM/USIM and
  SLPs supporting 3GPP/3GPP2 SETs;

The second table indicates those methods that are mandatory and those methods that are optional to implement for SUPL 3.0 in
  WiMAX SETs and
  SLPs supporting those WiMAX SETs;

The third table indicate those methods that are mandatory and those methods that are optional to implement for SUPL 3.0 in
  SETs that do not support 3GPP/3GPP2 or WiMAX, and
  SLPs supporting those SETS.

The fourth table lists the required protocols for the SLP, SET Handset and (where applicable) SET (R-)UIM/SIM/USIM for supporting each of the various authentication methods.

Requirement status (mandatory or optional) of the various authentication methods for 3GPP/3GPP2 SETs and SLPs supporting these SETs.

Requirement Status for SUPL Authentication Method for 3GPP/3GPP2 SETs, SET (R-)UIM/SIM/USIM and SLPs supporting 3GPP/3GPP2 SETs

| Entity | PSK-based methods GBA-based | Certificate Based Methods | | |
|---|---|---|---|---|
| | | ACA-based | DCert | SLP-only (E-SLP only) |
| SET Handset | Optional | Mandatory. See Note 2 below. | Optional | Mandatory. See Note 1 below. |

Requirement status (mandatory or optional) of the various authentication methods for 3GPP/3GPP2 SETs and SLPs supporting these SETs.

Requirement Status for SUPL Authentication Method for 3GPP/3GPP2 SETs, SET (R-)UIM/SIM/USIM and SLPs supporting 3GPP/3GPP2 SETs

| Entity | PSK-based methods GBA-based | Certificate Based Methods | | |
|---|---|---|---|---|
| | | ACA-based | DCert | SLP-only (E-SLP only) |
| SET SIM/USIM/(R)-UIM | SIM/USIM/(R)-UIM is involved in this method, but it already supports the necessary algorithm | This entity is not involved in this method | This entity is not involved in this method | This entity is not involved in this method |
| H/D-SLP | Mandatory to support one of these two methods | | Optional | Not supported |
| E-SLP | Optional | Optional | Optional | Mandatory |

Note 1: SET Handset support for the SLP-only method may be required for emergency cases.
Note 2: The SET procedures for the ACA-based method (only for 3GPP and 3GPP2) are identical to the SET procedures for SLP-only method. Consequently, 3GPP/3GPP2 SET Handset support the ACA-based method as a results of the SLP-only method being required for emergency cases.

Requirement status (mandatory or optional) of the various authentication methods for WiMAX SETs, and SLPs supporting these WiMAX SETs.

Requirement Status for SUPL Authentication Method for WiMAX SETs, and SLPs supporting these SETs

| Entity | PSK-based methods SEK based | Certificate Based Methods | | |
|---|---|---|---|---|
| | | ACA-based | DCert | SLP-only (E-SLP only) |
| SET Handset | Mandatory | Not Supported | Optional | Mandatory |
| H/D-SLP | Mandatory | Not Supported | Optional | Not Supported |
| E-SLP | Optional | Not Supported | Optional | Mandatory |

Requirement status (mandatory or optional) of the various authentication methods for SETs not supporting 3GPP, 3GPP2 or WiMAX, and SLPs supporting these SETs Requirement Status for SUPL Authentication Method for SETs not supporting 3GPP, 3GPP2 and WiMAX, and SLPs supporting these SETs

| Entity | PSK-based methods SEK/GBA based | Certificate Based Methods | | |
|---|---|---|---|---|
| | | ACA-based | DCert | SLP-only (E-SLP only) |
| SET Handset | Not Supported | Not Supported | Mandatory | Mandatory |
| H/D-SLP | Not Supported | Not Supported | Mandatory | Not Supported |
| E-SLP | Not Supported | Not Supported | Optional | Mandatory |

Required protocols for the SLP, SET Handset and SET R-UIM/UICC/SIM/USIM for supporting the various mutual authentication methods.

| | Algorithms required to support the Authentication Method between SET and SLP | | | | |
|---|---|---|---|---|---|
| | PSK-based methods | | Certificate Based Methods | | |
| Entity | GBA-based (3GPP/3GPP2 only) | SEK-based (WiMAX only) | ACA-based (3GPP & 3GPP2 only) | DCert | SLP-only (E-SLP only) |
| SLP | GBA & TLS-PSK | SEK & TLS-PSK | TLS using server certificates & IP Address/SET ID binding | TLS using server certificates and client certificates | TLS using server certificates |
| SET Handset | GBA & TLS-PSK | SEK & TLS-PSK | TLS using server certificates | TLS using server certificates and client certificates | TLS using server certificates |
| SET R-UIM/UICC/SIM/USIM | No additional algorithms required | Not applicable | No additional algorithms required | Not applicable | Not applicable |

Where the GBA-based method is supported, the BSF stores user security settings (USS) associated with the H-SLP applications. When the H-SLP requests the USS, the BSF must include a SET user identity (e.g. IMPI, IMSI or MSISDN) in the USS.
NOTE:
The GBA-based method is not dependent on using a 3GPP or 3GPP2 bearer network to transport the SUPL sessions. However, the SET must have a 3GPP or 3GPP home network operator in order to have the necessary credentials for performing GBA.

6.1.1.4 Techniques for Minimizing the TLS Handshake Workload

The procedures in this section minimize the workload associated with establishing TLS sessions between the SLP and SET. Where there is a conflict with TLS, TLS takes precedence.

If a SET and SLP are communicating SUPL messages associated with more than one SUPL sessions simultaneously, then the SET and SLP SHOULD use a single TLS sessions to secure these messages; that is, the SET and SLP SHOULD NOT establish distinct TLS sessions if SUPL sessions are simultaneous.

If the SET and SLP establish a TLS session, then the SLP MAY allow the session to be resumed using the abbreviated handshake. The advantage of resuming a TLS session is that resuming a TLS session based on server certificates does not require the public-key operations: only symmetric cryptographic algorithms are required (which require significantly less processing).

NOTE: This approach is not recommended for E-SLP's since emergency SUPL sessions occur too occasionally to warrant storing the necessary data.

NOTE: The SLP allows the session to be resumed by allocating a TLS SessionID.

NOTE: There is no advantage to resuming a TLS-PSK session (as used for GBA and SEK-based authentication), since the same computations are performed. However, an SLP may still allow resuming a TLS-PSK session.

NOTE: A SET indicates the choice to resume a TLS session by including the TLS SessionID (of the TLS session to be resumed) in the TLS SessionID parameter in the ClientHello message of the TLS Handshake. If the SET does not wish to resume a TLS session, then the SET sends the TLS ClientHello message without including the TLS SessionID, in which case the full handshake will be performed. If the TLS SessionID parameter is present in the TLS ClientHello message, the SLP then chooses whether or not to resume the TLS session. If no SessionID parameter is present in the TLS ClientHello message, then the SLP cannot associate the TLS handshake with a previous TLS Session, so the TLS handshake establishes a completely fresh TLS session using a full handshake.

The SET chooses whether or not to resume a TLS session, using the following guidelines.

The SET MUST NOT resume a TLS session if the underlying credentials (Ks(_ext)_NAF or SLP certificate or SEK or Device Certificate) are expired.

The SET MAY choose to not resume a TLS session earlier than the expiry of the underlying credentials, if desired.

The SET MUST NOT resume a session that was established prior to power-up or detection of a new R-UIM/UICC/SIM/USIM.

The SLP chooses whether or not to resume a TLS session, using the following guidelines.

The SLP MUST NOT resume a TLS session if the underlying credentials (Ks(_ext)_NAF or SLP certificate or SEK or Device Certificate) are expired.

The SLP MAY choose to not resume a TLS session earlier than the expiry of the underlying credentials if desired.

NOTE: Each SLP must decide for itself whether or not to allow abbreviated handshakes, and this decision can even be made on a SET-by-SET basis. The SLP is taking a small risk when it accepts to resume an existing TLS session. This risk is the possibility of a "naughty" SET distributing the master_secret (established during a full TLS handshake), so that others may resume that TLS session, thus allowing multiple SETs to obtain service that will be charged to a single SET. The "naughty" SET could be doing this without the knowledge of the SET owner (for example, a malicious code could be at fault). Note that the loss can be easily limited: if a SLP detects (or suspects) that such abuse is occurring, then the SLP can easily (a) end the TLS sessions using that master_secret, (b) identify the "naughty" SET and (c) re-authenticate the "naughty" SET using full handshake to allow the user to continue to have service if required. In summary, the benefit of resuming sessions (in terms of reduced computation) for the DCert method, ACA-based method and SLP-only method is thought to exceed the risk of attack.

6.1.2 Key Management for SUPL Authentication

The SUPL Authentication model requires establishing shared secret keys between the SLP and the SET, bound to either a removable token such as a R-UIM/UICC/SIM/USIM or the SET handset.

6.1.2.1 PSK-Based Methods

6.1.2.1.1 Deployments Supporting the GBA Method

In the case of deployments supporting GBA, the shared keys are established as follows:

When the SLP requests key material form the BSF (for securing IP communication and for protecting SUPL INIT), the SLP MUST also request the USS (User security settings). The USS MUST include a permanent user identity (e.g. IMPI, IMSI or MSISDN).

For securing IP communication between the SET and SLP, the SET and the SLP MUST derive a shared secret key and operate according to TLS-PSK using GBA. The SLP MUST have well defined domain name SLP_Address_FQDN designating the SLP, e.g., slp.operator.com. The GBA Ua security protocol identifier that may be used for TLS-PSK is defined in OMNA Registry. The SLP MUST confirm that the permanent user identity provided by the BSF corresponds to the SET identity in SUPL messages received by the SLP over the corresponding secured connection.

For MAC protection of SUPL INIT, keys are derived according to GBA. The GBA Ua security protocol identifier that may be used for SUPL INIT protection is defined in OMNA Registry. The keyIdentifier of the basicMAC included in the SUPL INIT message MUST be the B-TID of the Ks from which the Ks_NAF is generated. NOTE: The H/D-SLP request for SUPL INIT protection keys from the BSF would typically occur simultaneously with the H/D-SLP request for the keys securing IP communication.

The SET MUST ensure that it is always provisioned with a valid Ks. If no valid Ks is present then the SET MUST initiate the GBA Bootstrapping procedure to provision Ks. A new Ks MUST be established each time a new UICC (USIM/SIM/R-UIM) is detected by the SET. Additionally, the SET MUST establish new shared keys when the Ks_NAFs lifetime (set by the Home Network operator) expires.

6.1.2.1.2 Deployments Supporting the SEK Method

In the case of deployments supporting SEK, the shared keys are established as follows:

For securing IP communication between the SET and SLP, the SET and SLP MUST derive a shared secret key and confirm that the permanent user identity provided by the WiMAX AAA server corresponds to the SET identity in the SUPL messages received by the SLP over the corresponding secured connection. The shared keys are derived in the following way:

SEK=the 16 most significant (leftmost) octets of HMAC-SHA256(LSK, "slp.operator.com") where 'operator.com' is the FQDN of the WIMAX operator and LSK is derived as specified in WiMAX Network Protocols and Architecture for Location Based Services.

SEK will inherit the Location Key Identifier (LSK-ID) (as defined in

WiMAX Network Protocols and Architecture for Location Based Services) associated with the LSK and the key identity will be used as the B-TID for WiMAX deployments.

For MAC integrity protection of SUPL INIT, keys are derived the following way:
SEK_MAC=the 16 most significant (leftmost) octets of HMAC-SHA256(LSK, "mac.slp.operator.com") where 'operator.com' is the FQDN of the SLP operator and LSK is derived as specified in WiMAX Network Protocols and Architecture for Location Based Services.

The keyIdentifier of the Mode AMAC included in the SUPL INIT message MUST be the B-TID of the LSK from which the SEK_MAC is generated. NOTE: The SLP request for SUPL INIT protection keys from the WiMAX AAA would typically occur simultaneously with SLP request for the keys securing IP communication.

The SET MUST ensure that it is always provided with a valid SEK. If no valid SEK is present then the SET MUST derive the SEK as specified above. Additionally, the SET MUST establish new shared keys when the lifetime of the LSK expires. The interface between the SLP and the WiMAX AAA server is out of scope of SUPL 3.0.

6.1.2.2 Server-Certificate Based Methods 6.1.2.2.1 Deployments Supporting the DCert Method In the case of deployments supporting the DCert method, the shared keys are established as follows:
For securing IP communication between the SET and SLP, the SET and SLP MUST use TLS-RSA with a server-certificate authenticating the SLP and a client certificate authenticating the SET. The client certificate may provide a globally unique SET device identity:
3GPP SETs MAY use the IMEI as the globally unique SET device identity.
3GPP2 SETs MAY use the MSID as the globally unique SET device identity.
WiMAX SETs MAY use the SET serial number as the globally unique SET device identity.
All other SETS MAY use a suitable global identifier (e.g. a serial number that includes the vendor identity) as the globally unique SET device identity.
The SUPL User must securely verify to the SLP that this device should be associated with their subscription. This secure verification is out of scope of this specification. See Section 6.5 for further discussion of this topic.
For MAC integrity protection of SUPL INIT, keys are provided to the SET by the SLP in a ULP message. This is described in Section 6.3.5.

6.1.2.2.2 Deployments Supporting the ACA Method

In the case of deployments supporting the ACA method, the shared keys are established as follows:
For securing IP communication between the SET and SLP, the SET and SLP MUST use TLS-RSA with a server-certificate authenticating the SLP. SET authentication (which binds the resulting shared secret keys to either the removable or integrated token discussed above) is described in section 6.1.4 for non-emergency cases and sections 6.2.5 for emergency cases.
For MAC integrity protection of SUPL INIT, keys are provided to the SET by the SLP in a ULP message. This is described in Section 6.3.5.

6.1.2.2.3 Deployments Supporting the SLP-Only Method

In the case of deployments supporting the SLP-Only Method, the shared keys are established as follows:
For securing IP communication between the SET and SLP, the SET and SLP MUST use TLS-RSA with a server-certificate authenticating the SLP. There is no SET authentication (which binds the resulting shared secret keys to either the R-UIM/UICC/SIM/USIM or the SET handset) as described in section 6.1.4 for non-emergency cases and section 6.2.5 for emergency cases.
MAC protection of SUPL INIT is not supported in these cases.

6.1.3 TLS Handshake and Negotiation of Mutual-Authentication Method

The SET and SLP need to agree on a mutually-supported authentication method to be applied.

6.1.3.1 Regarding Negotiating a Mutual-Authentication Method (Informative)

When establishing a TLS connection to the H-SLP, the SET first attempts to establish a connection using the mutually-supported authentication mechanism with highest preference, according to the following order of preference:
PSK-based methods: GBA or SEK-based method first preference (if supported);
DCert method: second preference (if supported);
ACA or SLP-only methods: third preference (from the SET's perspective there is no difference between the ACA-based method and the SLP-only method).

If there is no mutually-supported authentication method, then the SET may be unable to perform SUPL session.

A SET that supports PSK based methods may be unable to use the GBA or SEK-based method at a given point in time due to a BSF or WiMAX AAA experiencing problems. Therefore, an attempt by the SET to establish authentication using GBA or SEK does not guarantee that the SET may be able to establish GBA or SEK-based keys.

Consequently, the SET may not always be able to use the mutually-supported authentication mechanism with highest preference. The SET may have to revert to a less preferable mutually-supported authentication mechanism if available.

If only PSK based methods are indicated (in the H-SLP Certificate) as supported by the H-SLP, and the bootstrapping fails, then the SET may wait a little while before re-attempting the TLS handshake, in order to give the appropriate entities a chance to get back on-line.

If the SLP supports only GBA or SEK, then the SLP is restricted to providing SUPL 3.0 services to subscribers of carriers that have deployed GBA or SEK. If the SLP supports only ACA, then SUPL 3.0 can only be used in circumstances discussed in detail in section 6.1.4. Note that in such a case, if the SET communicates via an alternative bearer (such as wireless LAN) for which the SLP cannot obtain IP binding, then the SLP will be unable to authenticate the SET.

If the E-SLP supports only ACA, then there are caveats on SET authentication, as discussed in detail in section 6.2.5.

6.1.3.2 Negotiating a Mutual-Authentication Method for Non-WiMAX SETs

For non-WiMAX SETs, the negotiation of a mutual authentication method for SUPL sessions proceeds as follows:
1. The SET initiates negotiation
   a. If the SET supports GBA, then the SET initiates negotiation according to the relevant GBA specifications.
   b. Otherwise (that is, if the SET does not support GBA) then the SET initiates a TLS handshake with a ClientHello message, with ClientHello.cipher_suites field indicating the supported TLS ciphersuites using RSA encryption for the TLS key exchange algorithm.
2. The SLP processes the received ClientHello message. The SLP examines the ClientHello.ciphersuites list and selects a mutually-supported ciphersuite.
   a. If the SET and SLP both support a TLS-PSK ciphersuite, then this indicates support for GBA. The SLP responds with a ServerHello, ServerKeyExchange and ServerHelloDone message, with ServerHello.cipher_suite indicating a mutually-supported TLS-PSK ciphersuite.
   b. Otherwise, the SET and SLP must support a Certificate based method
      i. If the SLP supports the DCert method, then the SLP responds with
         1. ServerHello with ServerHello.cipher_suite indicating a mutually-supported TLS ciphersuite using RSA encryption for the TLS key exchange algorithm,
         2. Certificate,
         3. CertificateRequest and
         4. ServerHelloDone message.
      ii. Otherwise, if the SET is a 3GPP/3GPP2 SET and the SLP supports the ACA method, then the SLP responds with
         1. ServerHello Certificate, with ServerHello.cipher_suite indicating a mutually-supported TLS ciphersuite using RSA encryption for the TLS key exchange algorithm.
         2. Certificate
         3. (No CertificateRequest message is sent)
         4. ServerHelloDone message
3. The SET processes ServerHello message and other messages appropriate to the selected indicates a ciphersuite to the SET
   a. If ServerHello.cipher_suite indicates that GBA has been selected by the SLP, then the SET and SLP continue the GBA process. The details are outside the scope of this document.
   b. Otherwise, the ServerHello.cipher_suite indicates a mutually-supported TLS ciphersuite using RSA encryption for the TLS key exchange algorithm.
      i. If the SET received a Certificate.Request then
         1. If the SET supports DCert method, then the SET provides a Device Certificate and the SET and Server complete the TLS handshake. The Server attempts to identify the SUPL User associated with the globally unique SET device identity in the Device Certificate. It is presumed that the SUPL User has already securely verified to the SLP that the SET device identity should be associated with their subscription.
            a. If no SUPL User is identified, then the session must be terminated. Since we assume that the TLS handshake has already completed, the Server is capable of communicating at the ULP layer. The Server must send an appropriate ULP error message to terminate the ULP session and then close the TLS session.
            b. If a SUPL User is identified, then the Server provides the SET with the same authorizations as the SUPL User.
         2. Otherwise, the SET replies to the SLP, including an empty ClientCertificate message to implicitly indicate that it does not support the DCert method.
            a. If the SLP supports the ACA, then the SLP and SET continues as per the ACA method. The SLP may continue using the ACA method
            b. If the SLP does not support the ACA or SLP-only method (the SLP might have supported only the DCert method) then the SLP terminates the TLS handshake with the appropriate TLS alert message.
      ii. If the Server does not send a Certificate.Request then the SET continues as per the ACA method. The SLP may continue using either the ACA method or SLP-only method.

3GPP2 SETs MAY use a similar method for negotiation of the authentication method with selected differences.

6.1.3.3 Principles for Authentication and Key Re-Negotiation for WiMAX SET and SLP (Informative)

The key re-negotiation can happen in two ways:
1. when the Location Rootkey (as defined in WiMAX Network Protocols and Architecture for Location Based Services) expires the SET automatically re-authenticates itself with the wimax network and the SUPL associated root keys will be re-generated by the SET, or
2. SLP notices that SEK or Location Rootkey (as defined in WiMAX Network Protocols and Architecture for Location Based Services) has expired and it will request a new key from the WiMAX AAA-server, or
3. The SLP sends a "psk_identity_unknown" TLS alert message during the TLS handshake. This indicates to the SET that the SET needs to re-authenticates itself with the wimax network and the SUPL associated root keys will be re-generated by the SET.

6.1.3.3.1 Authentication Procedure

In WiMAX deployments, the PSK TLS handshake may be used with SEK as follows:
the ClientHello message may contain one or more PSK-based ciphersuites;
the ClientHello message may contain the server_name TLS extension as specified in and it may contain the hostname of the SLP;
the ServerHello message may contain a PSK-based ciphersuite selected by the SLP;
the ServerKeyExchange may be sent by the server and it may contain the psk_identity_hint field and it may contain the static string "SUPL WIMAX bootstrapping"
the ClientKeyExchange may contain the psk_identity field and it may contain a prefix "SUPL WIMAX bootstrapping", a separator character ";" and the current B-TID as specified in section 6.1.2.1.2;
the SET may derive the TLS premaster secret from the SLP specific key material i.e. SEK.

6.1.3.3.2 Authentication Failures

Authentication failures may be handled as described in document(s) outside the scope of this document.

6.1.3.3.3 Bootstrapping Required Indication

During TLS handshake, the SLP may indicate to the SET that the SEK key may be required by sending a ServerHello message containing a PSK-based ciphersuite, and a ServerKeyExchange message containing the psk_identity_hint field, which contains a static string "SUPL WIMAX bootstrapping". If the SET does not have a valid SEK this may trigger the SET to derive a new SEK as defined in section 6.1.2.1.2.

6.1.3.3.4 Bootstrapping Renegotiation Indication

During usage of TLS session, the SLP may indicate to the SET that SEK has expired by sending close_notify alert message to the SET. If the SET attempts to resume the old TLS session by sending a ClientHello message containing the old session ID. The SLP may refuse to use the old session ID by sending a ServerHello message with a new session ID. This will indicate to the SET that the SEK it used has expired.

During TLS handshake, the SLP may indicate to the SET that the SEK has expired by sending handshake_failure message as a response to the finished message sent by the SET. This will indicate to the SET that the SEK it used has expired.

6.1.4 Alternative Client Authentication (ACA) Mechanisms

This section applies only to deployments supporting GSM/UMTS and CDMA SETs.

NOTE: Throughout this section, SET_ID refers to either the MSISDN (if the SET is on a 3GPP bearer network) or one of the MDN, MIN or IMSI (if the SET is on a 3GPP2 bearer network).

Section 6.1.3 outlines the circumstances under which the ACA-based method may be selected by the SLP. If the SLP selects the ACA-method during the TLS handshake, then an SET_ID/IP Address Mapping based client authentication MAY be used by the SLPs to authenticate the SET. The rest of this section describes the details of this mechanism, known as the Alternative Client Authentication mechanism. If an SLP implements the Alternative Client Authentication mechanism, then the SLP is recommended to implement the method using PSK-TLS with GBA as well.

Section 6.1.1.3 describes which entities must support the ACA-based method, and the algorithms that must be supported by an entity that supports ACA-based method. For informative purposes, this information is repeated here:
- A bearer network may support the ACA-based method. A bearer network must support the ACA-based method if a H-SLP wishes to support the ACA-based method for the bearer network's subscribers.
- An SLP MAY support the ACA-based method.
- GSM/UMTS and CDMA SET handsets MUST support the ACA-based method.
- The ACA-based method does not involve the SET UICC/UIM/SIM/USIM.
- The ACA-based method does not involve SPC entities.

SETs that support Alternative Client Authentication MUST also support TLS 1.1 with certificate-based server (SLP) authentication. In addition, the SET MUST be provisioned with a root certificate enabling it to verify SLP server certificates. As various different methods exist for provisioning of root certificates to SETs no particular mechanism is defined by this specification. SUPL operators need to ensure that when TLS 1.1 is used for Alternative Client Authentication the relevant root certificates exist in the SET.

SLPs that support Alternative Client Authentication MUST support TLS 1.1 and MUST have a valid TLS Server Certificate, which can be verified by the SETs that implement Alternative Client Authentication.

The Alternative Client Authentication (ACA) mechanism is a mechanism where the SLP can check the binding of the SET's IP address to the SET_ID assigned to the SET. If the ACA mechanism is implemented, then the SLP MUST be able to map the source IP address of a SUPL message received from the SET to the SET_ID used by the SLP to address the SET. In order for an SLP to use the ACA mechanism, the bearer network MUST prevent IP Address Spoofing at the bearer level. A successful mapping between the source IP address and the SET's SET_ID would imply that the SET is securely identified (i.e., authenticated) on the bearer network. This solution does not require any specific client (SET) authentication implementation on the SET but requires the SLP to support acquiring the correct source IP address for a particular SET_ID from the bearer.

3GPP-Bearer-Specific Issues:

The acquisition of the source IP address will not be possible in all cases—e.g. for GPRS roaming access using a GGSN in the visited rather than home network. Therefore, the alternative client authentication mechanism should only be relied on when the home network assigns the source IP address or has access to it—e.g. as applies for GPRS access when the SET may be required to use a GGSN in the home network.

3GPP2-Bearer-Specific Issues:

The acquisition of the source IP address will not be possible in all cases—e.g. for roaming HRPD access using simple IP or MIP access within the visited network. Therefore, the alternative client authentication mechanism should only be relied on when the home network assigns the source IP address or has access to it—e.g. as applies for HRPD access when the SET may be required to use MIP to an HA in the home network.

Section 6.1.4.1 describes how this mechanism is used for client authentication in SUPL 3.0.

In the case that UDP/IP is used to transfer a SUPL INIT, SLP MAY first verify the IP address by querying the bearer network for the SET IP address using the SET_ID or by querying the bearer network for the SET_ID using the IP address.

6.1.4.1 ACA Procedures

Network-Initiated Scenarios:

If, after receiving a SUPL INIT message from the SLP (and after applying the appropriate security mechanisms and notification/verification as described elsewhere in this document), the SET is authorized to continue with the corresponding SUPL sessions, then an existing, open mutually-authenticated TLS session SHOULD be used, or a previous resumable TLS session MAY be resumed as discussed in section 6.1.1.4. If there is no open TLS session, or the SET or SLP choose not to resume a session, then the SET and SLP require a fresh TLS session, and the SET and SLP perform the appropriate steps as described in section 6.1.3 for negotiating an authentication method.

The following steps are used by the SLP when the Alternative Client Authentication Mechanism is to be applied for authenticating the SET in a Network-initiated scenario:
1. Note that the SUPL INIT message was sent in response to an MLP request that supplied a SET_ID. The SLP assigns a SLP Session ID for the MLP request and sends a SUPL INIT. The SLP associates the response from the SET with the request from the MLP using the SLP Session ID. However, the SLP must first verify that the responding SET corresponds to the correct SET_ID. The remaining steps describe this authentication process.
2. The SET establishes a TLS 1.1 session with the SLP. The SET MUST check that the TLS server certificate presented by the SLP is bound to the FQDN of the SLP configured in the SET.
3. The SLP determines if the SLP Session ID in the first SUPL message from the SET (in response to SUPL INIT) corresponds to a currently valid SLP Session ID assigned by the SLP. If the SLP Session ID in the first SUPL message does not correspond to a valid SLP Session ID, then the SLP ends the SUPL Session with the appropriate message. Otherwise, the SLP notes the corresponding SET ID.
4. Prior to responding to the first SUPL Message from the SET (SUPL POS INIT, SUPL START, SUPL AUTH REQUEST, SUPL TRIGGERED START, SUPL REPORT or SUPL END), the SLP MUST verify the SET_ID of the SET. There are two methods for achieving this.
a. Requesting the SET_ID.
   i. The SLP queries the underlying bearer network to find out the current SET_ID using the source IP address used by the SET.
      1. If a valid SET_ID is returned from the bearer for the source IP address of the first SUPL message sent by the SET then the SLP checks that the returned SET_ID is internally associated with the correct SET_ID (see Step 3). If this check fails, then the SLP ends the SUPL session with the appropriate message. Otherwise, the SET is considered authentic, and the SLP continues with the SUPL session.
      2. If a valid SET_ID cannot be found, then the SLP MUST terminate the SUPL session with the relevant SUPL error messages.
b. Requesting the IP address.
   i. The SLP queries the underlying bearer network to find out the source IP address being used by the SET associated with this SET_ID (see Step 3).
      1. If the bearer network returns an IP address, then the SLP checks that this IP address corresponds to the Source IP address of the first SUPL message. If this check fails, then the SLP ends the SUPL session with the appropriate SUPL message. Otherwise, the SET is considered authentic and the SLP continues with the SUPL session.
      2. If an IP address cannot be found, then the SLP MUST terminate the SUPL session with the relevant SUPL error messages.

NOTE: a bearer network might support only one of the two types of query (requesting IP address or requesting SET_ID) in Step 4 for obtaining an SET_ID/IP address binding. The SLP is responsible for conforming with the method supported by the bearer network.

SET-Initiated Scenarios:

When the SET wishes to initiate a SUPL session, an existing, open mutually-authenticated TLS session SHOULD be used, or a previous resumable TLS session MAY be resumed as discussed in section 6.1.1.4. If there is no open TLS session, or the SET or SLP chooses not to resume a session, then the SET and SLP require a fresh TLS session, and the SET and SLP perform the appropriate steps as described in section 6.1.3 for negotiating an authentication method.

The following steps are used by the SLP when the Alternative Client Authentication Mechanism is to be applied for authenticating the SET in a SET-initiated scenario.
1. The SET establishes a TLS 1.1 session with the SLP. The SET MUST check that the TLS server certificate presented by the SLP is bound to the FQDN of the SLP configured in the SET.
2. Prior to responding to the first SUPL Message (e.g. SUPL START, SUPL TRIGGERED START), the SLP MUST verify the SET_ID of the SET. There are two methods for achieving this.
   a. Requesting the SET_ID.
      i. The SLP queries the underlying bearer network to find out the current SET_ID using the source IP address used by the SET.
         1. If a valid SET_ID is returned from the bearer for the source IP address of the first SUPL message sent by the SET then the SLP checks that the returned SET_ID is same as provided by the SET. If this check fails, then the SLP ends the SUPL session with the appropriate message. Otherwise, the SET is considered authentic, and the SLP continues with the SUPL session.
         2. If a valid SET_ID cannot be found the SLP MUST terminate the SUPL session with the relevant SUPL error messages.
   b. Requesting the IP address.
      i. The SLP queries the underlying bearer network to find out the source IP address being used by the SET associated with this SET_ID.
         1. If the bearer network returns an IP address, then the SLP checks that this IP address corresponds to the Source IP address of the first SUPL message. If this check fails, then the SLP ends the SUPL session with the appropriate message. Otherwise, the SET is considered authentic and the SLP continues with the SUPL session.
         2. If an IP address cannot be found the SLP MUST terminate the SUPL session with the relevant SUPL error messages.

NOTE: In both the SLP-Initiated and SET-Initiated scenarios, the SLP can re-authenticate the SET by sending an appropriate query to the bearer network to bind the SET_ID to the source IP address currently in use. There are various circumstances where this could be useful, for example: (A) if the IP address of the SET changes during a TLS session, then the SLP can send the appropriate query to the bearer network to ensure that the SET_ID is associated with the new IP address; (B) when resuming a TLS session, the SLP can re-use a previous TLS session as discussed in section 6.1.1.4, thereby saving computation, and simply send the appropriate query to the bearer network to authenticate the SET. Note that re-authenticating the SET in this manner does not involve interaction with the SET itself.

6.2 Authentication Mechanisms Applicable to an E-SLP 6.2.1 Regarding Emergency-Services Regulatory Bodies SUPL 3.0 emergency SUPL session may be either Network-Initiated (using SUPL) or SET Initiated. The appropriate emergency services regulatory bodies will dictate support for these emergency sessions:
  The appropriate emergency services regulatory bodies may not dictate support for either Network-Initiated or SET-Initiated sessions;
  The appropriate emergency services regulatory bodies may dictate only Network-Initiated sessions;
  The appropriate emergency services regulatory bodies may dictate only SET-Initiated sessions;
  The appropriate emergency services regulatory bodies may dictate support for both Network-Initiated and SET-Initiated sessions.

6.2.2 Prioritization of SUPL Resources During Emergency Sessions

For the duration of an emergency SUPL session on a SET, all SUPL resources on the SET MUST be made available for that emergency session. Consequently:
  When a SET begins an emergency SUPL session, any SUPL communication related to non-emergency sessions MUST be terminated immediately by the SET. If non-emergency SUPL INIT messages are being processed by the SET at this time (e.g. having MAC verified or obtaining user permission), then those processes MAY be aborted and the SUPL INIT messages MAY be discarded.
  If a SET receives non-emergency SUPL INIT message(s) while in emergency SUPL session, these SUPL INIT message(s) MAY be discarded.

6.2.3 E-SLP FQDN

In Network-Initiated emergency SUPL sessions, the FQDN of the E-SLP may be:

1. The FQDN provided to the SET as E-SLP address in the SUPL INIT. The E-SLP FQDN may have format "e-slp.xxx.xxx.xxx.xxx.xxx" where "xxx" can be any valid string.
2. If FQDN is not provided in SUPL INIT, the provisioned H-SLP address may be used.
3. If FQDN is not available as per 1 or 2 above, the FQDN may be defaulted to one of the three alternatives below:
   (if connected to a 3GPP bearer network) "e-slp.mnc<MNC>.mcc<MCC>.pub.3gppnetwork.org" if no FQDN is explicitly provided. In this case, the MCC and MNC correspond to the serving 3GPP network.
   (if connected to a 3GPP2 bearer network) "e-slp.mnc<MNC>.mcc<MCC>.pub.3gpp2network.org" if no FQDN is explicitly provided. In this case, the MCC and MNC correspond to the serving 3GPP2 network.
   (if connected to a WiMAX bearer network) "e-slp.operator.com" where operator.com is the FQDN of the H-SLP operator.

In SET-Initiated emergency SUPL sessions, the FQDN of the E-SLP may be in order of preference:

1. (If applicable) the FQDN dictated by the appropriate emergency services regulatory bodies.
2. An FQDN provided by the local access network or by other means that is verified by the H-SLP
3. An FQDN provided by the H-SLP

6.2.4 Processing Emergency SUPL INIT Messages

SET based integrity verification and message origin authentication of SUPL INIT messages is not used by an E-SLP. Thus, the MAC field in an emergency SUPL INIT MUST NOT be populated.

During an emergency call, a SET MAY NOT apply end-to-end protection of emergency SUPL INIT messages.

Some protection is offered by the use of E-SLP whitelists. The E-SLP whitelist is based on the current position estimate of the SET (such as CellID and/or NetworkID). The E-SLP whitelist is used by a SET to determine the order in which the SET should process received emergency SUPL INIT messages: the E-SLP whitelist MAY NOT be used for discarding emergency SUPL INIT messages.

6.2.4.1 E-SLP Whitelist

If an emergency SUPL INIT message is received over a channel that is not secured end-to-end (such as SMS or OMA Push or UDP/IP) then the emergency SUPL INIT message may be fake or altered. The remainder of this section describes the security countermeasures used to ensure that the SET is able to contact the genuine E-SLP server as soon as possible.

NOTE: regulatory requirements will dictate the conditions under which the SET should accept and process emergency SUPL INIT messages. For example, in many cases, the regulatory requirements only require the SET to accept and process emergency SUPL INIT messages if the SET is currently engaged in an emergency call. Consequently, the conditions (under which the SET should accept and process emergency SUPL INIT messages) are outside the scope of this document.

When a SET receives an emergency SUPL INIT message, the SET MUST first verify that the conditions (under which the SET should accept emergency SUPL INIT messages) are currently satisfied. If the conditions are not satisfied, then the SET MAY ignore the SUPL INIT message. The description from hereon assumes that the conditions were satisfied when the SET received the emergency SUPL INIT message.

NOTE: Attackers could send multiple (fake) emergency messages to the SET at the same time that the SET is expecting a genuine emergency SUPL INIT message. There may be cases where the SET could not be told (in advance) from which Emergency SLP to expect the emergency SUPL INIT message. This attack is motivation for the following procedures.

For the period of time that the "accept and process" conditions are satisfied, the SET MUST NOT delete received emergency SUPL INIT messages even if the emergency SUPL INIT message lists an un-expected address for the E-SLP. Once the SET determines that the conditions are no longer satisfied (for example, once the correct E-SLP has been contacted, or sufficient time has passed after the emergency call) then the SET MUST silently discard any received emergency SUPL INIT messages.

If the SET receives, accepts and processes a fake emergency SUPL INIT message (while the "accept and process" conditions are still satisfied), then the SET might not receive an indication that emergency SUPL INIT message is fake until after attempting to contact the E-SLP indicated in the emergency SUPL INIT message. The indication occurs when the E-SLP rejects the SUPL session. This process is not immediate, so it may be necessary for the SET to queue emergency SUPL INIT messages if it receives more than one emergency SUPL INIT message.

An E-SLP whitelist contains a list of E-SLP FQDNs that the SET could expect to receive emergency SUPL INIT messages from. The SET uses the E-SLP whitelist to ensure that emergency SUPL INIT messages including an E-SLP FQDN that is on the whitelist SHOULD be processed before emergency SUPL INIT messages including an E-SLP FQDN that is not on the whitelist.

EXAMPLE

Emergency SUPL INIT messages containing an E-SLP FQDN on the whitelist are pushed forward on the emergency SUPL INIT queue to ensure that the message is processed before emergency SUPL INIT messages containing an E-SLP FQDN that is not on the whitelist. E-SLP Whitelisting should be the first criteria for ordering the Emergency SUPL INIT queue. The second criteria is the arrival time, using the first-in first-out principle:

If the SET has a current E-SLP whitelist for the SET's current locality, then the SET uses both criteria to order the queue.

If the SET does not have a current E-SLP whitelist for the SET's current locality, then the SET uses the first-in-first-out principle to order the queue.

6.2.4.3 Procedures Regarding Emergency SUPL INIT Messages

If an emergency SUPL INIT is received over a channel that is secured end-to-end (such as a secure SIP Push) then the emergency SUPL INIT message MAY be processed immediately. The remaining considerations of this subsection are ignored in this case.

If an emergency SUPL INIT message is received over a channel that is not secured end-to-end (such as SMS or OMA Push or UDP/IP), then the message is queued as in section 6.2.4.1. The SET works its way through the messages in the queue, applying the appropriate verification and notification before attempting to connect to the E-SLP to respond.

In responding to the SUPL INIT message, the SET may establish a secure TLS session (see sections 6.2.5) with the associated E-SLP (see section 6.2.3), and one of the following takes place:

If, after authenticating the SET (See section 6.2.5), the E-SLP cannot associate the SET with any outstanding SUPL sessions, then the E-SLP MAY end the session. If the TLS Handshake is not yet complete, then the E-SLP SHOULD end the session using a TLS error message, in order to save un-necessary computation. If the TLS handshake is complete, then the E-SLP MAY end the session using a SUPL error message indicating that the SET is not authorized. The SET MAY interpret either form of error message as indication that the SUPL INIT message was fraudulent. The SET then processed to the next SUPL INIT message in order of priority in the queue.

If, after authenticating the SET (See section 6.2.5), the E-SLP can associate the SET with an outstanding SUPL session, then the SET and E-SLP continue as normal.

The SET continues responding to emergency SUPL INIT messages until the genuine message is found. The SET MAY discard any new or queued SUPL INIT messages once the correct E-SLP has been identified. New or queued SUPL INIT messages from the correct E-SLP may still be processed.

The following two notes are suggestions that regulatory bodies may wish to consider.

NOTE: Once the correct E-SLP has been identified, then the SET should ensure that it remembers the FQDN of this correct E-SLP until the SUPL session successfully completes. If the TLS session with the E-SLP ends prematurely (for example, if there is a loss of data connectivity), the the SET should continue attempting to re-establish a TLS session with the E-SLP until the TLS session is re-established so that the SUPL session can continue to successful completion. In some circumstances, it is conceivable that the SET re-establishes the TLS session several times. If the SET is not having success at reestablishing the TLS session, the SET should continue attempting regardless: since this is an emergency situation, the benefit of success outweighs the cost of a flat battery.

NOTE: If the E-SLP loses contact with SET after authentication, but prior to successful completion of the SUPL session, then the E-SLP SHOULD leave the SUPL session open with the hope that the SET is able to re-establish contact and complete the SUPL session.

6.2.5 Authentication for Emergency Sessions

NOTE: the mutual-authentication methods that may be supported by an E-SLP are specified in section 6.1.1.3. The SET and E-SLP negotiate the mutual-authentication method during the TLS handshake, as specified in section 6.1.3.

The order of preference for emergency sessions is
GBA or SEK method: first preference
DCert method: second preference
ACA method: third preference
SLP-only method: last preference. The SLP-only method should be seen as a last resort.

The FQDN of the E-SLP for all these cases is discussed in section 6.2.3.

GBA-Based Method (3GPP/3GPP2 SETs Only):

SETs and E-SLPs MAY perform PSK-TLS with GBA as described in section 6.1.3 with the E-SLP acting as the NAF. The Ks_NAF obtained by an E-SLP for a particular SET may be retained in association with the SET identity (e.g. IMSI, MSISDN) for the lifetime set by the home network operator.

SEK Based Method (WiMAX SETs Only):

SET and E-SLPs MAY perform mutual authentication using PSK-TLS with SEK as described in section 6.1.3 with the E-SLP acting in the similar fashion as H-SLP. The FQDN of the E-SLP is discussed in section 6.2.3. The SEK obtained by an E-SLP for a particular SET may be retained in association with the SET identity (e.g. WiMAX user ID) for the lifetime set by the home network operator.

DCert Method (All SETs):

SET and E-SLPs MAY perform mutual authentication using the DCert method as described in section 6.1.2.2.1. The SET MAY authenticate the E-SLP using a root certificate of the E-SLP contained in the SET and the FQDN of the E-SLP as defined in section 6.2.3.

ACA-Based Method (3GPP/3GPP2 SETs Only while on Corresponding Bearer Networks):

For SUPL 3.0 implementations where both GBA with PSK-TLS and the DCert method ARE NOT supported in the E-SLP, the alternative client authentication mechanism defined in section 6.1.4 MAY be supported with the following differences. The E-SLP MAY authenticate the SET by binding the IP address used by the SET with the IP address for the SET provided to the E-SLP by the serving network—e.g. by the LRF or E-CSCF in a 3GPP network, or in a 3GPP2 network.

Network-Initiated Sessions:
Since the SET IP address is used to initiate any emergency VoIP call and can be verified by the serving network before SUPL is invoked, it may be considered to be reliable by the E-SLP. In the case of an emergency call initiated in circuit mode, the SET IP address may not be known to the serving network (e.g. may be assigned by the home network) in which case the E-SLP cannot be provided with the IP address by the serving network and cannot verify the IP address when received later from the SET.

SET-Initiated Sessions:
In order to use the ACA method, the serving bearer network MUST prevent IP Address Spoofing at the bearer level. It should be noted that the ACA method can be applied even whether or not the SET is registered an authenticated on the bearer network. This supports cases where there is no activated SIM/USIM/UICC/(R)UIM present in the SET.

SLP-Only Method (All SETS):
If no other authentication method can be used, then the SET MAY establish a secure IP connection to an E-SLP using the SLP-only method. The SET MAY authenticate the E-SLP using a root certificate of the E-SLP contained in the SET and the FQDN of the E-SLP as defined in section 6.2.3. The ability to perform mutual authentication depends on where the session was SET initiated or Network-Initiated Network Initiated Sessions:
If the SUPL Session is Network Initiated, then the E-SLP can weakly authenticate the SET based on (e.g.) the session ID and the received hash of the SUPL INIT as discussed in section 6.2.6.

SET Initiated Sessions:
If the SUPL Session is SET Initiated
It should be noted that the SLP-only method can be applied even whether or not the SET is registered an authenticated on the bearer network. This supports cases where there is no activated SIM/USIM/UICC/(R)UIM present in the SET.

6.2.6 Integrity Protection of SUPL INIT for Emergency SUPL Sessions

If the E-SLP is able to authenticate the SET as discussed in section 6.2.5, and the E-SLP can associate the SET with an outstanding SUPL sessions, then the E-SLP checks if the SUPL INIT message was altered. If the E-SLP detects that the SUPL INIT message was altered (for example, if a SUPL AUTH REQ message was received when Proxy mode was indicated, or if SLP Session ID is wrong or if VER fails verification as described in section 6.3.1) then the E-SLP MUST send SUPL INIT to the SET over the TLS session to ensure that the SET is provided with the correct parameters. In response, the SET will discard the SUPL session initiated using the SUPL INIT it originally received, and the SET may begin a new SUPL session using the SUPL INIT received over the TLS session. The SET may then process that SUPL INIT message immediately (that is, the SET does not evaluate the priority using an E-SLP whitelist), performing the appropriate actions for notification and verification, and provided the User does not reject the session, the SET then sends the appropriate message (SUPL POS INIT or SUPL AUTH REQ) to the E-SLP to continue the session.

The ability to resend SUPL INIT is only intended for emergency sessions. In non-emergency sessions, if alteration of SUPL INIT is detected, then the SLP may end the SUPL session using SUPL END, as specified in the non-emergency call flows.

6.3 Processing of the SUPL INIT Messages

As network initiated SUPL sessions are triggered by a SUPL INIT message, it is essential to protect SUPL INIT messages against masquerading and (in some cases) against re-play attacks.

SUPL 3.0 specifies the following protection for SUPL INIT messages:

Network-based security, in which the SLP may perform checks to ensure authentication (section 6.3.1) and replay protection (section 6.3.2) of SUPL INIT messages. This verification occurs after the SET has processed the content of the SUPL INIT message and established a secure TLS session with the SLP for the purposes of performing the SUPL session.

End-to-End security, in which: the SLP may apply a combination of encryption, integrity protection and replay protection to the SUPL INIT message; and the SET applies the corresponding combination of decryption, integrity verification and replay detection. The SET applies these security measures before processing the content of the SUPL INIT message. This security is applied only to non-emergency SUPL INIT messages.

Network-based security is mandatory, while End-to-End security is optional.

6.3.1 Network-Based Authentication of the SUPL INIT Message

The SLP always performs network verification of the integrity of the SUPL INIT message. The first message sent in response to the SUPL INIT message (that is, a SUPL POS INIT, SUPL AUTH REQ or SUPL TRIGGERED START message) MUST contain a verification field (VER). When the SLP receives the first message sent in response to the SUPL INIT message the SLP MUST check the received VER field against the corresponding value calculated over the transmitted SUPL INIT message. If this verification fails the SLP MUST terminate the session with the SUPL END message that contains status code 'authSuplinitFailure'.

The value for the verification field MUST be calculated as follows:

VER=H(SLP XOR opad, H(SLP XOR ipad, SUPL INIT)) where SLP is the FQDN of the SLP address. SHA-256 MUST be used as the hash (H) function, with opad and ipad. The output of the SHA-256 HASH function MUST be truncated to 64 bits, i.e., the function MUST be implemented as HMAC-SHA256-64. Note that the SLP address is not considered secret. The HMAC construct used here does not provide any data authentication but is only used as an alternative to a HASH function.

6.3.2 Network-Based Re-Play Protection of SUPL INIT Message

For Network Initiated cases, protection against re-play attacks MUST be provided by the SLPs. SLPs MUST ensure that no SUPL messages are accepted from an authenticated SET unless a previous, non-expired SUPL INIT message has been sent with an "SLP Session Id" that corresponds to the one received inside the SUPL message. SLPs MUST also ensure that the type of SUPL message (e.g. SUPL POS INIT, SUPL AUTH REQ, SUPL TRIGGERED START) agrees with the parameters sent in the SUPL INIT message. Implementations MUST ensure that an "SLP Session Id" is correctly associated with the SET User ID (e.g., MSISDN, WiMAX user ID or MDN) that has been authenticated.

If the SET User authentication is performed using the Alternative Client Authentication method described in this document then a mapping between the source IP address of the response from the SET (SUPL POS INIT, SUPL AUTH REQ or SUPL TRIGGERED START) and the MSISDN or MDN of the SET User is already established and this MSISDN or MDN MUST be used as the authenticated MSISDN or MDN.

Discarding of an erroneous SUPL POS INIT, SUPL AUTH REQ or SUPL TRIGGERED START MUST NOT generate a chargeable event for the SET.

For Non-Proxy Network Initiated cases, SLPs MUST only create a chargeable event after receiving the confirmation from the SPC for the successful completion of the SUPL positioning.

6.3.3 End-to-End Protection of SUPL INIT Messages

NOTE: End-to-End Protection of SUPL INIT Messages applies only to non-emergency SUPL INIT messages.

Three options of end-to-end SUPL INIT protection are provided for in this specification: Null, Mode A and Mode B—

Null SUPL INIT protection provides no end-to-end integrity protection, no end-to-end replay protection and no confidentiality protection. The procedures for Null SUPL INIT protection are described in section 6.3.4.

Mode A SUPL INIT protection provides end-to-end integrity protection and end-to-end replay protection using default algorithms. Mode A SUPL INIT protection uses a shared key sent to the SET by the SLP during a secured ULP Session. The procedures for Mode A SUPL INIT protection are described in section 6.3.5.

Mode B SUPL INIT protection provides end-to-end integrity protection and end-to-end replay protection using default algorithms. Mode B SUPL INIT protection uses a shared key derived using the appropriate PSK-based Method (GBA or SEK methods). The procedures for Mode B SUPL INIT protection are described in section 6.3.6.

The order of preference for the level of protection is as follows:

Null SUPL INIT protection has least preference.

Mode A SUPL INIT protection has higher preference than Null SUPL INIT protection.

Mode B SUPL INIT protection has higher preference than Mode A SUPL INIT protection.

In a SUPL INIT message the Protection Level parameter (in the following table) is assigned according to the current level of protection.

NOTE: this specification has been written to allow for more advanced levels of protection to be added in the future revisions. This advanced protection could allow the negotiation of other ways for securing SUPL INIT (for example, allowing encryption and allowing the negotiation of algorithms). The Protection Level parameter is included to aid the SET in determining whether it might be able to parse the SUPL INIT message or not: the Protection Level parameter may be required for extensibility.

A SUPL INIT message may have a Protector parameter present for including security parameters: the presence of a Protector parameter is specified in the following table.

| SUPL INIT Protection Level parameter values and presence of the Protector parameter in SUPL INIT. | | |
|---|---|---|
| Level of End-to-End SUPL INIT Protection | Description | Protector parameter present in SUPL INIT? |
| Null | No end-to-end protection | Optional |
| Mode A | Integrity protection and replay protection using default algorithms | Mandatory |
| Mode B | Integrity protection and replay protection using default algorithms | Mandatory |

A SET or D-SLP or H-SLP that supports the ACA-based method MUST support Null SUPL INIT protection.
All SETs must support Mode A SUPL INIT protection procedures.
A D-SLP or H-SLP MAY support Mode A SUPL INIT protection procedures.
A SET or D-SLP or H-SLP that supports the PSK-based method MUST support Mode B SUPL INIT protection procedures.
The E-SLP entity is not involved in currently defined SUPL INIT protection.

6.3.3.1 Negotiating the Level of SUPL INIT Protection

The following processes apply only to SLP that are D-SLP and H-SLP; the processes do not apply to E-SLP.

An informal description of how the SUPL INIT protection level is negotiated is as follows:

1. The SET must apply Null SUPL INIT protection when there is no valid SUPL_INIT_ROOT_KEY (e.g. at power-up or when the lifetime of the SUPL_INIT_ROOT_KEY has expired). The initial protection level is always Null SUPL INIT protection. In this state the SET handles all SUPL INIT messages, i.e. no messages are silently dropped. If a SUPL INIT message is parsed with a failure condition, the SET sends an error message to the SLP.
2. If the SET has a valid SUPL_INIT_ROOT_KEY and valid ReplayCounter already negotiated using Mode A or Mode B SUPL INIT protection for a particular SLP, then the SET processes all SUPL INIT messages from that SLP using the negotiated mode (Mode A or Mode B).
3. When the SET establishes a mutually-authenticated secure connection to the SLP,
   a. If a PSK-based method (GBA or SEK) was used for mutual authentication, then Mode B SUPL INIT protection applies and the B-TID exchanged in the PSK-TLS handshake corresponds to the Ks (that will be used as a Ks_NAF in 3GPP and 3GPP2 deployments) or SEK that can be used to derive SUPL_INIT_ROOT_KEY that will be used as a Ks_NAF in 3GPP and 3GPP2 deployments. This Ks_NAF or SEK and the associated B-TID are used in the Mode B SUPL INIT protection until either:
      i. the key expires, in which case the SET and SLP revert to Null SUPL INIT protection
      ii. the SET and SLP use the ACA-method in a non-emergency session, in which case the SET and SLP revert to either Mode A or Null SUPL INIT protection as discussed in step 3b below, or
      iii. the Set and H-SLP use GBA's or SEK's bootstrapping re-negotiation methods to establish TLS using a fresh B-TID, in which case the B-TID and corresponding Ks_NAF or SEK are now used for Mode B SUPL INIT protection.
   b. Otherwise, the SET and SLP established a secure connection using the DCert or ACA method.
      i. If the SET does not have a valid SUPL_INIT_ROOT_KEY, then the SET sends a SUPL_INIT_KeyRequest parameter to the SLP in the first ULP message.
         1. If the SLP support Mode A SUPL INIT protection, then the SLP responds by sending ModeAKeyIdentifier, TemporaryModeAKeyIdentifier, SUPL_INIT_ROOT_KEY and BasicReplayCounter parameters in the first ULP response to the SET. When the SET receives these parameters, then this indicates to the SET that Mode A SUPL INIT Protection applies.
            NOTE: The policy for updating SUPL_INIT_ROOT_KEY is a decision of the SLP Operator.
         2. If the SLP does not support Mode A SUPL INIT protection (or does not support Mode A SUPL INIT protection at this particular time), then the SLP sends an indication to the SET (in a ULP message) that Null SUPL INIT Protection applies.
      ii. If the SET has a valid SUPL_INIT_ROOT_KEY, but does not have a valid TemporaryModeAKeyIdentifier or has lost synchronization regarding replay protection, then the SET sends a SUPL_INIT_ResynchRequest parameter to the SLP in the first ULP message.
         1. If the SLP support Mode A SUPL INIT protection, then the SLP responds (in the first response to the SET) with a new TemporaryModeAKeyIdentifier using the procedure specified in section 6.3.6.1.1. When the SET receives this response, then this indicates to the SET that Mode A SUPL INIT Protection applies.
         2. If the SLP does not support Mode A SUPL INIT protection (or does not with to support Mode A SUPL INIT protection at this particular time), then the SLP sends an indication to the SET (in a ULP message) that Null SUPL INIT Protection applies.

Note that this means that the protection level is renegotiated every time the SET sets up a fresh TLS connection to the H-SLP.

6.3.3.2 Negotiation from the H-SLP Perspective

If the most recent IP session with the SET was authenticated using the GBA or SEK method, and the H-SLP has a current B-TID and the associated key for the SET, then If the B-TID is for a key obtained using GBA, then the H-SLP assigns SUPL_INIT_ROOT_KEY to be the Ks_(int/ext_)NAF corresponding to the most recent B-TID and generated as follows The FQDN MAY be the H-SLP_FQDN The GBA Ua security protocol identifier that may be used for SUPL_INIT protection is defined in OMNA Registry.

If the B-TID is for a key derived using the SEK-method, then the SUPL_INIT_ROOT_KEY is the SEK as defined in 6.1.2.1.2.

Assuming no other SUPL INIT protection has been negotiated, then the H-SLP assigns the Mode B SUPL INIT protection level for that SET.

Otherwise, if the H-SLP has a valid ModeAKeyIdentifier and associated key for the SET, then the H-SLP assigns Mode A SUPL INIT protection level for that SET.

If no other level of protection is assigned, then the H-SLP assigns Null SUPL INIT protection level for that SET.

The H-SLP applies the procedures (for processing SUPL INIT messages prior to delivery) corresponding to the currently assigned level of SUPL INIT protection. This includes assigning the appropriate value for the Protection Level parameter in SUPL INIT messages.

6.3.3.3 Negotiation from the SET Perspective

If the most recent IP session with the H-SLP was authenticated using the GBA or SEK method, and the SET has the current B-TID and associated key used for that IP session, then

- If the B-TID is for a key obtained using GBA, then the SET assigns SUPL_INIT_ROOT_KEY to be the Ks_(int/ext_)NAF corresponding to the most recent B-TID and generated as follows
   - The FQDN MAY be the H-SLP_FQDN
   - The GBA Ua security protocol identifier that may be used for SUPL_INIT protection is defined in OMNA Registry.
- If the B-TID is for a key derived using the SEK-method, then the SUPL_INIT_ROOT_KEY is the SEK as defined in 6.1.2.1.2.
- Assuming no other SUPL INIT protection has been negotiated, then the SET assigns the Mode B SUPL INIT protection level.

Otherwise, if the SET has a valid ModeAKeyIdentifier, associated key and ModeAReplayCounter for the H-SLP, then the H-SLP assigns Mode A SUPL INIT protection level for that SET.

If no other level of protection is assigned, then the SET assigns Null SUPL INIT protection level.

The SET applies the procedures (for processing received SUPL INIT messages) corresponding to the currently assigned level of SUPL INIT protection.

6.3.3.4 Exception Procedures

If the SET determines that the SET-internal SUPL INIT protection parameters have become corrupted, then the SET must establish a TLS session with the H-SLP:
- If GBA authentication is used, then the SET must initiate GBA bootstrapping to establish fresh keys;
- For SETs using the SEK method, the SET must initiate SEK bootstrapping to enable fresh keys.
- Otherwise, the SET sends a SUPL_INIT_KeyRequest in the first secured ULP message and follows the procedures in Step 3.b of section 6.3.3.1.

If the SLP loses security context (for example, massive loss of data) then the SLP will have no means of initiating positioning activities. The context would be re-established when the Ks_NAF or SEK expires, or the SET connects to the SLP. To prevent this "block out window" the SLP should ensure that all SUPL INIT security context information is stored with sufficient redundancy to recover from such a scenario.

6.3.4 Specifications when Null Level of Protection is Assigned

NOTE: There is no SUPL INIT Protector for Null SUPL INIT protection.

6.3.4.1 H-SLP Procedures

There are no security procedures for the SLP that are specific to Null SUPL INIT protection.

6.3.4.2 SET Procedures

When Null SUPL INIT protection is assigned and the SET receives a SUPL INIT message, then the SET applies the following procedure:
- If the Protection Level parameter is correct, then the SET considers the message to be authentic, and no security related processing may be required.

Suppose the SLP and SET can support a higher level of protection, but the SET has not yet been in contact with the SLP since being powered up: in this case the SET will have Null SUPL INIT protection assigned. In the period of time until the SET contacts the SLP, the SET will consider any received SUPL INIT message (with the correct Protection Level parameter) to be authentic. When the SET first contacts the SLP (which may or may not be in response to a received SUPL INIT message), the SET and SLP will transition to a higher level of protection. Once the two entities transition to the higher level of protection, the SET can detect non-authenticatic SUPL INIT messages. In between when the SET is powered up and when the SET first contacts the SLP, there is a period of time when the SET could receive an non-authentic SUPL INIT message that is processed by the SET as if the SUPL INIT message where authentic. If the SET decides to proceed with the SUPL session associated with the non-authentication SUPL INIT message, then the SET will contact the SLP and establish a secure TLS session. The SLP will not allow the SUPL session since it was established using a non-authentic SUPL INIT message. If the SET and SLP support a higher level of protection, then this will be established at the same time and the SET will be able to detect non-authentic SUPL messages after this time. This means that, if the SET and SLP can support a higher level of protection, then there is a very small window of opportunity for the attacker to get the SET to accept a non-authentic SUPL INIT message, and the SET will only attempt to proceed with a SUPL session for at most one non-authentic SUPL INIT message.

- If the Protection Level parameter is incorrect (that is, if the Protection Level parameter was anything other than Null), then the SET sends the appropriate error message to the SLP.
   - In the event that the Protection Levels at the SLP and SET lose synchronization, this procedure allows the SET and SLP to resynchronize on a common Protection Level.

6.3.5 Specifications for Mode a SUPL INIT Protection Level 6.3.5.1 Key Identifiers for Mode a SUPL INIT Protection Mode A SUPL INIT Protection uses two Key Identifiers that may be sent with SUPL INIT messages: ModeAKeyIdentifier and TemporaryModeAKeyIdentifier.

The ModeAKeyIdentifier is a globally-unique, long-term Key Identifier associated with the SUPL_INIT_ROOT_KEY. The SLP provides a new ModeAKeyIdentifer to the SET only when the SLP provisions a new value for SUPL_INIT_ROOT_KEY.

The TemporaryModeAKeyIdentifier is a short-term identity (pseudonym) associated with the ModeAKeyIdentifier. The TemporaryModeAKeyIdentifier may be globally unique in the period that the TemporaryModeAKeyIdentifier is valid. The SET and SLP synchronize the value of TemporaryModeAKeyIdentifier as described in Sections 6.3.5.3 and 6.3.5.4.

The SLP will typically use TemporaryModeAKeyIdentifier as the KeyIdentifier in the Basic SUPL INIT Protector. The SET then uses TemporaryModeAKeyIdentifier to determine which SUPL_INIT_ROOT_KEY should be used to verify the Basic SUPL INIT Protector.

The ModeAKeyIdentifier is not typically sent in a SUPL INIT message because this would allow an observer to associate multiple SUPL INIT messages are associated with a common SET User. The purpose of TemporaryModeAKeyIdentifier to prevent a Threat Agent from using the ModeAKeyIdentifier to associate multiple SUPL_INIT messages with a SET User. Only the SLP and SET should be able to associate the TemporaryModeAKeyIdentifier with the ModeAKeyIdentifier. The frequency of changing TemporaryModeAKeyIdentifier is primarily a decision of the SET User. An SLP may choose to establish a new value for TemporaryModeAKeyIdentifier based on SLP policy.

However, there are circumstances in which the SLP may wish to use the longer-term ModeAKeyIdentifier as the KeyIdentifier in the Basic SUPL INIT Protector. For example, suppose a SET has not be responding to multiple SUPL INIT messages using TemporaryModeAKeyIdentifier in the Basic SUPL INIT Protector. The SLP may be concerned that the SET has lost synchronization regarding TemporaryModeAKeyIdentifier. The SET and SLP are more likely to remain synchronized on the long-term ModeAKeyIdentifier. Hence, the SLP can send a SUPL INIT message using ModeAKeyIdentifier in the Basic SUPL INIT Protector to ensure that lack of synchronization does not prevent the SET from verifying the SUPL INIT message.

6.3.5.2 Mode a SUPL INIT Protection and the Basic SUPL INIT Protector

Mode A SUPL INIT Protection uses the Basic SUPL INIT Protector and associated procedures as defined in section 6.3.7 with the following additional clarifications:

KeyIdentifierType: indicates either ModeAKeyIdentifier or a

TemporaryModeAKeyIdentifier is used.

KeyIdentifier: corresponds to either a ModeAKeyIdentifier or a TemporaryModeAKeyIdentifier as appropriate to ModeAKeyIdentifierType.

BasicMAC is computed using SUPL_INIT_IK=HMAC-SHA256-128(SUPL_INIT_ROOT_KEY, "Mode A IK"), using SUPL_INIT_ROOT_KEY associated with the KeyIdentifier above.

6.3.5.3 H-SLP Procedures

The only Mode-A-specific H-SLP procedures relate to maintaining synchronization between the SET and SLP.

A new value for the TemporaryModeAKeyIdentifier is established by the SLP sending (in the first response message to the SET in a secured ULP session) a NewTemporaryModeAKeyIdentifier parameter followed by a new TemporaryModeAKeyIdentifier. Establishing a new TemporaryModeAKeyIdentifier results in resetting BasicLastReplayCounter to 0x0000, and the SET removes all information about "played" SUPL INIT messages.

An SLP may establish a new TemporaryModeAKeyIdentifier either in response to a SUPL_INIT_ResynchRequest or an (out of scope) internal decision of the SLP. That is, the SLP can send a TemporaryModeAKeyIdentifier even when there is no corresponding SUPL_INIT_ResynchRequest from the SET.

6.3.5.4 SET Procedures

The only Mode-A-specific SET procedures relate to maintaining synchronization between the SET and SLP.

A SET may trigger establishing a new value for TemporaryModeAKeyIdentifier by sending a SUPL_INIT_ResynchRequest in the first message of a ULP session. If Mode A SUPL INIT protection is assigned by the SET, then prior to the first time that the SET processes a SUPL INIT message with a given TemporaryModeAKeyIdentifier, the SET clears its cache of used values for BasicReplayCounter.

6.3.6 Specifications for Mode B SUPL INIT Protection Level

Mode B SUPL INIT Protection uses the Basic SUPL INIT Protector and associated procedures as defined in section 0, with the following additional clarifications:

KeyIdentifierType: Only B-TID identifiers are support for Mode B SUPL INIT Protection.

KeyIdentifier: corresponds to the current B-TID.

The BasicMAC parameter is computed using SUPL_INIT_IK=HMAC-SHA256-128(SUPL_INIT_ROOT_KEY, "Mode A IK"), where For GBA-based deployments the SUPL_INIT_ROOT_KEY is the Ks_(int/ext_)NAF corresponding to the most recent B-TID and generated using the GBA Ua security protocol identifier for SUPL INIT protection as defined in OMNA Registry.

For SEK-based deployments the SUPL_INIT_ROOT_KEY is the SEK_MAC as defined in section 6.1.2.1.2.

6.3.6.1 H-SLP Procedures

The only Mode-B-specific H-SLP procedures relate to maintaining synchronization between the SET and SLP.

For Mode B SUPL INIT protection, the BasicReplayCounter in the SLP is reset to zero the first time a key is used and the SET removes all information about "played" SUPL INIT messages.

In the unlikely event that the SLP determines that resynchronization may be required:

In the case of deployments supporting the GBA method, the SLP triggers resynchronization by invalidating the GBA B-TID. When that SET next attempts to authenticate to the SLP, then SLP will respond with TLS-PSK alert "psk_identity_unknown". This prompts establishing a new GBA key.

In the case of deployments supporting the SEK method, the SLP triggers resynchronization by invalidating the SEK B-TID. When that SET next attempts to authenticate to the SLP, then SLP will respond with TLS-PSK alert "psk_identity_unknown". This prompts establishing a new SEK as described in section 6.1.3.3

6.3.6.2 SET Procedures

The only Mode-B-specific SET procedures relate to maintaining synchronization between the SET and SLP.

If Mode B SUPL INIT protection is assigned by the SET, then

Prior to the first time that the SET processes a SUPL INIT message with a given SUPL_INIT_ROOT_KEY, the SET clears its cache of used values for BasicReplayCounter.

The SET can trigger resynchronization by establishing new GBA Ks or new SEK as appropriate. The SLP will continue to use the old GBA Ks (or SEK) until the next successful authentication between the SET and SLP, so the SET should maintain the old GBA Ks (or SEK) until that time.

6.3.7 Specifications for Using the Basic SUPL INIT Protector

A Basic SUPL INIT Protector is used for both Mode A and Mode B SUPL INIT Protection includes the following parameters:

KeyIdentifierType: length=1 octet.

KeyIdentifier: variable length. Corresponds to the key used to compute the BasicMAC.

BasicReplayCounter: length=2 octets.

BasicMAC: length=4 octets.

The BasicMAC parameter is generated as follows:

BasicMAC=HMAC-SHA256-32(SUPL_INIT_Basic_IK, SUPL_INIT'), where

SUPL_INIT_Basic_IK is derived according to sections 6.3.5 and 6.3.6 for Mode A and Mode B SUPL INIT protection respectively.

SUPL INIT' corresponding to the SUPL INIT message with all parameters except BasicMAC assigned, and with the MAC parameter set to all zeroes, and HMAC-SHA256-32 and HMAC-SHA256-128 are specified in document(s) outside the scope of this document.

6.3.7.1 H-SLP Procedures

SLP procedures for synchronization of ModeALastReplayCounter are specified for Mode A and Mode B SUPL INIT protection elsewhere.

If Mode A or Mode B SUPL INIT protection is assigned to a SET, then the H-SLP composes the SUPL INIT messages as follows:

1. Parameters outside the SUPL INIT Protector are assigned as described elsewhere.
2. KeyIdentityType is set according to the type of KeyIdentity that the SLP will use for this message.
3. KeyIdentity is set to a KeyIdentity associated with the SUPL_INIT_ROOT_KEY.
4. H-SLP increases the current value of BasicLastReplayCounterValue (associated with this SET and the negotiated SUPL INIT protection Level) by 1, and inserts the new value into the BasicReplayCounter parameter.
5. Finally, after all other parameters are assigned the BasicMAC is calculated from SUPL INIT and SUPL_INIT_ROOT_KEY as specified above.

The H-SLP may be required to store a BasicLastReplayCounterValue of length equal to the length of BasicReplayCounter parameter for each SET for which Mode A or Mode B SUPL INIT protection level is assigned.

If BasicLastReplayCounterValue in the SLP is close to $65535=2^{16}-1$ (which is highly unlikely), then the SLP must trigger resynchronization procedures (see sections 6.3.6.1 and 6.3.7.1).

6.3.7.2 SET Procedures

SET procedures for synchronization of ModeALastReplayCounter are specified for Mode A and Mode B SUPL INIT protection elsewhere.

If Mode A or Mode B SUPL INIT protection is assigned, then the SET processes a received SUPL INIT message as follows:

1. The SET discards the SUPL INIT message if the following parameters fail the appropriate verification:
   Protection Level: must be the assigned value for the negotiated SUPL INIT protection level.
   KeyIdentityType: Must be valid for the assigned SUPL INIT protection level
   Key Identity: Must correspond to the current SUPL_INIT_ROOT_KEY for the negotiated SUPL INIT protection level.
   BasicReplayCounter: the SET uses this value to detect replay of messages. The technique may be implementation specific but must be robust enough to deal with situations where SUPL INIT messages are lost or delivered out of order.
   BasicMAC: The SET computes an expected BasicMAC from SUPL INIT and SUPL_INIT_ROOT_KEY (as described above) and compares this to the received BasicMAC: the values must be equal.
2. If the SUPL INIT was not discarded in the previous step, then it is considered authentic, and the SET considers the BasicReplayCounterValue to be used. If BasicReplayCounterValue is close to $65535=2^{16}-1$ (which is highly unlikely), then the SET must establish a new SUPL_INIT_ROOT_KEY with the SLP to reset the counter.

6.4 Providing the H-SLP Address to the Set

Note: Provisioning H-SLP Address for Access-Network Independent H-SLP is FFS.

The H-SLP address is made available to the SET by the provisioning of the H-SLP address in the UICC, SET or a default H-SLP address is derived as described below. This address MUST be in the form of a FQDN and SHOULD be securely provisioned by the Home Network of the SET.

6.4.1 3GPP2 SETs

For 3GPP2 SETs the H-SLP address MUST be securely provisioned in the UIM or R-UIM.

6.4.2 3GPP SETs

A 3GPP SET MUST read the H-SLP address (in FQDN form) as a parameter "ADDR" under the "APPADDR/ADDR" characteristic as specified in WAP PROVCONT. In addition, the H-SLP address MUST be securely stored in the bootstrap file as defined in OMA Smartcard Provisioning specification on a 3GPP compliant UICC (USIM/SIM) or in an equivalently secure area of the SET. The SET MUST support OMA Smartcard Provisioning mechanisms to read the H-SLP address. The bootstrap file in the USIM/SIM application or SET that stores the H-SLP address MUST not be user changeable. If the H-SLP address is configured in the UICC (USIM/SIM), the SET MUST first read the H-SLP address provisioned in the UICC. If there is no H-SLP address provisioned in the UICC then the SET MAY read the H-SLP address from the secure area on the SET.

Provisioning of the H-SLP Address in the SET:

If the H-SLP address is to be stored in a secure location on the SET, it MUST be provisioned using OMA Device Management V1.2 or later. If the H-SLP address is provisioned using OMA DM the SET MUST authenticate the OMA DM Server based on the server side certificate presented by the DM Server during the TLS Handshake. If the SET supports storage of the H-SLP address it MUST NOT rely on the authentication scheme set forth in section 6.1.4, i.e., the Alternative Client authentication based on MSISDN/IP-Address mapping authentication. i.e. the SET MUST rely on the PSK-TLS mutual authentication method as described in section 6.1.1.

Auto Configuration of the H-SLP Address:

If the H-SLP address can not be found in the secure storage area of the UICC (USIM/SIM), or in a secure area on the SET, the SET MUST configure the default H-SLP address in the SET based on the IMSI stored in the USIM/SIM.

In the case an H-SLP address has been found in the secure storage area of the UICC (USIM/SIM), or in a secure area on the SET, but its use has resulted in an authentication failure while initiating the SUPL session, the SET MUST configure the default H-SLP address in the SET based on the IMSI stored in the USIM/SIM.

The mechanism to configure a default H-SLP address is defined below.

Please note that the following example has been taken from 3GPP GBA specifications and adopted for the SUPL use case where a H-SLP address (based on a FQDN) is configured. Implementation of this default configuration mechanism does not require the implementation of the 3GPP GBA specification. The example below is given to illustrate the methodology only, and can be implemented independent of GBA.

Configuration of H-SLP based on IMSI:

Step 1) Take the first 5 or 6 digits of the IMSI, depending on whether a 2 or 3 digit MNC is used and separate them into MCC and MNC; if the MNC is 2 digits then a zero MAY be added at the beginning;

Step 2) Use the MCC and MNC derived in step 1 to create the "mnc<MNC>.mcc<MCC>.pub.3gppnetwork.org" domain name; Add the label "h-slp." to the beginning of the domain name.

Example 1

If IMSI in use is "234150999999999", where MCC=234, MNC=15, and MSIN=0999999999, the H-SLP address would be "h-slp.mnc015.mcc234.pub.3gppnetwork.org".

If a new IMSI is detected by the SET during, or after power on, all previous H-SLP settings MUST be removed from the SET. More specifically, any H-SLP address stored in the SET MUST be removed.

In cases where the IMSI is changed the SET MUST first read the H-SLP address from the UICC (USIM/SIM). If no H-SLP address is stored on the UICC (USIM/SIM) the SET MAY check if the H-SLP address is stored in the SET. If no H-SLP address is found in the UICC or SET, then a default H-SLP address MUST be configured by the SET based on the new IMSI as described above.

Implementations MUST ensure that the address of the H-SLP cannot be changed via applications that are downloaded to the SET after the manufacturer software installation of the SET.

The following flow illustrates H-SLP address storage.
1. Start. Go to 2.
2. IMSI changed? If Yes go to 3. If No skip 3 and go directly to 4.
3. Clear H-SLP from SET. Go to 4.
4. UICC contains H-SLP Address? If No go to 5. If Yes go to 9.
5. H-SLP Address on SET supported? If No go to 7. If Yes go to 6.
6. H-SLP Address provisioned in SET? If No go to 7. If Yes go to 8.
7. Create H-SLP Address from IMSI. Go to 10.
8. Read Settings from the SET. Go to 10.
9. Read H-SLP Address from UICC. Go to 10.
10. Create TLS connection to H-SLP using H-SLP address. Go to 11.
11. Authentication Successful? If No go to 12. If Yes go to 14.
12. H-SLP Address created from IMSI? If No go to 7. If Yes go to 13.
13. Abort SUPL Session and End.
14. Run SUPL Session and End.

6.4.3 WIMAX Based Deployments

When the SET attaches to the WiMAX network it MAY receive an updated H-SLP address via OMA DM. When the H-SLP address is provisioned in a secure manner to a WiMAX terminal and it must be stored in a protected environment.

6.5 Confidentiality and Data Integrity Protocols

TLS 1.1 or PSK-TLS MAY be used to provide Confidentiality and Data Integrity between a SET and an SLP. All SUPL Messages except "SUPL INIT" MUST be delivered within a TLS or PSK-TLS session between a SET and an SLP.

Section 6.1.1.3 provides details for determining which entities in a SUPL 3.0 deployment have TLS with server-certificate authentication and/or TLS-PSK as mandatory or optional.

6.5.1 TLS with Server-Certificates

Implementations of TLS 1.1 with server-certificates may conform to and WAP Profile of TLS 1.1 with the following clarifications:
SETs MAY implement:
TLS_RSA_WITH_AES_128_CBC_SHA.

For SET implementations that prefer additional cipher suites SETs SHOULD implement:
TLS_RSA_WITH_3DES_EDE_CBC_SHA.
SLPs supporting TLS 1.1 with server-certificates may implement the following ciphersuites:
TLS_RSA_WITH_3DES_EDE_CBC_SHA.
TLS_RSA_WITH_AES_128_CBC_SHA.
For SLP implementations supporting TLS 1.1 with server-certificates that prefer to support NULL encryption SLPs MAY implement TLS_RSA_WITH_NULL_SHA. Note that the use of TLS_RSA_WITH_NULL_SHA is not recommended, as it does not provide any confidentiality protection. However, it still provides authentication and integrity protection.

The WAP Certificate profile of TLS 1.1 MAY be supported by SLPs supporting TLS 1.1 with server-certificates and SETs.

6.5.2 TLS-PSK

TLS-PSK implementations MAY conform to PSK-TLS for the TLS Handshake, with Bulk Ciphering as defined for TLS 1.1
SETs supporting TLS-PSK MAY implement:
TLS_PSK_WITH_AES_128_CBC_SHA.
For SET implementations supporting TLS-PSK that prefer additional cipher suites, the SETs SHOULD implement:
TLS_PSK_WITH_3DES_EDE_CBC_SHA.
The following cipher suites MAY be implemented by SLPs:
TLS_PSK_WITH_AES_128_CBC_SHA.
For SLP implementations supporting TLS-PSK that prefer additional cipher suites, the SLPs SHOULD implement:
TLS_PSK_WITH_3DES_EDE_CBC_SHA.
The following cipher suites MAY be implemented by SPCs that support non-proxy mode:
TLS_PSK_WITH_AES_128_CBC_SHA.
For SPC implementations that support non-proxy mode that prefer additional cipher suites, the SPCs SHOULD implement:
TLS_PSK_WITH_3DES_EDE_CBC_SHA.

6.6 DCert Method and User Binding

The DCert method authenticates the SET handset, but (unlike the GBA, SEK and ACA methods) does not perform any authentication tied to Access Network credentials. If the SLP uses the DCert method for mutual authentication, the SLP Operator needs some other mechanism to verify which SUPL User should be associated with the SET. The term "User Binding" is used to describe associating a SUPL User with a SET Identity.

If the SET ownership changes, then is the responsibility of the existing SUPL User to contact the SLP Operator to release the User Binding.

SUPL 3.0 does not specify a User Binding procedure, although one possible procedure is shown in section 6.6.1. Some SLPs may incorporate a User Binding procedure as part of other services provided by the SLP Operator. In other cases, the User Binding may be part of the distribution chain.

The SLP Operator may use any "User Binding" procedure they choose, but the following points should be kept in mind:
The SUPL User must be authenticated as part of the User Binding procedure.
Failure to authenticate the SUPL USER would allow theft of service, and allow the Threat Agent to mislead the SLP regarding the location of the identified SUPL User.
We recommend that the SLP Operator apply their existing mechanisms and policies for User Authentication.

The SET must be authenticated as part of the User Binding procedure.

The reasons for this are subtle. Suppose that a Threat Agent wishes to follow the movements of Alice and Alice owns a SET with SET Identity "SET_ID_A". The Threat Agent registers as a legitimate SUPL User and, after authenticating herself, claims to own the SET with SET Identity "SET_ID_A". If the SLP Operator associates this SET with the Threat Agent's account, then the Threat Agent can authorize themselves to obtain periodic location updates from the SLP (via Network Initiated sessions). However, since Alice is using the SET, the Threat Agent is actually getting updates of Alice's location. Since the SLP Operator is expected to keep Alice's location confidential, it is in the SLP Operator's interest to prevent such an attack.

6.6.1 an Example User Binding Procedure

The DCert method is designed primarily for SETs that have web-browsing capabilities: examples include smart-phones, tablets or touch-screen multi-media players.

Such SETs can use the following mechanism:
1. SLP Operator prompts the SUPL User to connect to the URL of an SLP-owned Web Server while using the SET.
2. Subscriber connects to website (possibly WAP) while using the SET.
3. Web Server and SET perform TLS
   a. The Web Server provides a server certificate and requests a client certificate. The Web Server's certificate may be distinct from the certificate for the SLP server certificate used for SUPL service.
   b. The SET authenticates the Web Server
   c. The SET authenticates to the Web Server using the SET's Device Certificate.
   d. The Web-Server has now authenticated that the secure channel is associated with the SET Identity (e.g. IMEI, MEID or serial number) in the Device Certificate.
4. The SUPL User performs some (out of scope) authentication with the website. For example, the Web Server could request an SLP-specific username/password, or federated username/password or other subscriber details such as address, date of birth, etc.
5. The SLP operator has now securely associated the subscriber with the device identity and should store this association in the SLP.

Additional Embodiment 8

SUPL 3.0 has defined Mode A and Mode B SUPL INIT protection. Mode A protection requires that the SLP has the ability to send a shared key to the SET during a secured ULP session. This embodiment describes the shared key parameter and indicates which ULP message(s) are to be used to request and send the shared key. Thus, this embodiment may be incorporated into SUPL 3.0, and section numbers may refer to SUPL 3.0 sections.

6.3.3 End-to-End Protection of SUPL INIT/REINIT Messages

NOTE: End-to-End Protection of SUPL INIT Messages applies only to non-emergency SUPL INIT/REINIT messages.

The processes in Section 6.3.3 apply only to SLP that are D-SLP and H-SLP; the processes do not apply to E-SLP.

The procedures for End-to-End protection of SUPL INIT and SUPL REINIT messages make no distinction between SUPL INIT and SUPL REINIT messages—both SUPL INIT and SUPL REINIT messages are processed as though they were the same type of message. For simplicity, we refer to the procedures as SUPL INIT protection procedures—both SUPL INIT and SUPL REINIT messages are processed using the as SUPL INIT protection procedures.

Three options of end-to-end SUPL INIT protection are provided for in this specification: Null, Mode A and Mode B—

Null SUPL INIT protection provides no end-to-end integrity protection, no end-to-end replay protection and no confidentiality protection. The procedures for Null SUPL INIT protection are described in section 6.3.4.

Mode A SUPL INIT protection provides end-to-end integrity protection and end-to-end replay protection using default algorithms. Mode A SUPL INIT protection uses a shared key sent to the SET by the SLP during a secured ULP Session. The procedures for Mode A SUPL INIT protection are described in section 6.3.5.

Mode B SUPL INIT protection provides end-to-end integrity protection and end-to-end replay protection using default algorithms. Mode B SUPL INIT protection uses a shared key derived using the appropriate PSK-based Method (GBA or SEK methods). The procedures for Mode B SUPL INIT protection are described in section 6.3.6.

The order of preference for the level of protection is as follows:

Null SUPL INIT protection has least preference.

Mode A SUPL INIT protection has higher preference than Null SUPL INIT protection.

Mode B SUPL INIT protection has higher preference than Mode A SUPL INIT protection.

In a SUPL INIT message the Protection Level parameter (in the following table) is assigned according to the current level of protection.

NOTE: this specification has been written to allow for more advanced levels of protection to be added in the future revisions. This advanced protection could allow the negotiation of other ways for securing SUPL INIT/REINIT (for example, allowing encryption and allowing the negotiation of algorithms). The Protection Level parameter is included to aid the SET in determining whether it might be able to parse the SUPL INIT/REINIT message or not: the Protection Level parameter is required for extensibility.

A SUPL INIT/REINIT message may have a Protector parameter present for including security parameters: the presence of a Protector parameter is specified in the following table.

SUPL INIT Protection Level parameter values and presence of the Protector parameter in SUPL INIT and SUPL REINIT messages.

| Level of End-to-End SUPL INIT Protection | Description | Protector parameter present in SUPL INIT/REINIT? |
|---|---|---|
| Null | No end-to-end protection | Optional |
| Mode A | Integrity protection and replay protection using default algorithms | Mandatory |
| Mode B | Integrity protection and replay protection using default algorithms | Mandatory |

A SET or D-SLP or H-SLP that supports the ACA-based method MUST support Null SUPL INIT protection.
All SETs SHOULD support Mode A SUPL INIT protection procedures.
A D-SLP or H-SLP MAY support Mode A SUPL INIT protection procedures.
A SET or D-SLP or H-SLP that supports the PSK-based method MUST support Mode B SUPL INIT protection procedures.
The E-SLP entity is not involved in currently defined SUPL INIT protection.

6.3.3.1 Negotiating the Level of SUPL INIT Protection

The following processes apply only to SLP that are D-SLP and H-SLP; the processes do not apply to E-SLP.

An informal description of how the SUPL INIT protection level is negotiated is as follows:

4. The SET must apply Null SUPL INIT protection when there is no valid SUPL_INIT_ROOT_KEY (e.g. at power-up or when the lifetime of the SUPL_INIT_ROOT_KEY has expired). The initial protection level is always Null SUPL INIT protection. In this state the SET handles all SUPL INIT/REINIT messages, i.e. no messages are silently dropped. If a SUPL INIT/REINIT message is parsed with a failure condition, the SET sends an error message to the SLP.
5. If the SET has a valid SUPL_INIT_ROOT_KEY and valid ReplayCounter already negotiated using Mode A or Mode B SUPL INIT protection for a particular SLP, then the SET processes all SUPL INIT/REINIT messages from that SLP using the negotiated mode (Mode A or Mode B).
6. When the SET establishes a mutually-authenticated secure connection to the SLP,
   a. If a PSK-based method (GBA or SEK) was used for mutual authentication, then Mode B SUPL INIT protection applies and the B-TID exchanged in the PSK-TLS handshake corresponds to the Ks (that will be used as a Ks_NAF in 3GPP and 3GPP2 deployments) or SEK that can be used to derive SUPL_INIT_ROOT_KEY that will be used as a Ks_NAF in 3GPP and 3GPP2 deployments. This Ks_NAF or SEK and the associated B-TID are used in the Mode B SUPL INIT protection until either:
      i. the key expires, in which case the SET and SLP revert to Null SUPL INIT protection
      ii. the SET and SLP use the ACA-method in a non-emergency session, in which case the SET and SLP revert to either Mode A or Null SUPL INIT protection as discussed in step 3b below, or
      iii. the SET and H-SLP use GBA's or SEK's bootstrapping re-negotiation methods to establish TLS using a fresh B-TID, in which case the B-TID and corresponding Ks_NAF or SEK are now used for Mode B SUPL INIT protection.
   b. Otherwise, the SET and SLP established a secure connection using the DCert or ACA method.
      i. If the SET does not have a valid SUPL_INIT_ROOT_KEY, it indicates this to the SLP in its SET Capabilities (sUPLINITRootKeyStatus="invalidSUPLINITRootKey") in the next ULP message carrying the SET Capabilities parameter following the secure session establishment.
         1. s Mode A SUPL INIT protection, then the SLP performs the Mode A SUPL_INIT_ROOT_KEY Establishment procedure (Section 6.3.5.2) in the next SUPL END message. A successful Mode A SUPL_INIT_ROOT_KEY Establishment procedure indicates to the SET that Mode A SUPL INIT Protection applies. Until a successful Mode A SUPL_INIT_ROOT_KEY Establishment procedure occurs, the SET SHALL use Null SUPL INIT Protection.
         NOTE: The policy for updating SUPL_INIT_ROOT_KEY is a decision of the SLP Operator.
         2. If the SLP does not support Mode A SUPL INIT protection (or does not support Mode A SUPL INIT protection at this particular time), then the SLP does not send ModeAKeyIdentifier, TemporaryModeAKeyIdentifier, SUPL_INIT_ROOT_KEY and ModeAKeyLifetime parameters which indicates that the SET SHALL use Null SUPL_INIT Protection.
      ii. If the SET has a valid SUPL_INIT_ROOT_KEY, but does not have a valid TemporaryModeAKeyIdentifier or has lost synchronization regarding replay protection, it indicates this to the SLP in its SET Capabilities (sUPLINITRootKeyStatus="outofsyncSUPLINITRootKey") in the next ULP message carrying the SET Capabilities parameter following the secure session establishment.
         1. performs the Mode A Resynchronization procedure (Section 6.3.5.3) in the next SUPL END message. A successful Mode A Resynchronization procedure indicates to the SET that Mode A SUPL INIT Protection applies. Until a successful Mode A Resynchronization procedure occurs, the SET SHALL use Null SUPL INIT Protection.
         2. If the SLP does not support Mode A SUPL INIT protection (or does not wish to support Mode A SUPL INIT protection at this particular time), then the SLP does not perform Mode A Resynchronization (Section 6.3.5.3) which indicates that the SET SHALL use Null SUPL INIT Protection.

Note that this means that the protection level is renegotiated every time the SET sets up a fresh TLS connection to the SLP.

6.3.3.2 Negotiation from the SLP Perspective

If the most recent IP session with the SET was authenticated using the GBA or SEK method, and the SLP has a current B-TID and the associated key for the SET, then If the B-TID is for a key obtained using GBA, then the SLP assigns SUPL_INIT_ROOT_KEY to be the Ks_(int/ext_)NAF corresponding to the most recent B-TID and generated as follows
   The FQDN SHALL be the SLP_FQDN
   The GBA Ua security protocol identifier that shall be used for SUPL_INIT protection is defined in OMNA Registry [OMNA].

If the B-TID is for a key derived using the SEK-method, then the SUPL_INIT_ROOT_KEY is the SEK as defined in 6.1.2.1.2.

Assuming no other SUPL INIT protection has been negotiated, then the SLP assigns the Mode B SUPL INIT protection level for that SET.

Otherwise, if the SLP has a valid ModeAKeyIdentifier and associated key for the SET, then the SLP assigns Mode A SUPL INIT protection level for that SET.

If no other level of protection is assigned, then the SLP assigns Null SUPL INIT protection level for that SET.

The SLP applies the procedures (for processing SUPL INIT/REINIT messages prior to delivery) corresponding to the currently assigned level of SUPL INIT/REINIT protection. This includes assigning the appropriate value for the Protection Level parameter in SUPL INIT messages.

6.3.3.3 Negotiation from the SET Perspective

If the most recent IP session with the SLP was authenticated using the GBA or SEK method, and the SET has the current B-TID and associated key used for that IP session, then If the B-TID is for a key obtained using GBA, then the SET assigns SUPL_INIT_ROOT_KEY to be the Ks_(int/ext_)NAF corresponding to the most recent B-TID and generated as follows The FQDN SHALL be the SLP_FQDN The GBA Ua security protocol identifier [3GPP 24.109] that shall be used for SUPL_INIT protection is defined in OMNA Registry [OMNA].

If the B-TID is for a key derived using the SEK-method, then the SUPL_INIT_ROOT_KEY is the SEK as defined in 6.1.2.1.2.

Assuming no other SUPL INIT protection has been negotiated, then the SET assigns the Mode B SUPL INIT protection level.

Otherwise, if the SET has a valid ModeAKeyIdentifier, TemporaryModeAKeyIdentifier and associated SUPL_INIT_ROOT_KEY for the SLP, then the SET assigns Mode A SUPL INIT protection level for that SLP.

If no other level of protection is assigned, then the SET assigns Null SUPL INIT protection level.

The SET applies the procedures (for processing received SUPL INIT/REINIT messages) corresponding to the currently assigned level of SUPL INIT protection.

6.3.3.4 Exception Procedures

If the SET determines that the SET-internal SUPL INIT protection parameters have become corrupted, then the SET must establish a TLS session with the SLP:

If GBA authentication is used, then the SET must initiate GBA bootstrapping to establish fresh keys;

For SETs using the SEK method, the SET must initiate SEK bootstrapping to enable fresh keys, as defined in 6.1.2.1.2.

Otherwise, the SET follows the procedures in Step 3.b of section 6.3.3.1.

If the SLP loses security context (for example, massive loss of data) then the SLP will have no means of initiating positioning activities. The context would be re-established when the Ks_NAF or SEK expires, or the SET connects to the SLP. To prevent this "block out window" the SLP should ensure that all SUPL INIT protection security context information is stored with sufficient redundancy to recover from such a scenario.

6.3.3.5 General Procedure for Processing a SUPL INIT Message at SET

The following procedure is applied by the SET to determine how to process a received SUPL INIT message.

1. The SET identifies the Sending SLP (the SLP that sent the SUPL INIT message).
   a. If a D-SLP FQDN parameter is present in the SUPL INIT message, then the SET SHALL identify the Sending SLP using this parameter.
      i. If the SET has no existing relationship with identified D-SLP, then the SET silently SHALL discard the SUPL INIT message and exits the current procedure.
      ii. Otherwise, the SET proceeds to step 2.
   b. If no D-SLP FQDN parameter is present in the SUPL INIT message, then the SET identifies the Sending SLP to be the SET's H-SLP.
2. The SET performs initial filtering based on the SUPL INIT Protection level assigned for the Sending SLP:
   a. If Null SUPL INIT Protection is assigned for the Sending SLP, then the SET performs the Null SUPL INIT Protection procedures, and exits the current procedure.
   b. If Mode A or Mode B SUPL INIT Protection is assigned for the Sending SLP, then
      i. If the SUPL INIT message contains no Protector Parameter, then the SET silently discards the SUPL INIT message and exits the current procedure.
      ii. If the SUPL INIT message contains a Protector Parameter, the SET performs the appropriate Mode A or Mode B SUPL INIT Protection procedures in Section 6.3.5 or Section 6.3.6 respectively. The SET uses the KeyIdentifier parameter in the Protector Parameter to identify which of the SUPL INIT ROOT Keys associated with the Sending SLP is to be used for processing the SUPL INIT message.

6.3.5 Specifications for Mode a SUPL INIT Protection Level 6.3.5.1 Key Identifiers for Mode a SUPL INIT Protection Mode A SUPL INIT Protection uses two Key Identifiers that may be sent with SUPL INIT/REINIT messages: ModeAKeyIdentifier and TemporaryModeAKeyIdentifier.

The ModeAKeyIdentifier is a globally-unique, long-term Key Identifier associated with the SUPL_INIT_ROOT_KEY. The SLP provides a new ModeAKeyIdentifer to the SET only when the SLP provisions a new value for SUPL_INIT_ROOT_KEY.

The TemporaryModeAKeyIdentifier is a short-term identity (pseudonym) associated with the ModeAKeyIdentifier. The TemporaryModeAKeyIdentifier shall be globally unique in the period that the TemporaryModeAKeyIdentifier is valid. The SET and SLP synchronize the value of TemporaryModeAKeyIdentifier as described in Sections 6.3.5.5 and 6.3.5.6.

The SLP will typically use TemporaryModeAKeyIdentifier as the KeyIdentifier in the Basic SUPL INIT Protector. The SET then uses TemporaryModeAKeyIdentifier to determine which SUPL_INIT_ROOT_KEY should be used to verify the Basic SUPL INIT Protector.

The ModeAKeyIdentifier is not typically sent in a SUPL INIT/REINIT message because this would allow an observer to associate multiple SUPL INIT/REINIT messages are associated with a common SET User. The purpose of TemporaryModeAKeyIdentifier to prevent a Threat Agent from using the ModeAKeyIdentifier to associate multiple SUPL INIT/REINIT messages with a SET User. Only the SLP and SET should be able to associate the TemporaryModeAKeyIdentifier with the ModeAKeyIdentifier. The frequency of changing TemporaryModeAKeyIdentifier is primarily a decision of the SET User. An SLP may choose to establish a new value for TemporaryModeAKeyIdentifier based on SLP policy.

However, there are circumstances in which the SLP may wish to use the longer-term ModeAKeyIdentifier as the KeyIdentifier in the Basic SUPL INIT Protector. For example, suppose a SET has not been responding to multiple SUPL INIT/REINIT messages using TemporaryModeAKeyIdentifier in the Basic SUPL INIT Protector. The SLP may be concerned that the SET has lost synchronization regarding TemporaryModeAKeyIdentifier. The SET and SLP are more likely to remain synchronized on the long-term ModeAKeyIdentifier. Hence, the SLP can send a SUPL INIT/REINIT message using ModeAKeyIdentifier in the Basic SUPL INIT Protector to ensure that lack of synchronization does not prevent the SET from verifying the SUPL INIT/REINIT message.

6.3.5.2 Mode a SUPL_INIT_ROOT_KEY Establishment Procedure

A value for the SUPL_INIT_ROOT_KEY is established by the SLP sending (in a SUPL END message to the SET in a secure SUPL session) a new ModeAKeyIdentifier, TemporaryModeAKeyIdentifier, SUPL_NIT_ROOT_KEY and ModeAKeyLifetime parameters. If delivery is successful, then the SLP and SET considers this Mode A SUPL_INIT_ROOT_KEY Establishment Procedure to be a success.

The ModeAKeyLifetime parameter contains the UTC time when the key ceases being valid.

6.3.5.3 Mode A Resynchronization Procedure

A SLP establishes a new value for the TemporaryModeAKeyIdentifier with the SET using the following steps:
1. The SLP sends to the SET (in a SUPL END message to the SET in a secure SUPL session) the current ModeAKeyIdentifier and a new TemporaryModeAKeyIdentifier parameter. If delivery is successful, then the SLP considers this Mode A Resynchronization Procedure to be a success.
2. The SET compares the received ModeAKeyIdentifier against the ModeAKeyIdentifiers of the valid SUPL_INIT_ROOT_KEY values that the SET currently has assigned for that SLP.
   a. If the ModeAkeyIdentifier values differ, then this indicates corruption of the value of ModeAKeyIdentifier assigned on the SET, and the following steps are performed:
      i. The SET discards the TemporaryModeAKeyIdentifier and considers this Mode A Resynchronization to be a failure.
      ii. The SET initiates the Exception Procedures in Section 6.3.3.4.
   b. If the received ModeAkeyIdentifier is equal to a valid ModeAKeyIdentifier, then:
      i. The SET associates the new TemporaryModeAKeyIdentifier with the corresponding ModeAKeyIdentifier,
      ii. The SET considers this Mode A Resynchronization Procedure to be a success.

6.3.5.4 Mode A SUPL INIT Protection and the Basic SUPL INIT Protector

Mode A SUPL INIT Protection uses the Basic SUPL INIT Protector and associated procedures as defined in section 0 with the following additional clarifications:

KeyIdentifierType: indicates either ModeAKeyIdentifier or a TemporaryModeAKeyIdentifier is used.

KeyIdentifier: corresponds to either a ModeAKeyIdentifier or a TemporaryModeAKeyIdentifier as appropriate to the ModeAKeyIdentifierType.

BasicMAC is computed using SUPL_INIT_Basic_IK=HMAC-SHA256-128(SUPL_NIT_ROOT_KEY, "Mode A IK"), using SUPL_INIT_ROOT_KEY associated with the KeyIdentifier above.

6.3.5.5 SLP Procedures

The only Mode-A-specific SLP procedures relate to SUPL INIT ROOT KEY Establishment, expiry of a SUPL_INIT_ROOT_KEY, and maintaining synchronization between the SET and SLP.

The Mode A SUPL_INIT_ROOT_KEY Establishment Procedure is specified in Section 6.3.5.2. An SLP may perform the Mode A SUPL_INIT_ROOT_KEY Establishment Procedure in response to an out of sync indication by the SET (in SET Capabilities (sUPLINITRootKeyStatus="invalidSUPLINITRootKey")) or an (out of scope) internal decision of the SLP. That is, the SLP can send a SUPL_NIT_ROOT_KEY (with associated parameters) even when there is no corresponding indication by the SET.

A SUPL_INIT_ROOT_KEY and associated parameters SHALL cease being valid in the SLP after the earlier of
  The lifetime of the associated ModeAKeyIdentifier, and
  The time of a later successful Mode A SUPL_INIT_ROOT_KEY Establishment (Section 6.3.5.2).

The Mode A Resynchronization Procedure is specified in Section 6.3.5.3. An SLP may perform the Mode A Resynchronization Procedure in in response to an out of sync indication by the SET (in SET Capabilities (sUPLINITRootKeyStatus="outofsyncSUPLINITRootKey")) or an (out of scope) internal decision of the SLP. That is, the SLP can send a TemporaryModeAKeyIdentifier even when there is no corresponding indication by the SET.

Following a successful Mode A SUPL_INIT_ROOT_KEY Establishment Procedure or successful Mode A Resynchronization Procedure, the SLP resets BasicLastReplayCounter to 0x0000.

6.3.5.6 SET Procedures

The only Mode-A-specific SET procedures relate to SUPL INIT ROOT_KEY Establishment, expiry of a SUPL_INIT_ROOT_KEY, and maintaining synchronization between the SET and SLP.

The Mode A SUPL_INIT_ROOT_KEY Establishment Procedure is specified in Section 6.3.5.2. A SET may attempt to trigger a Mode A SUPL_INIT_ROOT_KEY Establishment Procedure by indicating that it does not have a valid SUPL_INIT_ROOT_KEY in the SET (in SET Capabilities (sUPLINITRootKeyStatus="invalidSUPLINITRootKey")) in a ULP message carrying the SET Capabilities parameter following a secure session establishment.

An established SUPL_INIT_ROOT_KEY and associated parameters SHALL be considered invalid in the SET after the earlier of the following times.

The lifetime of the associated ModeAKeyIdentifier.
  Five minutes after the time of a later successful Mode A SUPL_INIT_ROOT_KEY Establishment (Section 6.3.5.2). This time delay allows for delivery of any SUPL INIT messages sent prior to the latest Mode A SUPL_INIT_ROOT_KEY Establishment procedure as such SUPL INIT message would have be protected using the former SUPL_INIT_ROOT_KEY.
  Any time that the SET detects corruption of the values of SUPL_INIT_ROOT_KEY, ModeAKeyIdentifier and ModeAKeyLifetime. If corruption occurs, then the SET shall initiate Exception procedures in Section 6.3.3.4.

Mode A Resynchronization Procedure is specified in Section 6.3.5.3. A SET may attempt to trigger a Mode A Resynchronization Procedure by indicating loss of synchronization in the SET (in SET Capabilities (sUPLINITRootKeyStatus="outofsyncSUPLINITRootKey")) in a ULP message carrying the SET Capabilities parameter following a secure session establishment.

successful Mode A SUPL_INIT_ROOT_KEY Establishment Procedure or successful Mode A Resynchronization Procedure, the SET clears its cache of used values for BasicReplayCounter (since the SLP will have also reset BasicLastReplayCounter to 0x0000).

6.3.7 Specifications for Using the Basic SUPL INIT Protector

A Basic SUPL INIT Protector is used for both Mode A and Mode B SUPL INIT

Protection includes the following parameters:
KeyIdentifierType
KeyIdentifier: length=8 octets.
BasicReplayCounter: length=2 octets.
BasicMAC: length=4 octets.
The BasicMAC parameter is generated as follows:
BasicMAC=HMAC-SHA256-32(SUPL_INIT_Basic_IK, SUPL_INIT/REINIT'), where
SUPL_INIT_Basic_IK is derived according to sections 6.3.5 and 6.3.6 for Mode A and Mode B SUPL INIT protection respectively.

SUPL_INIT/REINIT' corresponding to the SUPL INIT/REINIT message with all parameters except BasicMAC assigned, and with the MAC parameter set to all zeroes, and HMAC-SHA256-32 and HMAC-SHA256-128 are specified in [HMAC].

6.1.1.2 Overview of Supported Authentication Methods (Informative)

(1) Generic Bootstrapping Architecture (GBA)-Based.

TLS-PSK with Generic Bootstrapping Architecture (GBA) [3GPP 33.220], [3GPP 33.222], [3GPP2 S.S0114], [3GPP 24.109]. GBA provides mutual authentication capability based on shared secret that is derived using existing 3GPP/3GPP2 authentication mechanisms.

SET and SLP are mutually authenticated using TLS-PSK with Generic Bootstrapping Architecture (GBA).

(2) SEK Based (Only Applicable to WIMAX SLP).

SET and SLP are mutually authenticated using TLS-PSK with SEK. The details of SEK method can be found in section 6.1.2.1.2.

(3) Device Certificate (DCert)-Based.

This AN-Independent method uses TLS with
RSA server certificate to authenticate the SLP to the SET,
RSA client certificate to authenticate the SET to the SLP.

(4) Alternative Client Authentication (ACA)-Based. This uses TLS with
RSA certificate to authenticate the SLP to the SET,
Alternative Client authentication of the SET to the SLP (see section 6.1.4). In this case, the SLP authenticates the SET by getting the bearer network to confirm the IP address associated with the SET Identifier (MSISDN etc.).

(5) SLP-Only.

This is used in scenarios where it is not possible for the SLP to authenticate the SET. This method SHALL NOT be used for non-emergency cases. The SET cannot distinguish between this method and ACA-based. This uses TLS with
An RSA certificate to authenticate the SLP to the SET,
The SET is not authenticated.

6.1.2.1.1 Deployments Supporting the GBA Method

In the case of deployments supporting (GBA [3GPP 33.220], [3GPP 24.109], [3GPP2 S.S0109]), the shared keys are established as follows:

When the SLP requests key material from the BSF (for securing IP communication and for protecting SUPL INIT and/or SUPL REINIT), the SLP MUST also request the USS (User security settings). The USS MUST include a permanent user identity (e.g. IMPI, IMSI or MSISDN).

For securing IP communication between the SET and SLP, the SET and the SLP MUST derive a shared secret key and operate according to TLS-PSK using GBA ([3GPP 33.220], [3GPP 24.109], [3GPP 33.222], [3GPP2 S.S0109]). The SLP MUST have well defined domain name SLP_Address_FQDN designating the SLP, e.g., slp.operator.com. The GBA Ua security protocol identifier that shall be used for TLS-PSK is defined in OMNA Registry [OMNA]. The SLP MUST confirm that the permanent user identity provided by the BSF corresponds to the SET identity in SUPL messages received by the SLP over the corresponding secured connection.

For MAC protection of SUPL INIT and/or SUPL REINIT, keys are derived according to GBA ([3GPP 33.220], [3GPP2 S.S0109]). The GBA Ua security protocol identifier that shall be used for SUPL INIT protection is defined in OMNA Registry [OMNA]. The keyIdentifier of the basicMAC included in the SUPL INIT message (or SUPL REINIT message) MUST be the B-TID of the Ks from which the Ks_NAF is generated. NOTE: The D/H-SLP request for SUPL INIT protection keys from the BSF would typically occur simultaneously with the D/H-SLP request for the keys securing IP communication.

The SET MUST ensure that it is always provisioned with a valid Ks. If no valid Ks is present then the SET MUST initiate the GBA Bootstrapping procedure to provision Ks. A new Ks MUST be established each time a new UICC (USIM/SIM/R-UIM) is detected by the SET. Additionally, the SET MUST establish new shared keys when the Ks_NAFs lifetime (set by the Home Network operator) expires.

10.8 SET Capabilities

| SET capabilities Parameter | | |
| --- | --- | --- |
| Parameter | Presence | Value/Description |
| SET capabilities | — | SET capabilities (not mutually exclusive) in terms of supported positioning technologies and positioning protocols. During a particular SUPL session, a SET may send its capabilities more than once - specifically, in SET initiated cases, the SET capabilities are sent in SUPL START, SUPL TRIGGERED START and in SUPL POS INIT. For immediate requests, the SET capabilities MUST NOT change during this particular session. For triggered requests, the SET capabilities MAY change during a session. The SET Capabilities parameter MAY also be used by the SET to inform the H-SLP or D-SLP about its service capabilities. |
| >Pos Technology | M | This parameter does not apply to SUPL 3.0 |
| >>GANSS Position Methods | O | This parameter is not applicable in SUPL 3.0 and SHALL not be used. |
| >Pref Method | M | This parameter is not applicable in SUPL 3.0 |
| >Pos Protocol | M | Zero or more of the following positioning protocols (bitmap): Appendix A. TIA-801 Appendix B. LPP Appendix C. LPPe Flags for legacy positioning protocols (RRLP and RRC) SHALL be set to FALSE. |
| >>Pos Protocol Version TIA-801 | CV | Describes the protocol version of 3GPP2 C.S0022 (TIA-801) Positioning Protocol. It is required if TIA-801 is identified in the Pos Protocol parameter. |
| >>>Supported Pos Protocol Version TIA-801 | M | Specifies a list of up to 8 different supported 3GPP2 C.S0022 versions. This parameter is required (with at least one entry in the list) if TIA-801 is identified in the Pos Protocol parameter. |

-continued

| SET capabilities Parameter | | |
|---|---|---|
| Parameter | Presence | Value/Description |
| >>>>Revision Number | M | Revision part of document number for the specifications of C.S0022 Positioning Protocol. Value: [0, A-Z] |
| >>>>Point Release Number | M | Point Release number for C.S0022, range: (0 . . . 255) |
| >>>Internal Edit Level | M | Internal Edit Level for C.S0022, range: (0 . . . 255) |
| >>Pos Protocol Version LPP | CV | Describes the protocol version of LPP Positioning Protocol. It is required if LPP is identified in the Pos Protocol parameter. |
| >>>Major Version Field | M | First (most significant) element of the version number for LPP Positioning Protocol, range: (0 . . . 255) |
| >>>Technical Version Field | M | Second element of the version number for LPP Positioning Protocol, range: (0 . . . 255) |
| >>>Editorial Version Field | M | Third (least significant) element of the version number for LPP Positioning Protocol, range: (0 . . . 255) |
| >>Pos Protocol Version LPPe | CV | Describes the protocol version of LPPe Positioning Protocol. It is required if LPPe is identified in the Pos Protocol parameter. |
| >>>Major Version Field | M | First (most significant) element of the version number for LPPe Positioning Protocol, range: (0 . . . 255) |
| >>>Minor Version Field | M | Second element of the version number for LPPe Positioning Protocol, range: (0 . . . 255) |
| >Service Capabilities | O | The service capabilities of the SET are described in this parameter. The SET MAY send this parameter in SUPL START, SUPL POS INIT, SUPL TRIGGERED START and SUPL END. The purpose of this parameter is to inform the H-SLP or D-SLP about the service capabilities of the SET |
| >>services supported | M | Defines the supported services by the SET. Only Network Initiated services are relevant in this context. Zero or more of the following services are supported: Periodic Trigger Area Event Trigger Velocity Event Trigger |
| >>reporting capabilities | CV | Defines the reporting capabilities of the SET. This parameter is only required if periodic triggers are supported by the SET in which case the parameter is mandatory. |
| >>>minimum interval between fixes | M | Defines the minimum interval between fixes allowed by the SET. This parameter is used by the H-SLP or D-SLP to avoid conflict between the desired interval between fixes and the SET's capabilities. Range: 1 to 3600, Units in seconds. |
| >>>maximum interval between fixes | O | Defines the maximum interval between fixes allowed by the SET. This parameter is used by the H-SLP or D-SLP to avoid conflict between the desired interval between fixes and the SET's capabilities. This parameter is optional. If not present, no maximum interval between fixes is specified. Range: 1 to 1440, Units in minutes. |
| >>>rep mode | M | Supported reporting mode(s): Real time Quasi real time Batch reporting (At least one of the three reporting modes must be supported) |
| >>>batch rep cap | CV | Defines the type of batch reporting capabilities supported by the SET (only applicable to quasi real time and batch reporting): Report position (true if reporting of position is allowed, false otherwise) Report measurements (true if reporting of measurements is supported, false otherwise) Maximum number of positions (range: 1 to 1024) Maximum number of measurements (range: 1 to 1024) |
| >>event trigger capabilities | CV | Defines the event trigger capabilities of the SET. This parameter is only required if area event triggers are supported by the SET in which case the parameter is mandatory. |
| >>> geo area shapes supported | M | This parameter defines the geographic target area shapes supported by the SET in addition to mandatory circular area: Elliptical Polygon |
| >>> max number of geographical target areas supported | O | This parameter defines the maximum number of geographic target areas the SET supports. (range: 1 to 32) This parameter is optional. If not present, the SET does not support geographical target areas. |
| >>> max number of Area Id Lists supported | O | This parameter defines the maximum number of Area Id Lists the SET supports. (range: 1 to 32) This parameter is optional. If not present, the SET does not support Area Ids. |

| SET capabilities Parameter | | |
|---|---|---|
| Parameter | Presence | Value/Description |
| >>> max number of Area Ids supported per Area Id List | CV | This parameter defines the maximum number of Area Ids per Area Id List the SET supports. (range: 1 to 256) This parameter is conditional: if max number of Area Id Lists is present, then this parameter MUST be present. Otherwise this parameter MUST NOT be present. |
| >>session capabilities | M | Defines the session capabilities of the SET: Total number of simultaneous sessions (range: 1 to 128). Maximum number of simultaneous periodic triggered sessions (only used for periodic triggers) (range: 1 to 32). Maximum number of simultaneous area event triggered sessions (only used for area event triggers) (range: 1 to 32). Maximum number of simultaneous velocity event triggered sessions (only used for velocity event triggers) (range: 1 to 32). |
| > supported bearers | O | This parameter is not applicable in SUPL 3.0. This parameter SHALL NOT be used. |
| >QoPCapabilities | O | This parameter defines the ability of the SET for reporting and/or receiving high accuracy position and/or velocity results. |
| >Civic Position Capabilities | O | This parameter defines the ability of the SET to support absolute civic positioning. |
| >Relative Position Capabilities | O | This parameter defines the ability of the SET to support relative positioning. |
| > D-SLP Provision from H-SLP | O | This field indicates whether the SET supports provision of authorized D-SLP addresses from the H-SLP. |
| > E-SLP Provision-from-H-SLP | O | This field indicates whether the SET supports provision of authorized E-SLP addresses from the H-SLP. |
| > D-SLP Provision from Proxy D-SLP | O | This field indicates whether the SET supports provision of authorized D-SLP addresses from a Proxy D-SLP. |
| > E-SLP Provision from-Proxy-E-SLP | O | This field indicates whether the SET supports provision of authorized E-SLP addresses from a Proxy E-SLP. |
| > D-SLP Notification to H-SLP | O | This field indicates whether the SET is able to notify the H-SLP when the SET changes access to a D-SLP. |
| > Sensor Support | CV | Defines whether the SET is able to use sensors to calculate location estimates and/or velocity estimates. If the SET supports positioning/velocity sensors, this parameter MUST be included. |
| SUPL INIT Root Key Status | CV | This parameter is conditional and MAY only be used if Mode A SUPL INIT protection is used. For NULL SUPL INIT Protection and Mode B SUPL INIT Protection, this parameter SHALL NOT be used. This parameter is used by the SET to indicate to the SLP one of the following conditions: Invalid SUPL INIT Root Key Out of Sync SUPL INIT Root Key This parameter SHALL be sent and set to "Invalid SUPL INIT Root Key" if the SET does not have a valid SUPL INIT Root Key. It SHALL be sent and set to "Out of Sync SUPL INIT Root Key" if the SET's SUPL INIT Root Key is out of sync. If the SET has a valid SUPL INIT Root Key which is in sync, this parameter SHALL NOT be sent. |

9.2.8 SUPL END

SUPL END is the message that ends the SUPL procedure, normally or abnormally.

| SUPL END Message | | |
|---|---|---|
| Parameter | Presence | Description |
| Position | O | Defines the position result of the SET. |
| Status Code | O | Defines the Status of the message as either an error indication or an information indication. Error indications have values between 0 and 99, information indications have values between 100 and 199. |
| Ver | CV | This parameter contains the hash of the SUPL INIT/SUPL REINIT message and is calculated by the SET. This parameter MUST be present in situations where the SUPL |

SUPL END Message (continued)

| Parameter | Presence | Description |
|---|---|---|
| | | END message is sent as a direct response to a SUPL INIT/SUPL REINIT message. |
| SET Capabilities | O | Defines the SET Capabilities of the SET. This parameter MAY be used if the SUPL END message is sent from the SET to the SLP. |
| Location URI Set | O | This parameter contains a set of one or more location URIs. This parameter MAY only be included if the SUPL END message is sent from the SLP to the SET and if the SET had previously requested a Location URI from the SLP. |
| SLP Authorization | CV | This parameter is included in a response to a D-SLP or E-SLP Query from the SET to the H-SLP, Proxy D-SLP or Proxy E-SLP. The parameter may also be included when terminating a Session Info Query from the H-SLP or a Proxy D-SLP. The parameter provides one or more authorized D-SLP and/or E-SLP addresses and may include limitations on the use of each address. The parameter may also be used to support unsolicited provision of D-SLP and/or E-SLP addresses by the H-SLP or by a Proxy D-SLP at the end of any SUPL session based on the SET location, serving access network and/or neighboring access networks. This is allowed whenever the SET capabilities indicate support for the particular type of D-SLP or E-SLP provision. Any D-SLP addresses or E-SLP addresses provided by an H-SLP or Proxy D-SLP then replace any previous D-SLP or E-SLP addresses, respectively, that were provided earlier by the H-SLP or the same Proxy D-SLP, respectively. Other provided D-SLP and E-SLP addresses are not affected except that removal of a Proxy D/E-SLP address also removes all D-SLP or E-SLP addresses that may have been provided by the Proxy D/E-SLP. |
| Relative Position | O | This parameter defines the position result relative to a reference point or another SET (relative position). This parameter is only applicable when sent from the SLP to the SET. |
| Civic Position | O | This parameter defines the position result as civic address. This parameter is only applicable when sent from the SLP to the SET. The presence of this parameter is implementation dependent. |
| SUPL INIT Key Response | CV | This parameter is conditional and SHALL only be used for Mode A SUPL_INIT_ROOT_KEY Establishment (see section 6.3.5.2). This parameter SHALL only be used if SUPL END is sent from the SLP to the SET. |

10.x SUPL INIT Key Response

The SUPL INIT Key Response parameter is used in the SUPL_INIT_ROOT_KEY Establishment procedure (see section 6.3.5.2) to send Keys for Mode A SUPL INIT Protection from the SLP to the SET.

SUPL INIT Key Response

| Parameter | Presence | Value/Description |
|---|---|---|
| SUPL INIT Key Response | — | Used in the Mode A SUPL_INIT_ROOT_KEY Establishment Procedure (section 6.3.5.2) and the Mode A Resynchronization Procedure (section 6.3.5.3) |
| > Mode A Key Establishment | CV | This parameter is conditional and SHALL be sent in case of Mode A SUPL_INIT_ROOT_KEY Establishment Procedure |
| >> Mode A Key Identifier | M | This parameter represents the ModeAKeyIdentifier (see section 6.3.5.1) |
| >> Temporary Mode A Key Identifier | M | This parameter represents the TemporaryModeAKeyIdentifier (see section 6.3.5.1) |
| >> SUPL_INIT_ROOT_KEY | M | This parameter represents the SUPL_INIT_ROOT_KEY used for SUPL Init Protection. |
| >> Mode A Key Lifetime | M | This parameter represents the ModeAKeyLifetime parameter which defines the time when the SUPL_INIT_ROOT_KEY ceases being valid. The lifetime value is expressed in UTC time. |
| > Mode A Resync | CV | This parameter is conditional and SHALL be sent in case of Mode A Resynchromization Procedure. |
| >> Mode A Key Identifier | M | This parameter represents the ModeAKeyIdentifier (see section 6.3.5.1) |
| >> Temporary Mode A Key Identifier | M | This parameter represents the TemporaryModeAKeyIdentifier (see section 6.3.5.1) |

11.4 Message Extensions (SUPL Version 3)

```
ULP-Version-3-message-extensions DEFINITIONS AUTOMATIC TAGS ::=
BEGIN
EXPORTS
Ver3-SUPL-INIT-extension, Ver3-SUPL-START-extension, Ver3-SUPL-POS-INIT-extension,
Ver3-SUPL-END-extension, Ver3-SUPL-RESPONSE-extension, Ver3-SUPL-TRIGGERED-
RESPONSE-extension, Ver3-SUPL-TRIGGERED-START-extension, Ver3-SUPL-TRIGGERED-
STOP-extension, Ver3-SUPL-SET-INIT-extension, Ver3-SUPL-NOTIFY-extension, Ver3-SUPL-
NOTIFY-RESPONSE-extension, Ver3-SUPL-REPORT-extension, QoPCapabilities,
RelativePositioningCapabilities, CivicPositioningCapabilities;
IMPORTS
    Ver, QoP, FQDN
FROM ULP-Components
    CircularArea, EllipticalArea, PolygonArea
FROM Ver2-ULP-Components
        PosProtocolVersion3GPP, PosProtocolVersion3GPP2
FROM ULP-Version-2-parameter-extensions
        PosProtocolVersionOMA
FROM ULP-Version-3-parameter-extensions
    PosPayLoad
FROM SUPL-POS
    Notification
FROM SUPL-INIT
    SessionID
FROM ULP-Components
    NotificationResponse
FROM SUPL-NOTIFY-RESPONSE
    maxnumSessions, SessionList
FROM SUPL-REPORT
    OMA-LPPe-RelativeLocation, OMA-LPPe-ReferencePointUniqueID, OMA-LPPe-CivicLocation
FROM OMA-LPPE;
[Some unchanged portions removed for brevity]
Ver3-SUPL-END-extension ::= SEQUENCE {
    locationURISet          LocationURISet          OPTIONAL,
    slpAuthorization        SLPAuthorization        OPTIONAL,
    relativePosition        OMA-LPPe-RelativeLocation OPTIONAL,
    civicPosition           OMA-LPP-CivicLocation OPTIONAL,
    sULPINITKeyResponse     SULPINITKeyResponse OPTIONAL,
...}
[Some unchanged portions removed for brevity]
SULPINITKeyResponse ::= CHOICE {
    modeAKeyEstablishment       ModeAKeyEstablishment,
    modeAResynch                ModeAResynch,
...}
ModeAKeyEstablishment ::= SEQUENCE {
    modeAKeyIdentifier                  OCTET STRING(SIZE (8)),
    temporaryModeAKeyIdentifier         OCTET STRING(SIZE (8)),
    sUPLINITROOTKEY                     BIT STRING(SIZE (128)),
    ModeAKeyLifetime                    UTCTime,
...}
ModeAResynch ::= SEQUENCE {
    modeAKeyIdentifier                  OCTET STRING(SIZE (8)),
    temporaryModeAKeyIdentifier         OCTET STRING(SIZE (8)),
...}
END
```

11.6 Parameter Extensions (SUPL Version 3)

```
ULP-Version-3-parameter-extensions DEFINITIONS AUTOMATIC TAGS ::=
BEGIN
EXPORTS
Ver3-PosProtocol-extension, Ver3-SETCapabilities-extension, Ver3-SLPCapabilities-extension,
Ver3-TriggerParams-extension, Ver3-ServiceSupported-extensions;
IMPORTS
    QoPCapabilities, RelativePositioningCapabilities, CivicPositioningCapabilities
FROM ULP-Version-3-message-extensions;
Ver3-PosProtocol-extension ::= SEQUENCE {
    posProtocolVersionLPPe  PosProtocolVersionOMA OPTIONAL,
...}
Ver3-SETCapabilities-extension ::= SEQUENCE {
    qoPCapabilities                     QoPCapabilities OPTIONAL,
    civicPositioningCapabilities CivicPositioningCapabilities OPTIONAL,
    relativePositioningCapabilities     RelativePositioningCapabilities
OPTIONAL,
    d-SLP-Provision-from-H-SLP              BOOLEAN,
    e-SLP-Provision-from-H-SLP              BOOLEAN,
    d-SLP-Provision-from-Proxy-D-SLP    BOOLEAN,
```

```
    e-SLP-Provision-from-Proxy-E-SLP      BOOLEAN,
    d-SLP-Notification-to-H-SLP                        BOOLEAN,
    sensorSupport                                      BOOLEAN,
    sUPLINITRootKeyStatus          SUPLINITRootKeyStatus OPTIONAL,
...}
SUPLINITRootKey Status ::= ENUMERATED {invalidSUPLINITRootKey(0),
outofsyncSUPLINITRootKey(1), ...}
[Some unchanged portions removed for brevity]
END
```

Additional Embodiment 9

A prior definition of the Protection Level Parameter may not reflect the fact that Basic Protection has been changed to Mode A Protection and Mode B Protection (Mode B Protection being the same as the previous Basic Protection). A prior ASN.1 definition also may be updated. Thus, the following proposals may be incorporated into SUPL 3.0 to modify section 10.25 to reflect Mode A and Mode B protection and to update ASN.1 section 11.4 as well (section numbers may refer to SUPL 3.0 sections).

10.22 Protection Level

The Protection Level parameter defines the level of protection for the SUPL INIT/SUPL REINIT message.

| Parameter | Presence | Value/Description |
|---|---|---|
| Protection Level | — | This parameter defines the protection level of the SUPL INIT/SUPL REINIT protection. This parameter is optional. If not present, Null protection is assumed. |
| > Level | M | Null Protection<br>Basic Protection (not applicable in SUPL 3.0 i.e., the SLP SHALL NOT select this protection level)<br>Mode A Protection<br>Mode B Protection |
| > Basic Protection Parameters | CV | This parameter is only present if the protection level is Basic Protection.<br>Key-Identifier (= B-TID)<br>Basic Replay Counter<br>Basic MAC<br>This parameter SHALL NOT be used since Basic Protection is not supported in SUPL 3.0. |
| > Protection Parameter | CV | This value is only present if protection level is Mode A Protection or Mode B Protection.<br>Key Identifier Type<br>ModeAKeyIdentifier<br>TemporaryModeAKeyIdentifier<br>ModeBKeyIdentifier<br>Key Identifier<br>Basic Replay Counter<br>Basic MAC<br>Note that the Key Identifier comes in three different Types (Key Identifier Type): (1) ModeAKeyIdentifier, (2) TemporaryModeAKeyIdentifier and (3) ModeBKeyIdentifier. (1) and (2) apply to Mode A Protection whereas (3) applies to Mode B Protection. |

11.3 Message Extensions (SUPL Version 2)

```
ULP-Version-2-message-extensions DEFINITIONS AUTOMATIC TAGS
::=
BEGIN
EXPORTS
Ver2-SUPL-INIT-extension, Ver2-SUPL-START-extension,
Ver2-SUPL-RESPONSE-extension,
Ver2-SUPL-POS-INIT-extension, Ver2-SUPL-POS-extension,
Ver2-SUPL-END-extension;
IMPORTS
    SLP Address, Position, Ver
FROM ULP-Components
    SETCapabilities
FROM SUPL-START
    SupportedNetworkInformation, GNSSPosTechnology,
        MultipleLocatioIds, UTRAN-
GPSReferenceTimeResult, UTRAN-GANSSReferenceTimeResult,
UTRAN-
GPSReferenceTimeAssistance,
UTRAN-GANSSReferenceTimeAssistance, SPCSETKey,
SPCTID, SPCSETKeylifetime, ThirdParty, ApplicationID
FROM Ver2-ULP-Components
    TriggerType
FROM SUPL-TRIGGERED-START
    Ver3-ProtectionLevel-extension
FROM ULP-Version-3-parameter-extensions;
[Some unchanged portions removed for brevity]
ProtectionLevel ::= SEQUENCE {
    protlevel          ProtLevel,
    basicProtectionParams BasicProtectionParams OPTIONAL, -- not
applicable in SUPL 3.0
    ...,
    ver3-ProtectionLevel-extension      Ver3-ProtectionLevel-extension
        OPTIONAL}
ProtLevel ::= ENUMERATED {
    nullProtection(0), basicProtection(1), ..., ver3-modeAProtection(2),
    ver3-modeBProtection(3)} -
basicProtection(1) is not applicable in SUPL 3.0
[Some unchanged portions removed for brevity]
END
```

11.6 Parameter Extensions (SUPL Version 3)

```
ULP-Version-3-parameter-extensions DEFINITIONS AUTOMATIC
TAGS ::=
BEGIN
EXPORTS
Ver3-PosProtocol-extension, Ver3-SETCapabilities-extension,
Ver3-SLPCapabilities-extension,
Ver3-TriggerParams-extension, Ver3-ServiceSupported-extensions,
Ver3-ProtectionLevel-
extension;
IMPORTS
    QoPCapabilities, RelativePositioningCapabilities,
    CivicPositioningCapabilities
FROM ULP-Version-3-message-extensions;
[Some unchanged portions removed for brevity]
Ver3-ProtectionLevel-extension ::= SEQUENCE {
    keyIdentifierType          KeyIdentifierType,
    keyIdentifier              OCTET STRING(SIZE (8)),
    basicReplayCounter         INTEGER(0..65535),
    basicMAC                   BIT STRING(SIZE (32)),
...}
KeyIdentifierType ::= ENUMERATED {
    ModeAKeyIdentifier(0), TemporaryModeAKeyIdentifier(1),
    ModeBKeyIdentifier(2), ...}
END
```

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, firmware, or in a combination thereof. A software or logic module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), digital versatile disc (DVD), Blu-ray disc, or any other form of storage medium known in the art. Combinations of the above should also be included within the scope of computer-readable media. Examples include computer-readable media encoded with a data structure and computer-readable media encoded with a computer program. Computer-readable media may take the form of an article of manufacture. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal Thus, methodologies described herein can be implemented by various means depending upon the application. For example, these methodologies can be implemented in hardware, firmware, software, or a combination thereof.

In addition, or as an alternative to ASICs and processors, hardware implementations may include digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For an implementation involving firmware and/or software, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored. In an implementation involving firmware and/or software, the functions may be stored as one or more instructions or code on a computer-readable medium.

The disclosure may be implemented in conjunction with Wi-Fi/WLAN or other wireless networks. In addition to Wi-Fi/WLAN signals, a wireless/mobile station may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). The disclosure may also be implemented in conjunction with pseudolites or a combination of systems that includes pseudolites. The disclosure may be implemented in conjunction with femtocells or a combination of systems that includes femtocells.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The methodologies may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

A mobile station (e.g., MS or STA) refers to a device such as a cellular or other wireless communication device, personal communication system (PCS) device, personal navigation device (PND), Personal Information Manager (PIM), Personal Digital Assistant (PDA), laptop, tablet, netbook, smartbook or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station." The terms "mobile station" and "mobile device" are often used interchangeably.

This disclosure includes example embodiments; however, other implementations can be used. Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
generating, at a secure user plane location (SUPL) server, a message to be sent to a mobile device, the message including:
a server certificate including an identifier of the SUPL server and a public key of the SUPL server; and
a request for a device certificate of the mobile device;
receiving a reply message from the mobile device that includes a device certificate of the mobile device, wherein the reply message is encrypted using the public key of the SUPL server; and
authenticating, at the SUPL server, the mobile device by verifying whether the mobile device is associated with an authorized SUPL user based on the device certificate, wherein the device certificate includes a device identification (ID), and wherein authenticating the mobile device comprises comparing the device ID to a stored device ID, wherein the stored device ID is previously securely verified by the SUPL server as being associated with the authorized SUPL user.

2. The method of claim 1, wherein the mobile device comprises a SUPL enabled terminal (SET) and the SUPL server comprises a SUPL location platform (SLP).

3. The method of claim 1, wherein the message is sent in response to receiving from the mobile device an indication of one or more transport layer security (TLS) cipher suites supported by the mobile device, and wherein the message further includes a selection of at least one of the one or more TLS cipher suites.

4. The method of claim 1, wherein the device certificate includes a device identifier of the mobile device.

5. A non-transitory processor-readable medium comprising instructions that, when executed by a processor, cause the processor to:
generate, at a secure user plane location (SUPL) server, a message to be sent to a mobile device, the message including:
a server certificate including an identifier of the SUPL server and a public key of the SUPL server; and
a request for a device certificate of the mobile device;
receive a reply message from the mobile device that includes a device certificate of the mobile device, wherein the reply message is encrypted using the public key of the SUPL server; and
authenticate, at the SUPL server, the mobile device by verifying whether the mobile device is associated with an authorized SUPL user based on the device certificate, wherein the device certificate includes a device identification (ID), and wherein authenticating the mobile device comprises comparing the device ID to a stored device ID, wherein the stored device ID is previously securely verified by the SUPL server as being associated with the authorized SUPL user.

6. The non-transitory processor-readable medium of claim 5, wherein the mobile device comprises a SUPL enabled terminal (SET) and the SUPL server comprises a SUPL location platform (SLP).

7. The non-transitory processor-readable medium of claim 5, wherein the message is sent in response to receiving from the mobile device an indication of one or more transport layer security (TLS) cipher suites supported by the mobile device, and wherein the message further includes a selection of at least one of the one or more TLS cipher suites.

8. The non-transitory processor-readable medium of claim 5, wherein the device certificate includes a device identifier of the mobile device.

9. An apparatus comprising:
a hardware processor; and
a memory coupled to the processor, wherein the memory is configured to store instructions; and
wherein the instructions are executable by the processor to:
generate, at a secure user plane location (SUPL) server, a message to be sent to a mobile device, the message including:
a server certificate including an identifier of the SUPL server and a public key of the SUPL server; and
a request for a device certificate of the mobile device;
receive a reply message from the mobile device that includes a device identifier of the mobile device, wherein the reply message is encrypted using the public key of the SUPL server; and
authenticate, at the SUPL server, the mobile device by verifying whether the mobile device is associated with an authorized SUPL user based on the device certificate, wherein the device certificate includes a device identification (ID), and wherein authenticating the mobile device comprises comparing the device ID to a stored device ID, wherein the stored device ID is previously securely verified by the SUPL server as being associated with the authorized SUPL user.

10. The apparatus of claim 9, wherein the message is sent in response to receiving at the SUPL server from the mobile device an indication of one or more transport layer security (TLS) cipher suites supported by the mobile device, and wherein the message further includes a selection of at least one of the one or more TLS cipher suites.

11. An apparatus comprising:
means for generating, at a secure user plane location (SUPL) server, a message to be sent to a mobile device, the message including:
a server certificate including an identifier of the SUPL server and a public key of the SUPL server; and
a request for a device certificate of the mobile device;
means for receiving a reply message from the mobile device that includes a device certificate of the mobile device, wherein the reply message is encrypted using the public key of the SUPL server; and
means for authenticating, at the SUPL server, the mobile device by verifying whether the mobile device is associated with an authorized SUPL user based on the device certificate, wherein the device certificate includes a device identification (ID), and wherein means for authenticating the mobile device comprises means for comparing the device ID to a stored device ID, wherein the stored device ID is previously securely verified by the SUPL server as being associated with the authorized SUPL user.

12. The apparatus of claim 11, wherein the mobile device comprises a SUPL enabled terminal (SET) and the SUPL server comprises a SUPL location platform (SLP).

13. The apparatus of claim 11, wherein the message is sent in response to receiving from the mobile device an indication of one or more transport layer security (TLS) cipher suites supported by the mobile device, and wherein the message further includes a selection of at least one of the one or more TLS cipher suites.

14. The apparatus of claim 11, wherein the device certificate includes a device identifier of the mobile device.

15. The method of claim 1, further comprising:
decrypting the reply message, at the SUPL server, using a private key of the SUPL server to obtain the device certificate of the mobile device.

* * * * *